(12) United States Patent
Shu

(10) Patent No.: US 11,635,873 B2
(45) Date of Patent: Apr. 25, 2023

(54) INFORMATION DISPLAY METHOD, GRAPHICAL USER INTERFACE, AND TERMINAL FOR DISPLAYING MEDIA INTERFACE INFORMATION IN A FLOATING WINDOW

(71) Applicant: Huawei Technologies Co., Ltd., Shenzhen (CN)

(72) Inventor: Zhanggan Shu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 17/007,020

(22) Filed: Aug. 31, 2020

(65) Prior Publication Data

US 2020/0401281 A1    Dec. 24, 2020

Related U.S. Application Data

(63) Continuation of application No. PCT/CN2019/075336, filed on Feb. 18, 2019.

(30) Foreign Application Priority Data

Mar. 1, 2018  (CN) .......................... 201810174412.5

(51) Int. Cl.
*G06F 3/0482*  (2013.01)
*G06F 3/04815*  (2022.01)
(Continued)

(52) U.S. Cl.
CPC .......... *G06F 3/0482* (2013.01); *G06F 3/0483* (2013.01); *G06F 3/04815* (2013.01);
(Continued)

(58) Field of Classification Search
CPC .. G06F 3/0482; G06F 3/04815; G06F 3/0483; G06F 3/04842; G06F 3/017;
(Continued)

(56) References Cited

U.S. PATENT DOCUMENTS

| | | | |
|---|---|---|---|
| 5,678,015 A | * 10/1997 | Goh | ..................... G06F 3/04815 345/419 |
| 2003/0142136 A1 | * 7/2003 | Carter | ................. G06F 3/04815 715/782 |

(Continued)

FOREIGN PATENT DOCUMENTS

| | | |
|---|---|---|
| CN | 101465995 A | 6/2009 |
| CN | 102316367 A | 1/2012 |

(Continued)

*Primary Examiner* — Nicholas Klicos
(74) *Attorney, Agent, or Firm* — Conley Rose, P.C.

(57) ABSTRACT

An information display method includes displaying, by a terminal, at least one poster in a first display area of a screen, receiving, by the terminal, a first input used to select a poster from the at least one poster, and obtaining, by the terminal, story line introduction information associated with a target video, and displaying a first window in a suspended manner in the first display area, where the first window displays the story line introduction information associated with the target video, and the target video is a video represented by the poster selected through the first input.

20 Claims, 46 Drawing Sheets

(51) Int. Cl.
*G06F 3/0483* (2013.01)
*G06F 3/04842* (2022.01)
*H04N 21/422* (2011.01)
*H04N 21/81* (2011.01)
*H04N 21/84* (2011.01)

(52) U.S. Cl.
CPC ... G06F 3/04842 (2013.01); H04N 21/42224 (2013.01); H04N 21/8153 (2013.01); H04N 21/84 (2013.01)

(58) Field of Classification Search
CPC .......... G06F 2203/04802; G06F 9/451; H04N 21/42224; H04N 21/8153; H04N 21/84
See application file for complete search history.

(56) References Cited

U.S. PATENT DOCUMENTS

| | | | |
|---|---|---|---|
| 2006/0274060 A1* | 12/2006 | Ni | G06F 3/0482 345/419 |
| 2009/0024923 A1* | 1/2009 | Hartwig | G06F 16/70 715/716 |
| 2009/0158326 A1* | 6/2009 | Hunt | H04N 5/783 725/38 |
| 2010/0050129 A1* | 2/2010 | Li | G06F 3/0481 715/849 |
| 2010/0315417 A1* | 12/2010 | Cho | G06F 1/1643 345/419 |
| 2011/0179368 A1* | 7/2011 | King | G06F 3/0482 715/769 |
| 2011/0296351 A1 | 12/2011 | Ewing, Jr. et al. | |
| 2011/0307834 A1* | 12/2011 | Wu | G06F 3/0488 715/836 |
| 2012/0260217 A1* | 10/2012 | Celebisoy | G06F 3/0488 715/836 |
| 2012/0291056 A1* | 11/2012 | Donoghue | H04N 21/4722 725/41 |
| 2012/0293501 A1 | 11/2012 | Ishii | |
| 2013/0346911 A1* | 12/2013 | Sripada | G06T 19/003 715/782 |
| 2014/0176479 A1 | 6/2014 | Wardenaar | |
| 2014/0229834 A1 | 8/2014 | Jain | |
| 2014/0269930 A1* | 9/2014 | Robinson | H04N 21/4821 375/240.24 |
| 2015/0193119 A1 | 7/2015 | Chai et al. | |
| 2017/0024093 A1* | 1/2017 | Dziuk | G11B 20/10527 |
| 2017/0118520 A1* | 4/2017 | Wu | H04N 21/4316 |
| 2017/0150203 A1* | 5/2017 | Li | G06F 3/0488 |
| 2017/0192642 A1 | 7/2017 | Fishman et al. | |
| 2018/0160165 A1* | 6/2018 | Cormican | H04N 21/42224 |
| 2018/0199110 A1* | 7/2018 | Cormican | H04N 21/4722 |

FOREIGN PATENT DOCUMENTS

| | | |
|---|---|---|
| CN | 103116440 A | 5/2013 |
| CN | 104932794 A | 9/2015 |
| CN | 105468142 A | 4/2016 |
| CN | 106528855 A | 3/2017 |
| CN | 106919317 A | 7/2017 |
| CN | 107241494 A | 10/2017 |
| CN | 107256109 A | 10/2017 |
| WO | 2012122946 A1 | 9/2012 |

* cited by examiner

INFORMATION DISPLAY METHOD, GRAPHICAL USER INTERFACE, AND TERMINAL FOR DISPLAYING MEDIA INTERFACE INFORMATION IN A FLOATING WINDOW

CROSS-REFERENCE TO RELATED APPLICATIONS

This application is a continuation of International Patent Application No. PCT/CN2019/075336 filed on Feb. 18, 2019, which claims priority to Chinese Patent Application No. 201810174412.5 filed on Mar. 1, 2018. The disclosures of the aforementioned applications are hereby incorporated by reference in their entireties.

TECHNICAL FIELD

This application relates to the field of human-computer interaction technologies, and in particular, to an information display method, a graphical user interface, and a terminal.

BACKGROUND

With popularization of mobile terminal devices, an increasing quantity of users choose to watch video content of their interest on mobile terminal devices (for example, mobile phones and tablet computers) using downloaded and installed video play applications. Currently, a video play application generally displays movie information by combining a static poster and a dynamic poster.

For example, as shown in FIG. 1A, a poster browsing page 101 of an existing video play application displays a plurality of posters 201.

When a user taps a poster 201 on the poster browsing page 101, as shown in FIG. 2, a terminal device mainly performs the following two parts of work:

1. Jump to a video details page 103 shown in FIG. 1B. If video play is enabled by default, the terminal device initiates a play request to a streaming server. After operations such as authentication and charging are performed, the streaming server sends a video media stream to the terminal device. After receiving the media stream, the terminal plays a video in a play area 205 on the video details page 103.

2. The terminal device initiates a video information query request to a service management and control platform. Video information mainly includes information such as a video content summary, a community post and comment, a video recommendation, video-related news or a recommendation of a related product, and advertisement position display. The service management and control platform returns queried information. After receiving the information, the terminal device displays the information on the video details page 103.

Only when the user taps a control 203 ("Summary") on the video details page 103 to view video introduction information, as shown in FIG. 1C, the terminal device refreshes the video details page 103, and displays the video introduction information 207 on the video details page 103.

FIG. 2 shows a main process in other approaches as an example. Devices in FIG. 2 include the terminal device, the service management and control platform, and the streaming server. The video play application is installed on the terminal device, to support video play and display of video-related information. The service management and control platform is responsible for video publishing and service control, for example, authentication and charging. The streaming server is a capability component and provides a video play capability.

However, the existing video play application displays only the posters 201 and quite a few texts, for example, a movie name, on the poster browsing page 101. The user is unable to accurately learn of a story line of a video. Especially for a video unfamiliar to the user, the user needs to tap a poster 201 on the poster browsing page 101 to access the video details page 103. In addition, the video details page 103 displays much information not directly related to a story line introduction of the video, for example, a movie shooting feature, a community post, a video recommendation, and video-related news or a recommendation of a related product. The user further needs to tap the control 203 ("Summary") on the video details page 103 to view video introduction information of the video and learn of a story line of the video. A process of viewing the video introduction information of the video by the user is quite complex, and interaction experience is poor.

In addition, in one aspect, when the user accesses the video details page 103, the terminal device loads a media stream if video play is enabled by default. In another aspect, the terminal device displays, on the video details page 103, much information not directly related to the story line introduction of the video. These two aspects cause network stalling, excessive consumption of user traffic, excessively high instantaneous load of the terminal device, and the like. Therefore, the user is unable to obtain good video browsing and watching experience.

SUMMARY

This application provides an information display method, a graphical user interface, and a terminal, to help a user quickly learn of a video during video browsing on a video website. This is quite convenient and efficient.

According to a first aspect, this application provides an information display method. The method may include displaying, by a terminal, at least one poster in a first display area of a screen, receiving a first input used to select a poster from the at least one poster, and in response to the first input, displaying a first window in a suspended manner in the first display area, where the first window displays video introduction information corresponding to a target video. The target video is a video represented by the poster selected through the first input. The first display area may occupy a part of or the whole of the screen of a display of the terminal.

In this application, the first input is a user operation that is used for viewing the video introduction information and that acts on the poster. Not limited to a tap operation acting on the poster, the first input may alternatively include a touch and hold operation, a double-tap operation, or the like that acts on the poster. Not limited thereto, the poster may further display a button used for viewing a story line, and the first input may be alternatively a tap operation acting on the button. Not limited to a touch operation, the first input may be alternatively a motion sensing operation on the poster, without direct contact with the touchscreen. Further, the motion sensing operation may be captured by a motion sensor.

With implementation of the method described in the first aspect, a user can quickly learn of a video during video browsing on a video website or in video software. This is quite convenient and efficient.

With reference to the first aspect, in some optional implementations, the video introduction information corresponding to the target video may include at least one of text information used to introduce the target video, image information used to introduce the target video, and voice information used to introduce the target video. The image information may include but is not limited to at least one of a short video and a static/dynamic poster. Herein, play duration of the short video is smaller than a first threshold, for example, 60 seconds.

With reference to the first aspect, in some optional implementations, the first window may further include at least one of a play control, a share control, a favorites control, and a rating control. The play control is used to receive a user operation that is input by a user for playing the target video. The share control is used to receive a user operation that is input by the user for sharing the target video. The favorites control is used to receive a user operation that is input by the user for adding the target video to favorites. The rating control is used to receive a user operation that is input by the user for commenting on the target video.

Not limited to a tap operation acting on the foregoing controls, the user operation acting on the play control (or the share control, or the favorites control, or the rating control) may alternatively include a touch and hold operation, a double-tap operation, or the like. Not limited to a touch operation, the user operation acting on the foregoing control may be alternatively a motion sensing operation on the control, without direct contact with the touchscreen. Further, the motion sensing operation may be captured by a motion sensor.

With reference to the first aspect, in some optional implementations, the first window may be alternatively a three-dimensional floating window. The three-dimensional floating window includes N pages. The user may switch between the N pages for display on the screen of the display of the terminal. One page is used to display video introduction information corresponding to one video. The user can continuously browse video introduction information respectively corresponding to N videos. N is a positive integer greater than 1.

Further, a plurality of posters may be selected through the first input. To be specific, N posters selected by the user each represent a corresponding target video. When detecting a user operation (that is, the first input) for selecting a plurality of target videos, the terminal may display in a suspended manner (or pop up) a three-dimensional floating window in the first display area. The three-dimensional floating window may include a plurality of pages. The plurality of pages may be used to respectively display video introduction information corresponding to the target videos (that is, videos respectively represented by the plurality of posters continuously selected by the user).

In addition, the terminal may display at least one of the plurality of pages in a suspended manner in the first display area. A page that is in the at least one page and that is primarily displayed on the screen may be referred to as a current page of the three-dimensional floating window. Herein, "a page primarily displayed on the screen" is a page that is in the plurality of pages of the three-dimensional floating window and that occupies a largest display area on the screen.

Optionally, in addition to the current page, the terminal may further display a page after (or before) the current page, for example, a next (or previous) page, in a suspended manner in the first display area. This can not only help the user learn of video introduction information that is corresponding to a video and that is displayed on the current page, but also prompt the user that the user can operate the three-dimensional floating window to browse video introduction information that is corresponding to a video and that is displayed on the next (or previous) page. User experience is better.

With reference to the first aspect, in some optional implementations, an arrangement form for displaying the plurality of pages included in the first window may be as follows. The plurality of pages are respectively arranged on N sides of a prism. Not limited thereto, the plurality of pages included in the first window may be alternatively displayed in another arrangement form. For example, the plurality of pages included in the first window may be arranged on a circumference surface of a cylinder. For another example, the plurality of pages included in the first window may be displayed in an arrangement form of dominoes. The examples are merely some embodiments provided in this application, and constitute no limitation on the technical solutions of this application. In actual application, other different arrangement forms may be used.

Optionally, when detecting a second input for the three-dimensional floating window, the terminal may switch the page before (or after) the current page as a new current page of the three-dimensional floating window. The second input is a user operation for switching the current page of the three-dimensional floating window. The second input may include a sliding operation on the three-dimensional floating window, or may be a touch operation in another form, for example, a tap operation or a push operation that acts on the previous (or next) page. This is not limited herein. Not limited to the touch operation, the second input may be alternatively a motion sensing operation on the three-dimensional floating window, without direct contact with the screen.

Further, to help the user quickly browse video introduction information respectively corresponding to a plurality of videos when the user holds the terminal with one hand, the second input may be alternatively an operation of holding the terminal by the user to perform a specific movement, for example, an operation of rotating (or shaking, or swinging, or the like) the terminal. Further, the terminal may capture the second input using a movement sensor. In this application, the specific movement may be referred to as a first movement.

The first movement may include but is not limited to at least one of the following:

(1) When the N pages included in the first window are respectively arranged on the N sides of the prism, the terminal is rotated along an axis of the prism.

(2) When the N pages included in the first window are arranged on the circumference surface of the cylinder, the terminal is rotated along an axis of the cylinder.

(3) When the N pages included in the first window are arranged in the form of dominoes, the terminal is tilted in a direction in which the dominoes collapse in a chain.

With reference to the first aspect, in some optional implementations, when detecting a third input for the first window, the terminal may stop displaying the first window. The third input is a user operation for exiting (or closing) the first window.

Not limited to a tap operation, the third input may alternatively include a touch operation such as a touch and hold operation or a double-tap operation. Not limited thereto, an exit (or close) button may be further provided in the first window, and the third input may be alternatively a user operation of tapping the button. Not limited to the touch operation, the third input may be alternatively a motion sensing operation on the first window, without direct contact with the screen. Further, the motion sensing operation (also referred to as a motion gesture) may be captured by a motion sensor (for example, a depth camera).

According to a second aspect, this application provides a graphical user interface on a terminal device. The terminal device may be provided with a display, a user input apparatus, a memory, and one or more processors configured to execute one or more programs stored in the memory. The graphical user interface includes a first display area of the display and at least one poster displayed in the first display area.

In response to a first input that is used to select a poster from the at least one poster and that is detected by the user input apparatus, a first window is displayed in a suspended manner in the first display area. The first window displays video introduction information corresponding to a target video. Herein, the target video is a video represented by the poster selected through the first input.

The first input may include a tap operation on the poster, or may include a touch operation in another form on the poster, for example, a touch and hold operation or a double-tap operation. Not limited thereto, the poster may further display a button used for viewing a story line, and the first input may be alternatively a tap operation on the button. Not limited to a touch operation, the first input may be alternatively a motion sensing operation on the poster, without direct contact with a touchscreen. Further, the motion sensing operation may be captured by a motion sensor.

With reference to the second aspect, in some optional implementations, a floating window may include but is not limited to at least one of an image area, a text display area, and an audio play area. The image area displays image information used to introduce the target video. The text display area displays text information used to introduce the target video. The audio play area displays voice information used to introduce the target video. Herein, the image information may include a short video and/or a poster (a dynamic poster or a static poster), or may include image information in another form. This is not limited in this application.

With reference to the second aspect, in some optional implementations, the floating window may further include at least one of a play control, a share control, a favorites control, and a rating control. The play control is used to receive a user operation that is input by a user for playing the target video. The share control is used to receive a user operation that is input by the user for sharing the target video. The favorites control is used to receive a user operation that is input by the user for adding the target video to favorites. The rating control is used to receive a user operation that is input by the user for commenting on the target video.

Not limited to a tap operation acting on the foregoing controls, the user operation acting on the play control (or the share control, or the favorites control, or the rating control) may alternatively include a touch and hold operation, a double-tap operation, or the like. Not limited to a touch operation, the user operation acting on the foregoing control may be alternatively a motion sensing operation on the control, without direct contact with the touchscreen. Further, the motion sensing operation may be captured by a motion sensor.

With reference to the second aspect, in some optional implementations, a plurality of posters may be selected. To be specific, N posters selected by the user each represent a corresponding target video. N is a positive integer greater than 1. Further, the graphical user interface may further include the following. When detecting a user operation (that is, the first input) for selecting the target videos, a system may display in a suspended manner (or pop up) a three-dimensional floating window in the first display area. The three-dimensional floating window includes N pages, used to display video introduction information of the target videos.

In addition, the system may display at least one of the N pages in a suspended manner in the first display area. A page that is in the at least one page and that is primarily displayed on the screen may be referred to as a current page of the three-dimensional floating window. Herein, "a page primarily displayed on the screen" is a page that is in the plurality of pages of the three-dimensional floating window and that occupies a largest display area on the screen.

Optionally, in addition to the current page, the system may further display a page after (or before) the current page, for example, a next (or previous) page, in a suspended manner in the first display area. This can not only help the user learn of video introduction information that is corresponding to a video and that is displayed on the current page, but also prompt the user that the user can operate the three-dimensional floating window to browse video introduction information that is corresponding to a video and that is displayed on the next (or previous) page. User experience is better.

With reference to the second aspect, in some optional implementations, an arrangement form for displaying the plurality of pages included in the first window may be as follows. The plurality of pages are respectively arranged on N sides of a prism. Not limited thereto, the plurality of pages included in the first window may be alternatively displayed in another arrangement form. For example, the plurality of pages included in the first window may be arranged on a circumference surface of a cylinder. For another example, the plurality of pages included in the first window may be displayed in an arrangement form of dominoes. The examples are merely some embodiments provided in this application, and constitute no limitation on the technical solutions of this application. In actual application, other different arrangement forms may be used.

Optionally, the graphical user interface may further include the following. When detecting a second input for the three-dimensional floating window, the system may switch the page before (or after) the current page as a new current page of the three-dimensional floating window. The second input is a user operation for switching the current page of the three-dimensional floating window. The second input may include a sliding operation on the three-dimensional floating window, or may be a touch operation in another form, for example, a tap operation or a push operation that acts on the previous (or next) page. This is not limited herein. Not limited to the touch operation, the second input may be alternatively a motion sensing operation on the three-dimensional floating window, without direct contact with the screen.

Further, to help the user quickly browse video introduction information respectively corresponding to a plurality of videos when the user holds the terminal with one hand, the second input may be alternatively an operation of holding the terminal by the user to perform a specific movement, for example, an operation of rotating (or shaking, or swinging, or the like) the terminal. Further, the terminal may capture the second input using a movement sensor. In this application, the specific movement may be referred to as a first movement.

The first movement may include but is not limited to at least one of the following:

(1) When the N pages included in the first window are respectively arranged on the N sides of the prism, the terminal is rotated along an axis of the prism.

(2) When the N pages included in the first window are arranged on the circumference surface of the cylinder, the terminal is rotated along an axis of the cylinder.

(3) When the N pages included in the first window are arranged in the form of dominoes, the terminal is tilted in a direction in which the dominoes collapse in a chain.

With reference to the second aspect, in some optional implementations, the graphical user interface may further include the following. When detecting a third input for the first window, the system may stop displaying the first window. The third input is a user operation for exiting (or closing) the first window.

Not limited to a tap operation, the third input may alternatively include a touch operation such as a touch and hold operation or a double-tap operation. Not limited thereto, an exit (or close) button may be further provided in the first window, and the third input may be alternatively a user operation of tapping the button. Not limited to the touch operation, the third input may be alternatively a motion sensing operation on the first window, without direct contact with the screen. Further, the motion sensing operation (also referred to as a motion gesture) may be captured by a motion sensor (for example, a depth camera).

According to a third aspect, this application provides a terminal. The terminal may include a display, a user input apparatus, and a processor. The display is configured to display at least one poster in a first display area of a screen of the display. The user input apparatus is configured to receive a first input used to select a poster from the at least one poster. The processor is configured to, in response to the first input, obtain video introduction information corresponding to a target video. The display is further configured to display a first window in a suspended manner in the first display area. The first window displays the video introduction information corresponding to the target video. The target video is a video represented by the poster selected through the first input.

Optionally, the user input apparatus may include at least one of a touch apparatus, a motion sensor, or a movement sensor.

Further, for specific implementation of the display, the user input apparatus, and the processor, refer to the first aspect or the second aspect. Details are not described herein again.

According to a fourth aspect, this application provides a terminal, including a functional unit configured to perform the information display method in the first aspect.

According to a fifth aspect, this application provides a readable non-volatile storage medium storing a computer instruction, where the computer instruction is executed by a terminal to implement the information display method described in the first aspect. The terminal may be the terminal described in the third aspect or the fourth aspect.

According to a sixth aspect, this application provides a computer program product including an instruction. When the computer program product is run on a computer, the computer is enabled to perform the information display method described in the first aspect.

BRIEF DESCRIPTION OF DRAWINGS

To describe the technical solutions in some of the embodiments of this application more clearly, the following briefly describes the accompanying drawings describing some of the embodiments of this application or the background.

DESCRIPTION OF EMBODIMENTS

Terms used in an implementation part of this application are only used to explain specific embodiments of this application, and are not intended to limit this application.

Figure 1A:
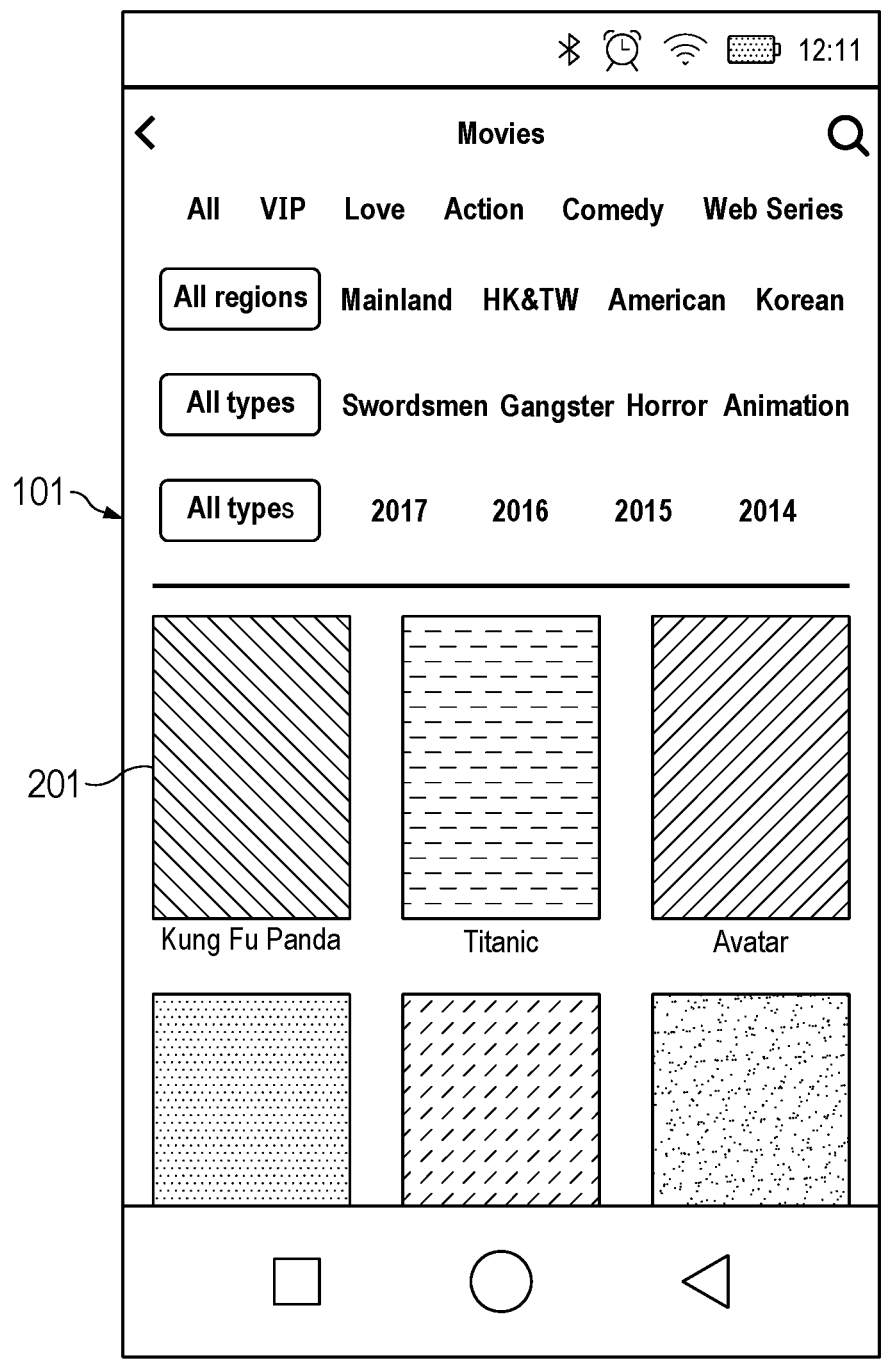
FIG. 1A is a user page provided by existing video play software.
Figure 1B:
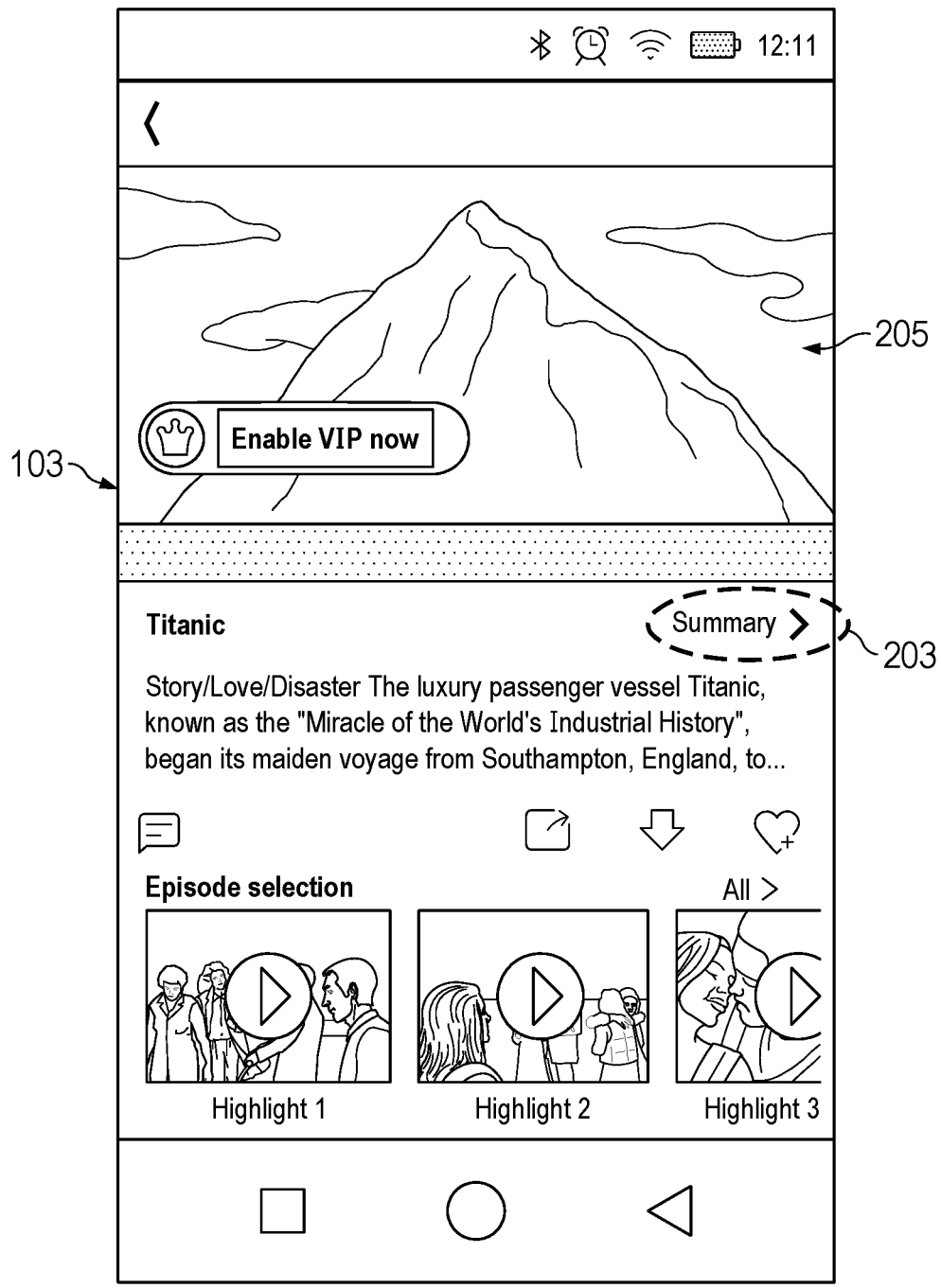
FIG. 1B is a user page provided by existing video play software.
Figure 1C:
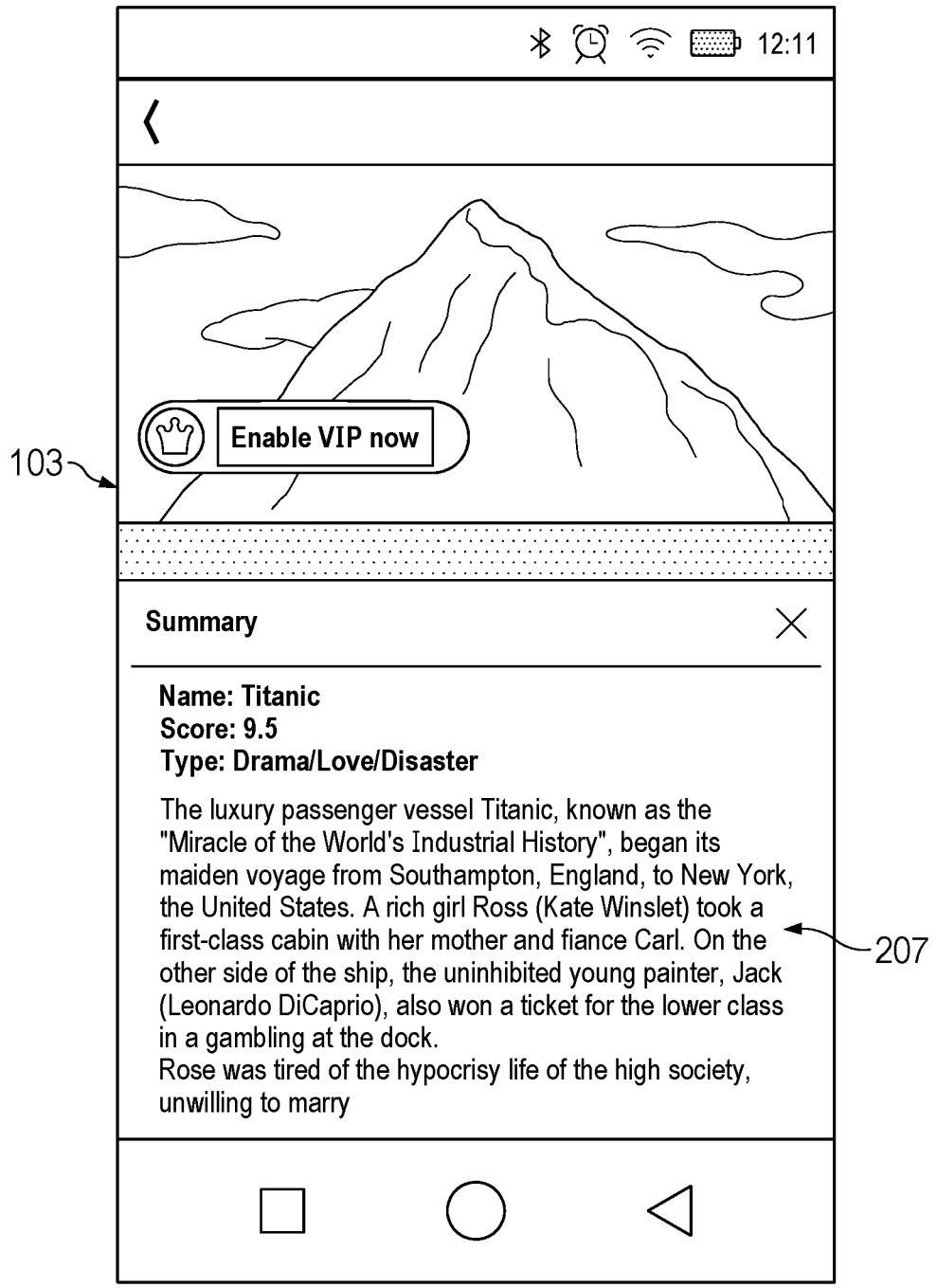
FIG. 1C is a user page provided by existing video play software.
Figure 2:
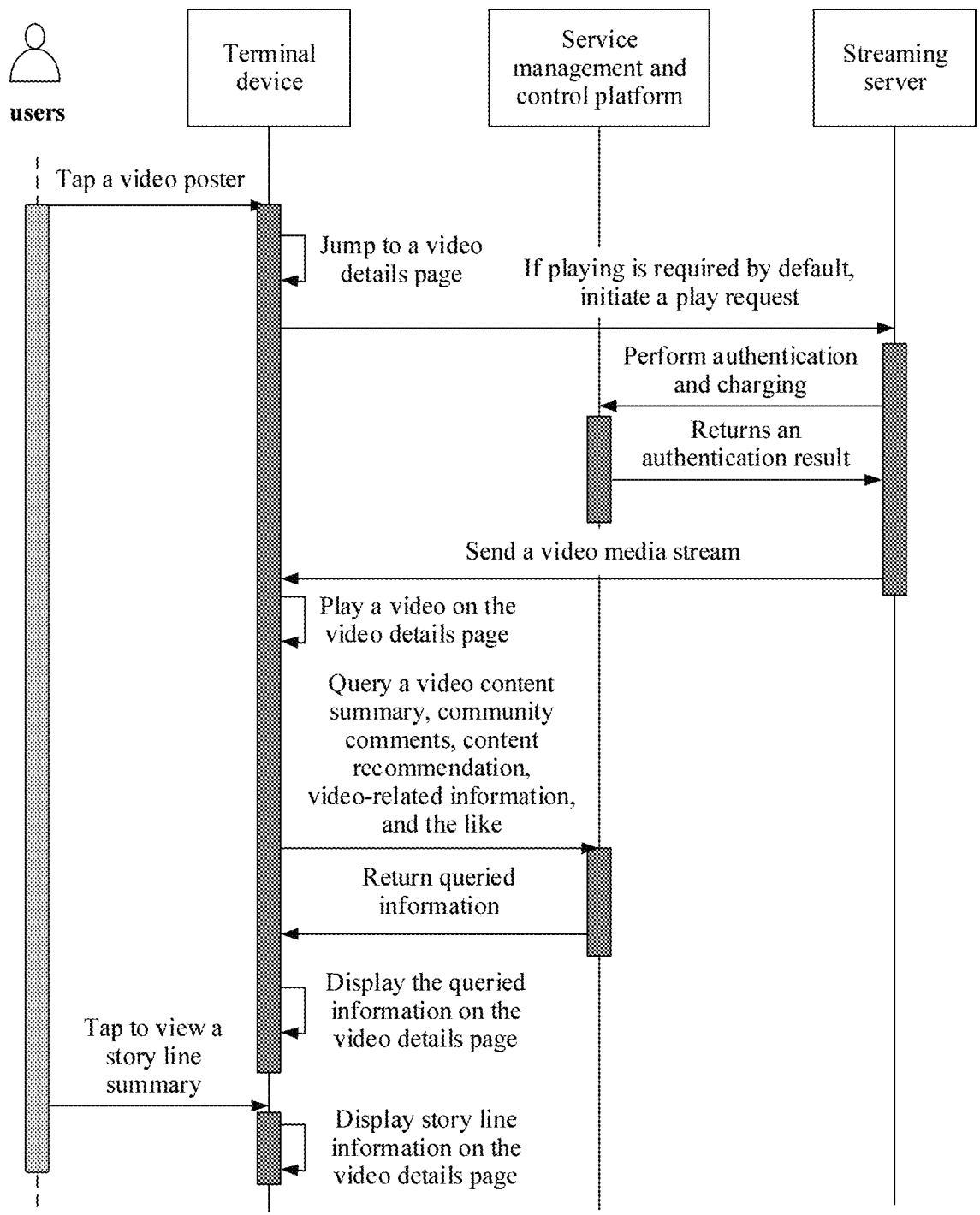
FIG. 2 is a schematic diagram of a processing process of existing video play software.

A main disclosure principle of this application may include the following. A floating window displayed in a suspended manner on a poster browsing page 101 (refer to FIG. 1A) is used to display video introduction information of a video. By simply selecting a poster 201 of a video of a user's interest on the poster browsing page 101, the user can quickly learn of the video in the floating window. This is quite convenient and efficient.

A system mentioned in this application is an operating system running on a terminal, for example, ANDROID OS, WINDOWS Phone, or IOS. In addition to functions of an embedded operating system (such as process management, a file system, and a network protocol stack), the system mentioned in this application may be further applied to a power management part of a battery power supply system, an input/output part for user interaction, an embedded graphical user interface service providing a call interface for an upper-layer application, an underlying encoding and decoding service for a multimedia application, a Java running environment, a wireless communications core function for a mobile communications service, an upper-layer application on a smartphone, and the like.

In this application, the poster browsing page 101 may be displayed in a display area of a screen. The display area may occupy a part of or the whole of the screen. In this application, the display area may be referred to as a first display area. The poster browsing page 101 may display a poster of at least one video. A user may view video introduction information corresponding to any video. A poster of a video is visual information used for displaying or promoting the video. The poster of the video may be a static poster, or may be a dynamic poster, or may be a combination of a static poster and a dynamic poster.

For ease of understanding of this application, some human-computer interaction embodiments provided in this application are first described.

Figure 3A:
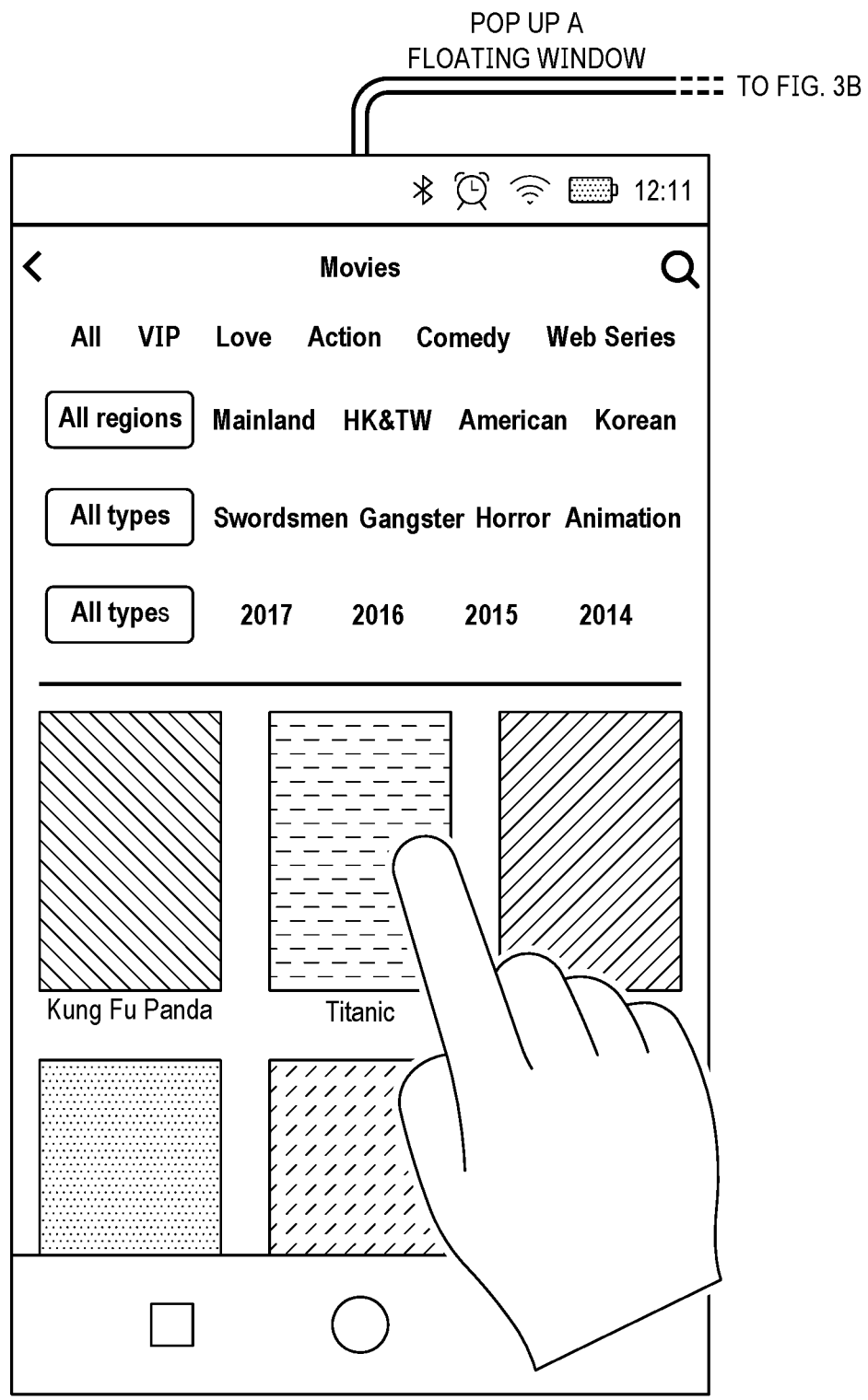
FIG. 3A is a schematic diagram of a human-computer interaction embodiment according to this application.
Figure 3B:
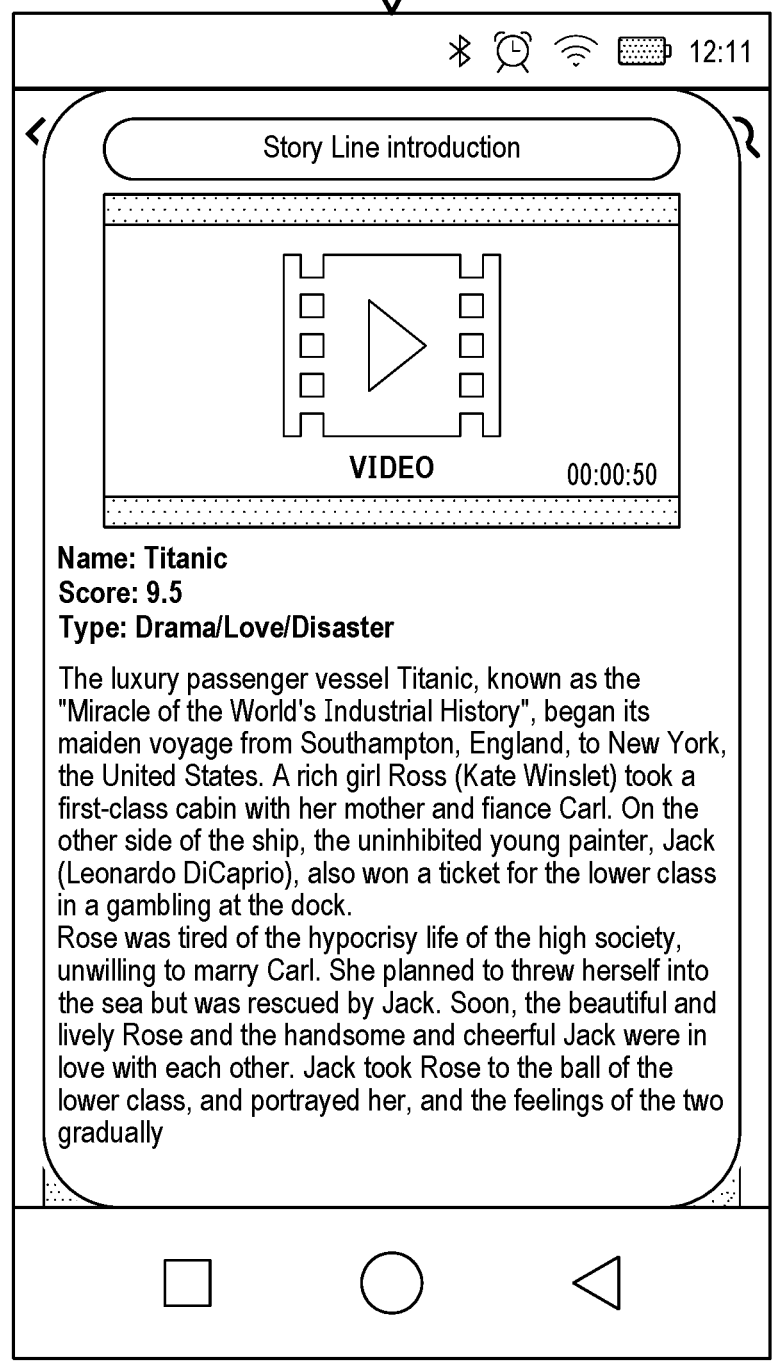
FIG. 3B is a schematic diagram of a human-computer interaction embodiment according to this application.

FIG. 3A and FIG. 3B show an example of a human-computer interaction process of viewing video introduction information corresponding to a video. Using a video "Titanic" as an example, a user operation for viewing video introduction information corresponding to "Titanic" may be a user operation of tapping a poster of "Titanic" by a user.

As shown in FIG. 3A and FIG. 3B, on a poster browsing page 101, when detecting a tap operation in a poster area of "Titanic", a system may display in a suspended manner (or pop up) a floating window 301 on the poster browsing page 101, and display, in the floating window 301, the video introduction information corresponding to "Titanic".

It can be learned from FIG. 3A and FIG. 3B that a user may quickly view video introduction information corresponding to a video by performing an operation on a poster, without performing a plurality of operations (for example, opening a video details page 103 and tapping a button 203 ("Summary")). This is simpler and more convenient.

In this application, a user operation that is used for viewing video introduction information and that acts on a poster may be referred to as a first input. Not limited to the tap operation on the poster in FIG. 3A and FIG. 3B, the first input may alternatively include a touch and hold operation or a double-tap operation on the poster. Not limited thereto, the poster may further display a button used for viewing a story line, and the first input may be alternatively a tap operation on the button.

Not limited to a touch operation, the first input may be alternatively a motion sensing operation on the poster, without direct contact with a touchscreen. Further, the motion sensing operation may be captured by a motion sensor.

In this embodiment of this application, a video represented by a poster selected through the first input may be referred to as a target video. For example, the video "Titanic" in FIG. 3A and FIG. 3B is the target video. The example is merely used to interpret this application, and constitutes no limitation on the technical solutions of this application.

The following describes an implementation of the floating window.

Figure 4A:
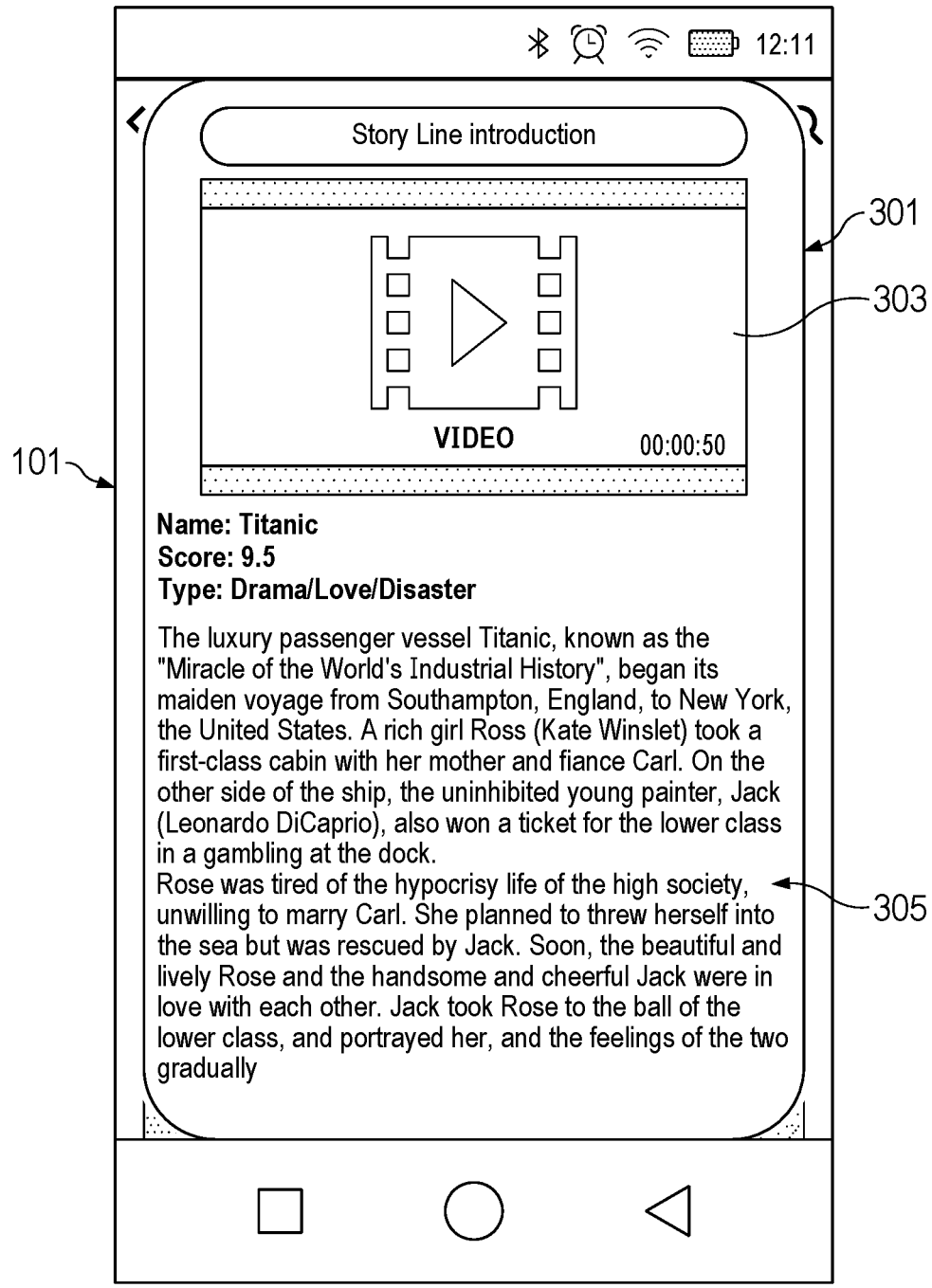
FIG. 4A is a schematic diagram of floating windows according to an embodiment of this application.

Further, as shown in FIG. 4A, the floating window 301 may include an image area 303 and a text display area 305. The image area 303 displays image information used to introduce "Titanic". The text display area 305 displays text information used to introduce "Titanic". Herein, the image information may include a short video and/or a poster (a dynamic poster or a static poster), or may include image information in another form. This is not limited in this application.

That is, the video introduction information corresponding to "Titanic" may include the text information and the image information. In terms of content, the video introduction information may not only include story line introduction information, but also include information such as a shooting year, a video type, and a performer.

In this application, play duration of the short video is less than a first threshold, for example, 60 seconds. In specific implementation, the short video may source from the video "Titanic" (some frames extracted from the video "Titanic"), or may be a separately produced introduction video (for example, an introduction short film of an animation type), or the like. In specific implementation, the system may automatically play the short video after opening the floating window, or may play the short video after the user taps a play button on the short video. This is not limited in this application. Optionally, the system may cyclically play the short video in the image area 303.

Not limited to that shown in FIG. 4A, a layout of the image area 303 and the text display area 305 in the floating window 301 may be alternatively displayed in another pattern. This is not limited in this application.

Not limited to that shown in FIG. 4A, the floating window 301 may be alternatively implemented in the following two manners.

Figure 4B:
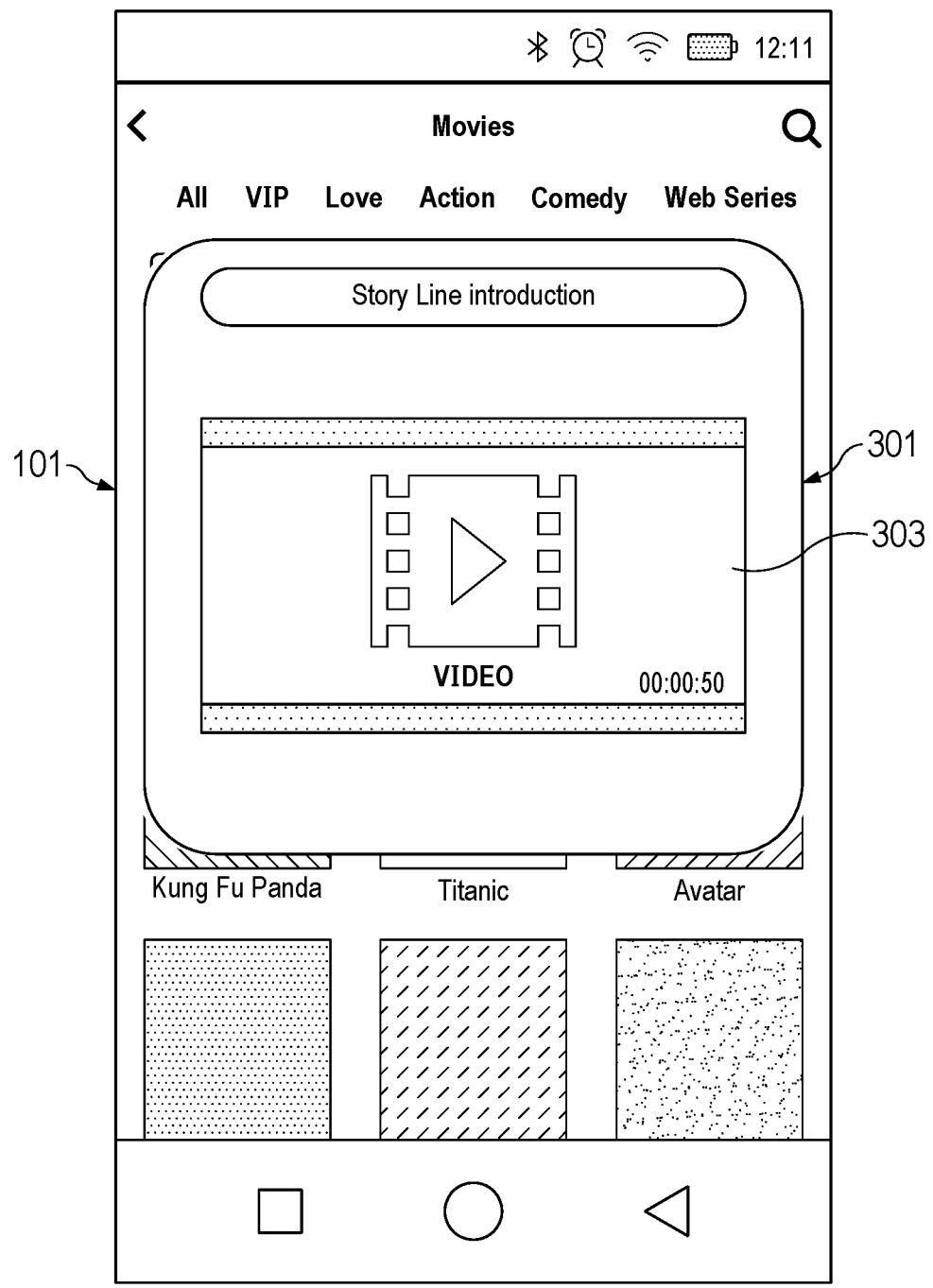
FIG. 4B is a schematic diagram of floating windows according to an embodiment of this application

In an implementation, as shown in FIG. 4B, the floating window 301 may include only an image area 303. A short video used to introduce "Titanic" is played in the image area 303. That is, the video introduction information corresponding to "Titanic" may include only image information.

Figure 4C:
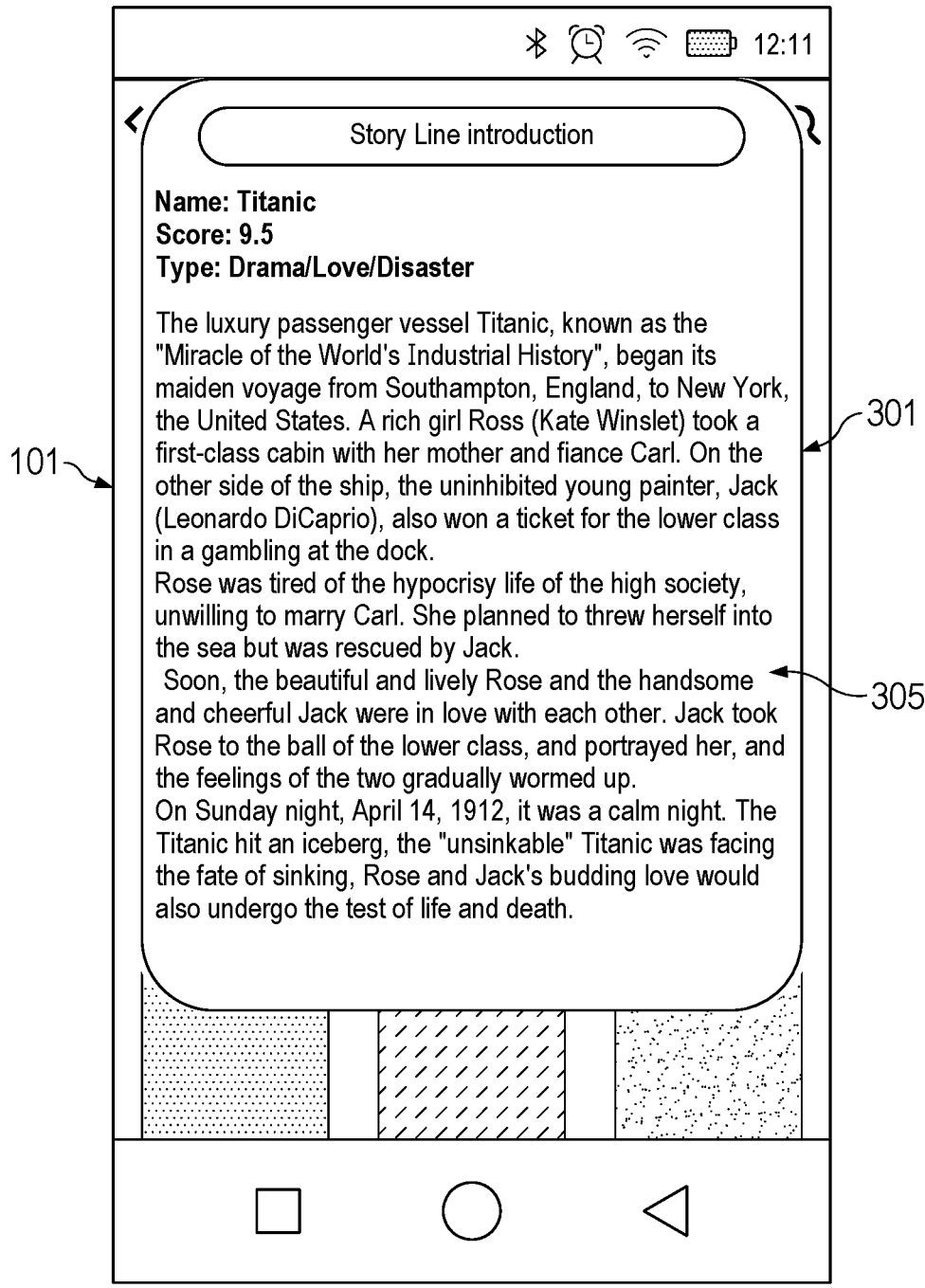
FIG. 4C is a schematic diagram of floating windows according to an embodiment of this application.

In another implementation, as shown in FIG. 4C, the floating window 301 may include only a text display area 305. Text information used to introduce "Titanic" is displayed in the text display area 305. That is, the video introduction information corresponding to "Titanic" may include only the text information.

Not limited to those shown in FIG. 4A to FIG. 4C, the floating window 301 may further include an audio play area, for example, a voice bar. Voice information used to introduce the target video (for example, a story line of the target video) is played in the audio play area. Further, the voice information may be a pre-recorded speech for introducing the target video.

As shown in FIG. 4A to FIG. 4C, the floating window may be translucent, and a size of the floating window may be smaller than that of the poster browsing page 101. In this application, the floating window 301 may be referred to as a first window. Not limited thereto, the first window may be alternatively displayed with another display effect. This is not limited in this application.

Figure 5:
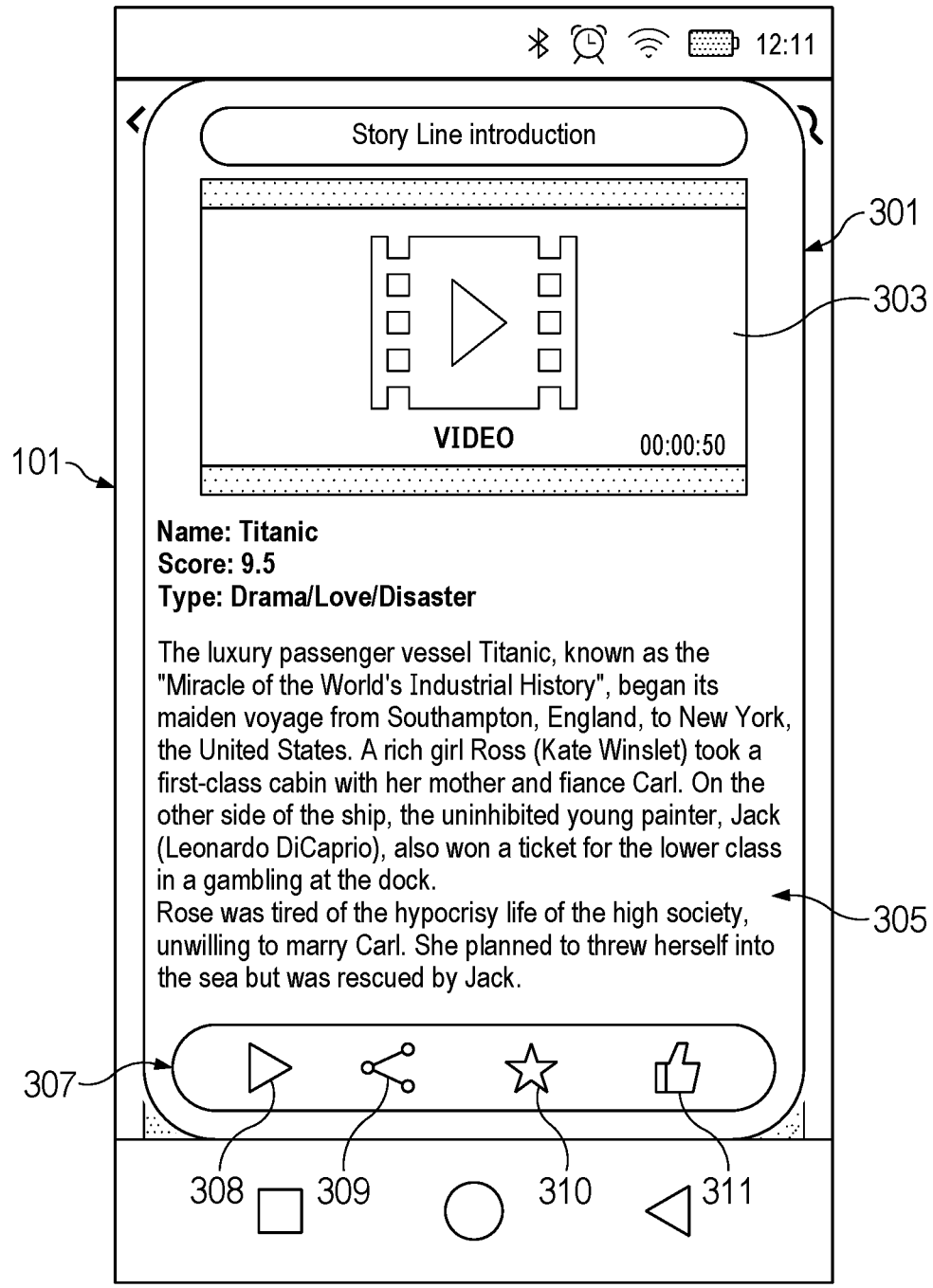
FIG. 5 is a schematic diagram of another floating window according to an embodiment of this application.

Further, as shown in FIG. 5, the floating window 301 may further include at least one of a play control 308, a share control 309, a favorites control 310, and a rating control 311. The play control 308 is used to receive a user operation that is input by the user for playing the target video. The share control 309 is used to receive a user operation that is input by the user for sharing the target video. The favorites control 310 is used to receive a user operation that is input by the user for adding the target video to favorites. The rating control 311 is used to receive a user operation that is input by the user for commenting on the target video.

As shown in FIG. 5, the controls (the play control 308, the share control 309, the favorites control 310, and the rating control 311) may be centrally displayed in an interaction area 307 of the floating window 301. Optionally, not limited to that shown in FIG. 5, the controls may be alternatively displayed in another page layout pattern. This is not limited in this application.

The following describes in detail a human-computer interaction process related to the controls using FIG. 6A to FIG. 6H.

Figure 6A:
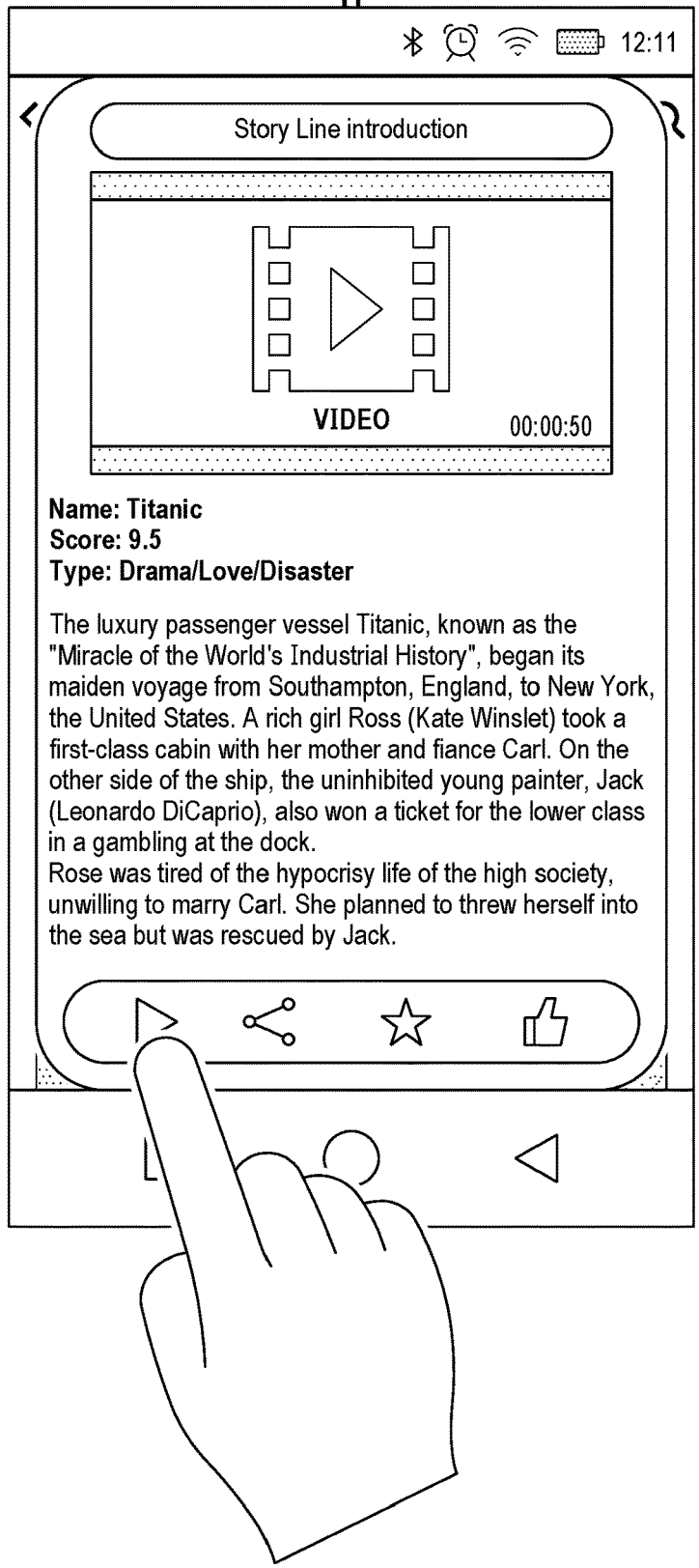
FIG. 6A is a schematic diagram of a human-computer interaction embodiment related to the floating window shown in FIG. 5.
Figure 6B:
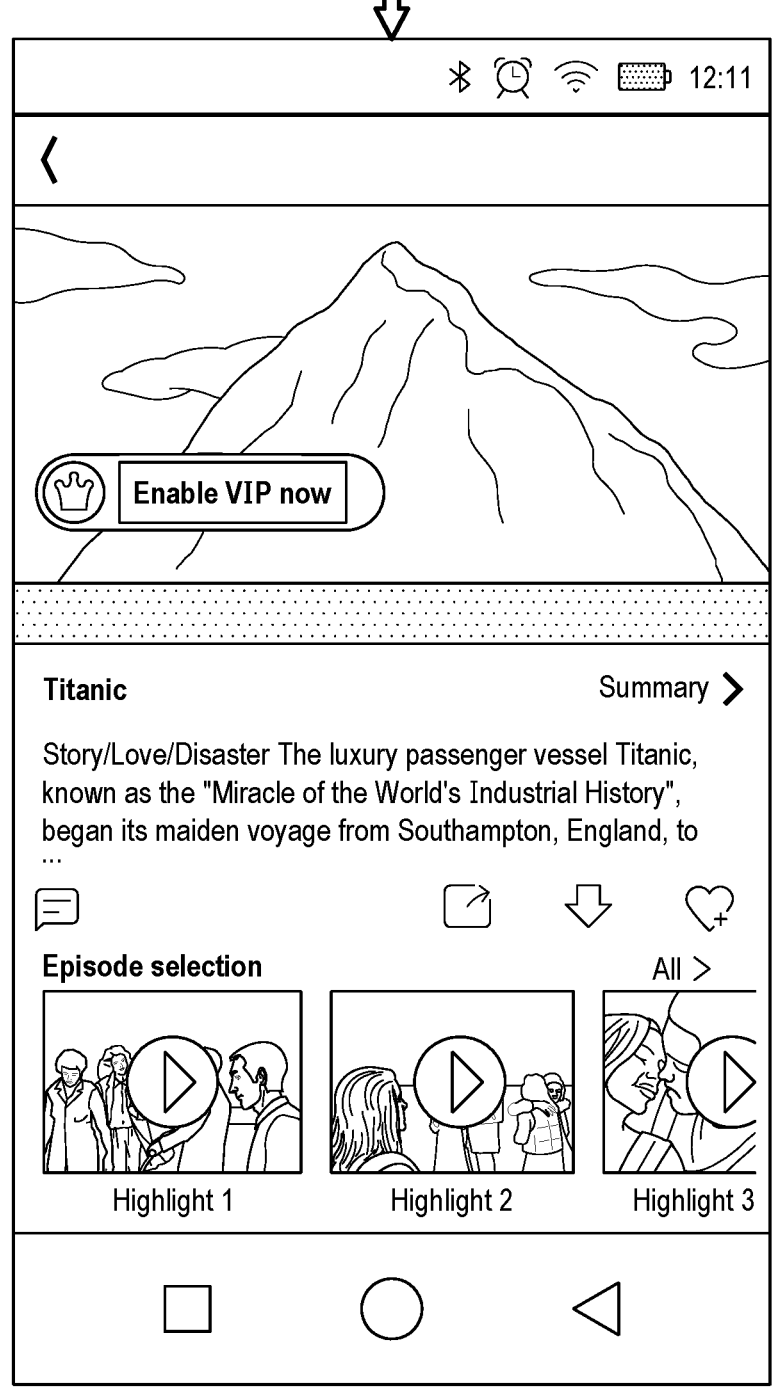
FIG. 6B is a schematic diagram of a human-computer interaction embodiment related to the floating window shown in FIG. 5.

(1) As shown in FIG. 6A and FIG. 6B, in the floating window 301, when detecting a tap operation on the play control 308, the system may close the floating window 301, open (or jump to) the video details page 103, and play the target video on the video details page 103.

It can be learned from FIG. 6A and FIG. 6B that after learning of the target video based on the video introduction information displayed in the floating window 301, if the user is interested in the target video, the user may tap the play control 308 to directly jump to the video details page 103 to watch the target video. This greatly simplifies an entire user operation process of determining, by the user, whether to watch the video. User experience is better. It can be understood that in an existing video play application, the user can learn of the target video only after accessing the video details page 103 to watch the target video for a period of time or after opening a summary (tapping the button 203 ("Summary")), and then the user can determine whether to watch (or continue watching) the target video. A user operation is quite complex and inefficient.

Figure 6C:
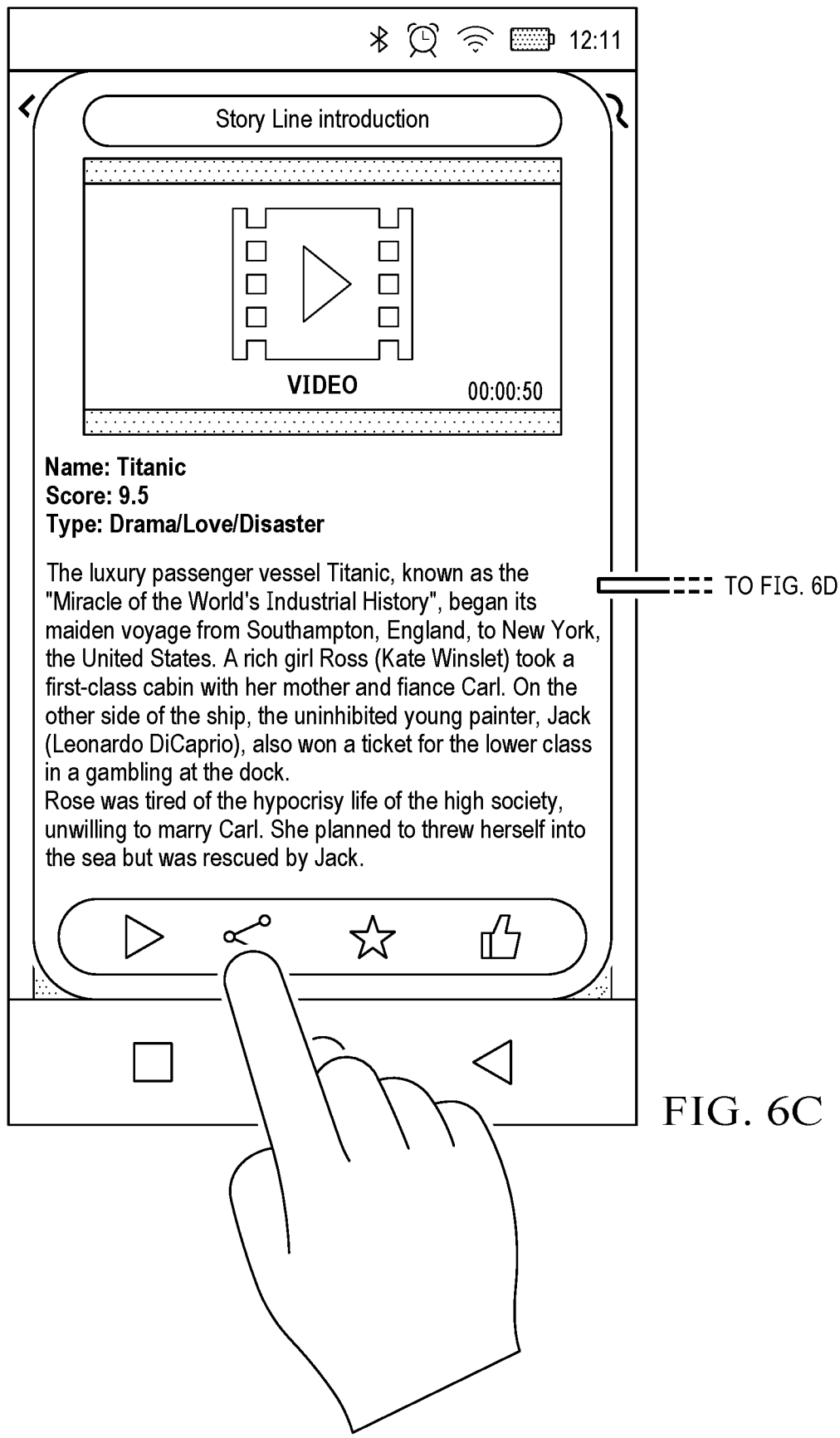
FIG. 6C is a schematic diagram of a human-computer interaction embodiment related to the floating window shown in FIG. 5.
Figure 6D:
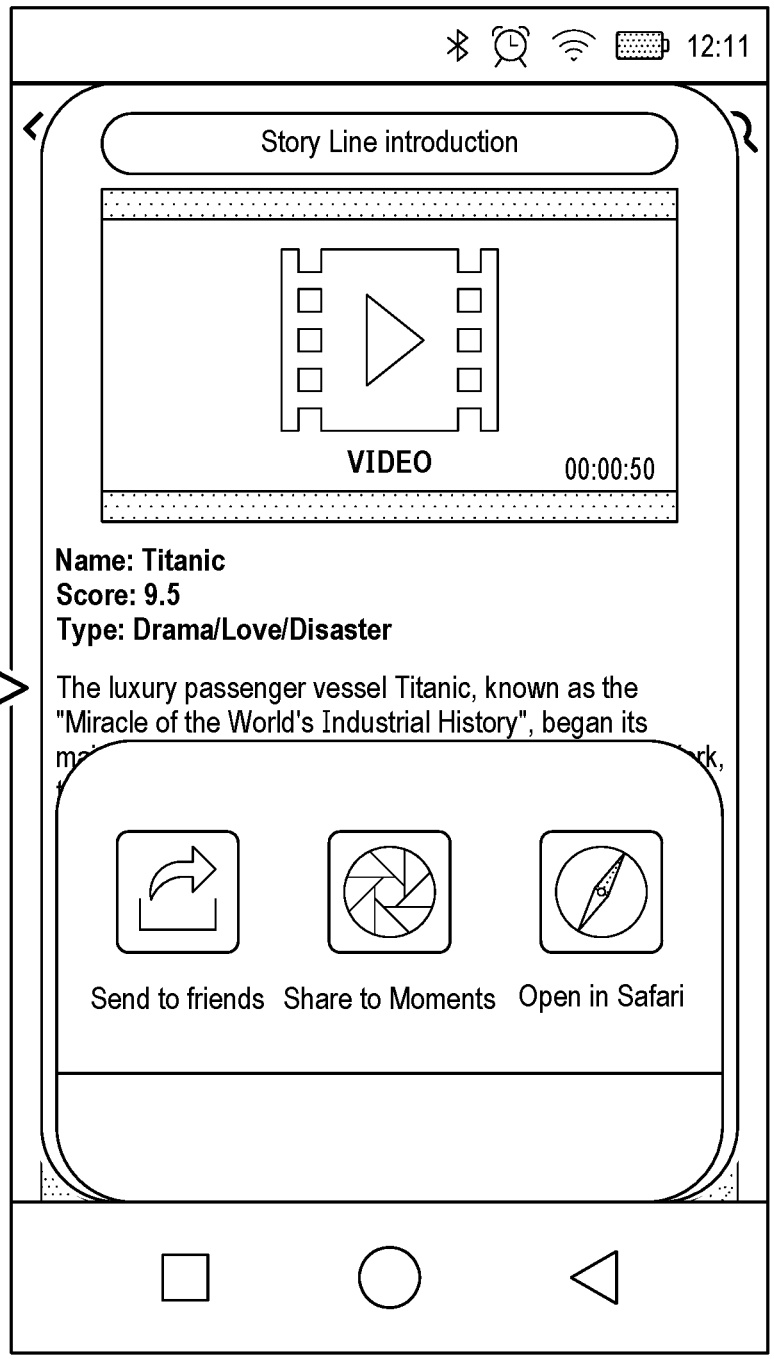
FIG. 6D is a schematic diagram of a human-computer interaction embodiment related to the floating window shown in FIG. 5.

(2) As shown in FIG. 6C and FIG. 6D, in the floating window 301, when detecting a tap operation on the share control 309, the system may display a video share window 312 in a suspended manner in the floating window 301. The video share window 312 may provide a plurality of sharing manners, and may support the user in sharing the target video to different platforms or social objects.

Not limited to that shown in FIG. 6C and FIG. 6D, when detecting a tap operation on the share control 309, the system may alternatively close the floating window 301 and open (or jump to) a video share page. An interaction manner for video sharing is not limited in this application.

It can be learned from FIG. 6C and FIG. 6D that after learning of the target video based on the video introduction information displayed in the floating window 301, if the user is interested in the target video, the user may tap the share control 309 to share the target video. This greatly simplifies an entire user operation process of determining, by the user, whether to share the target video. User experience is better. It can be understood that in an existing video play application, the user can learn of the target video only after accessing the video details page 103 to watch the target video for a period of time or after opening a summary (tapping the button 203 ("Summary")), and then the user can determine whether to share the target video. A user operation is quite complex and inefficient.

Figure 6E:
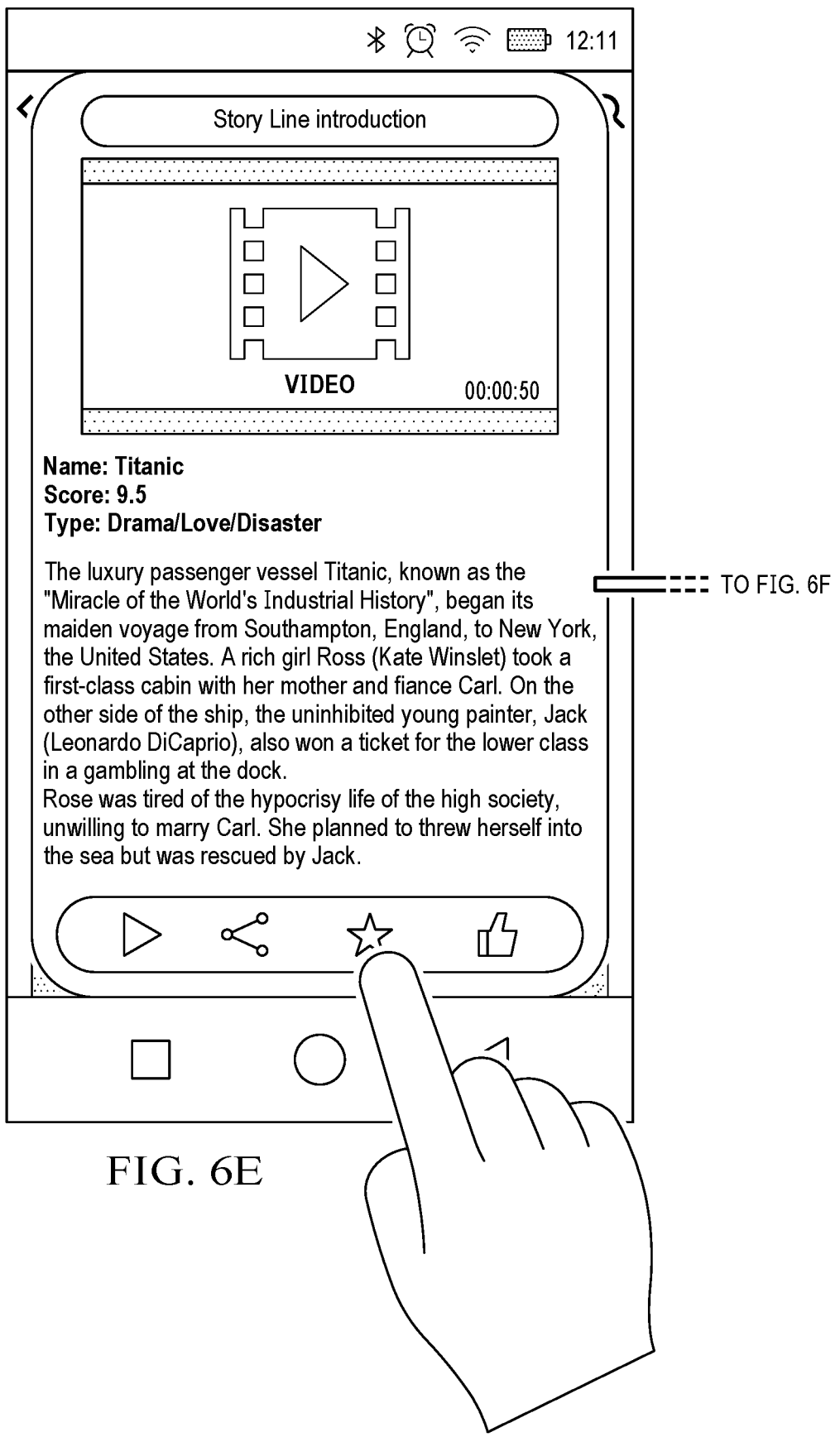
FIG. 6E is a schematic diagram of a human-computer interaction embodiment related to the floating window shown in FIG. 5.
Figure 6F:
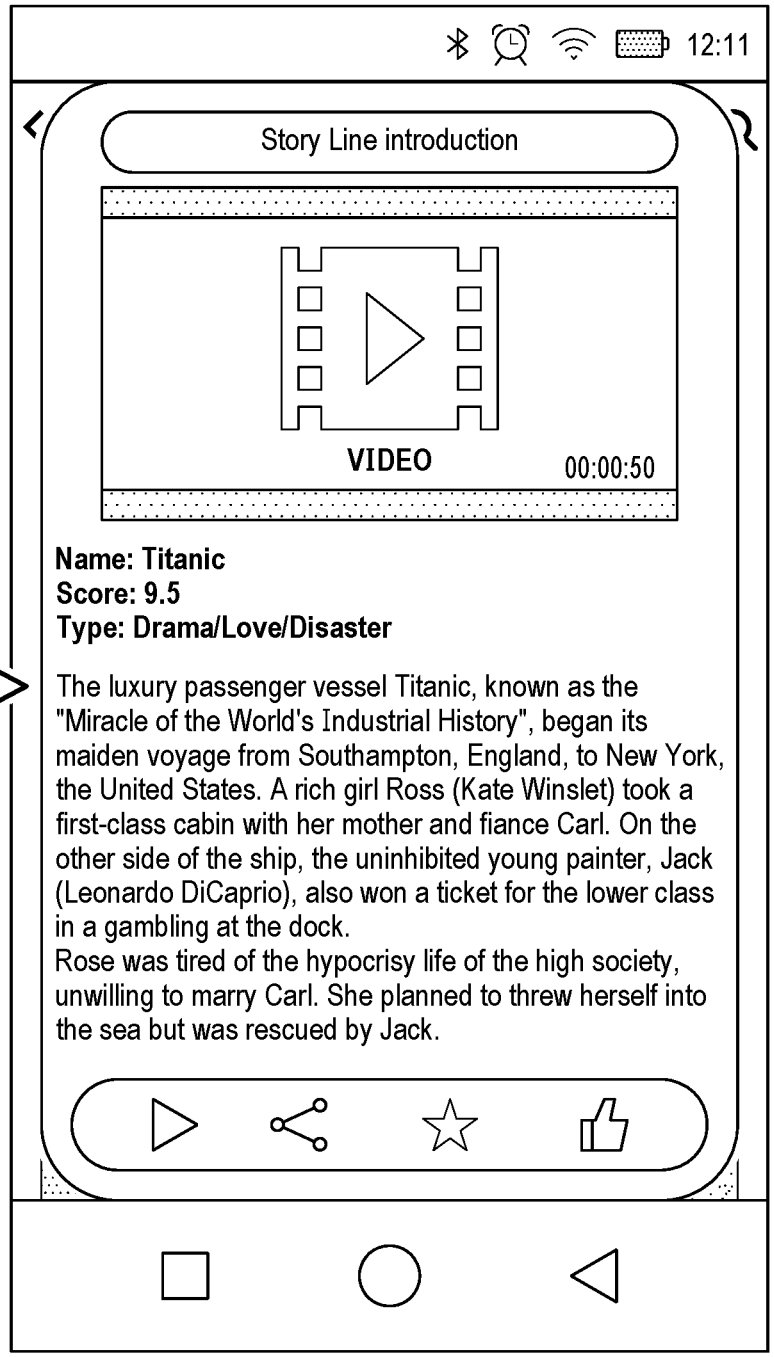
FIG. 6F is a schematic diagram of a human-computer interaction embodiment related to the floating window shown in FIG. 5.

(3) As shown in FIG. 6E and FIG. 6F, in the floating window 301, when detecting a tap operation on the favorites control 310, the system may set a display state of the favorites control 310 in the floating window 301 to a first display state, for example, a highlighted state. Herein, the first display state may be used to indicate that the user has added the target video to favorites. Not limited to that shown in FIG. 6E and FIG. 6F, the first display state may be alternatively another display state. This is not limited in this application.

It can be learned from FIG. 6E and FIG. 6F that after learning of the story line of the target video based on the video introduction information displayed in the floating window 301, if the user is interested in the target video, the user may tap the favorites control 310 to add the target video to favorites. This greatly simplifies an entire user operation process of determining, by the user, whether to add the target video to favorites. User experience is better. It can be understood that in an existing video play application, the user can learn of the target video only after accessing the video details page 103 to watch the target video for a period of time or after opening a summary (tapping the button 203 ("Summary")), and then the user can determine whether to add the target video to favorites. A user operation is quite complex and inefficient.

Figure 6G:
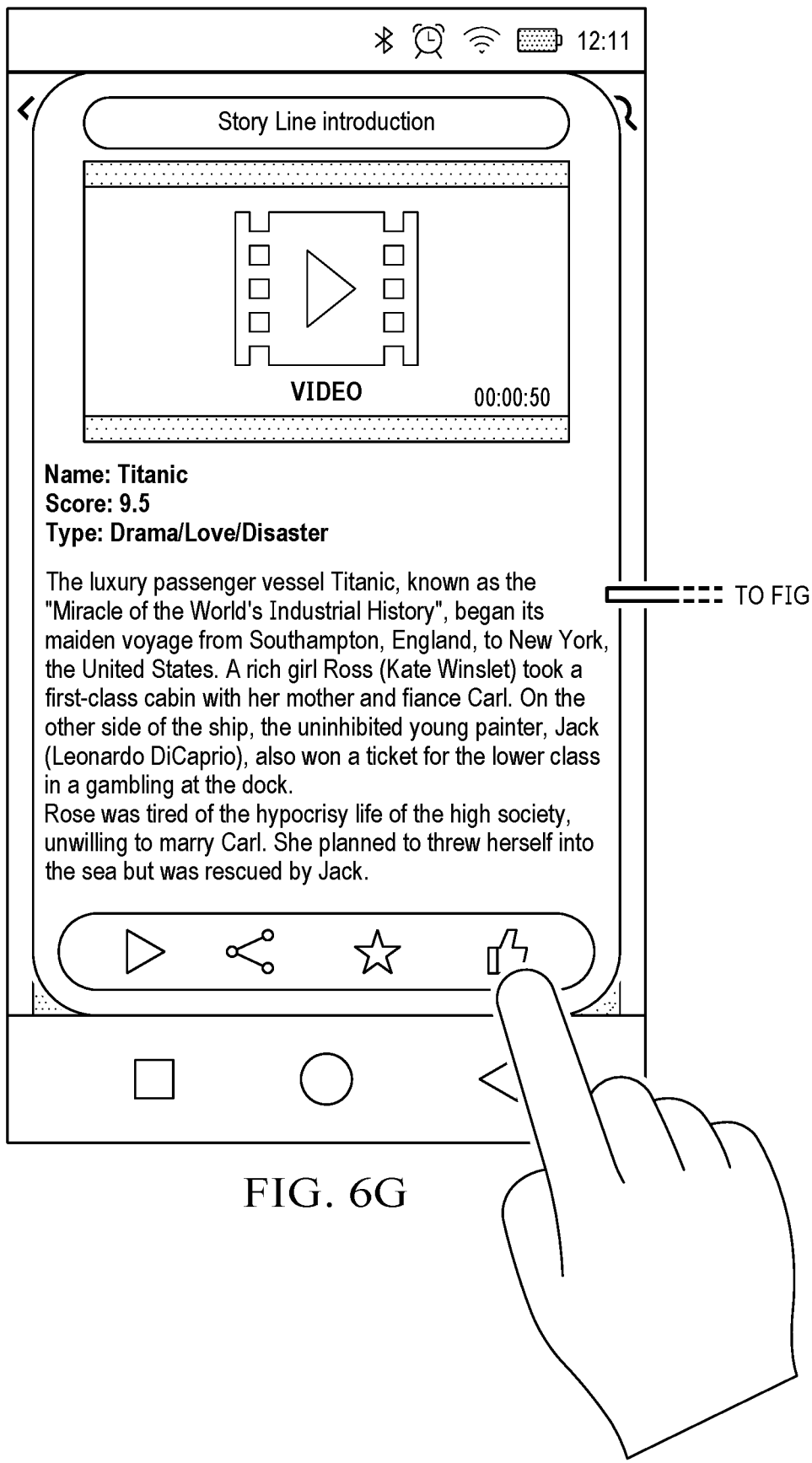
FIG. 6G is a schematic diagram of a human-computer interaction embodiment related to the floating window shown in FIG. 5.
Figure 6H:
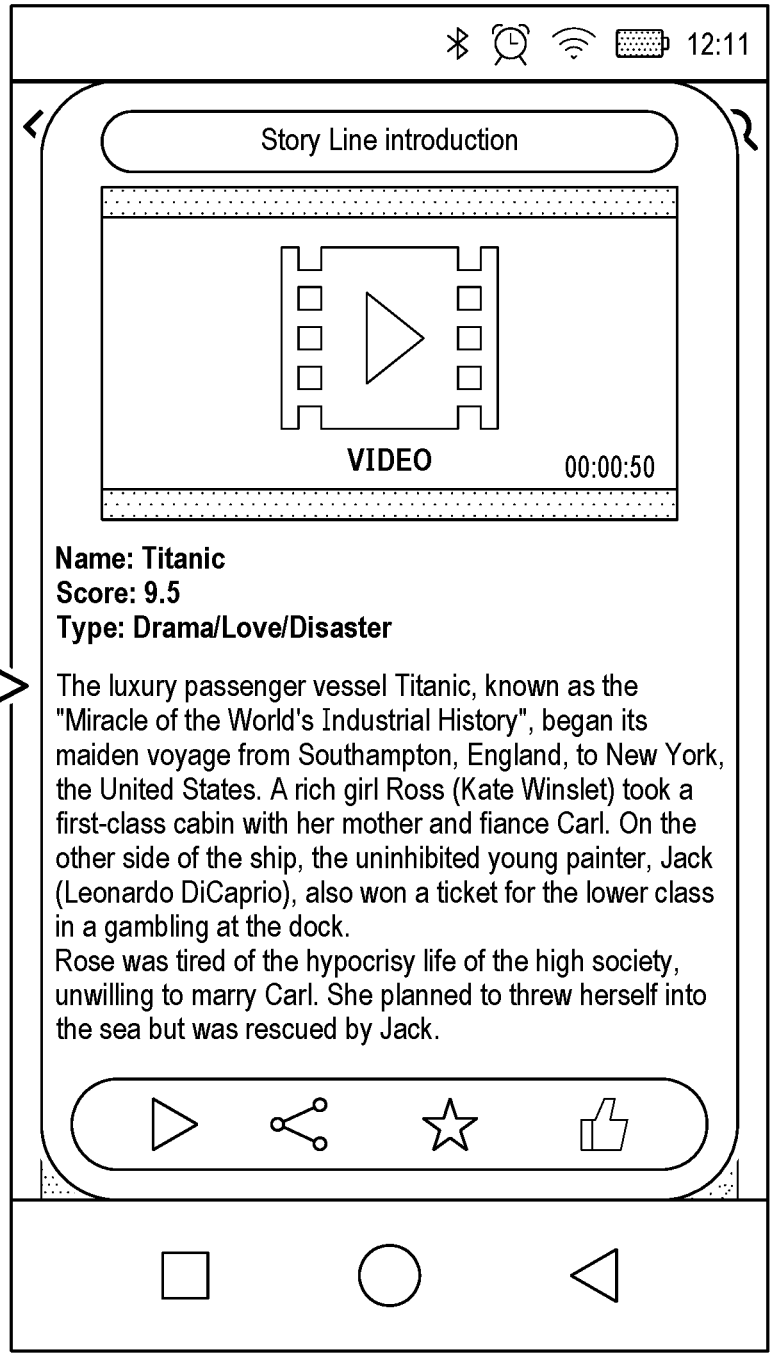
FIG. 6H is a schematic diagram of a human-computer interaction embodiment related to the floating window shown in FIG. 5.

(4) As shown in FIG. 6G and FIG. 6H, in the floating window 301, when detecting a tap operation on the rating control 311, the system may set a display state of the rating control 311 in the floating window 301 to a second display state, for example, a highlighted state. Herein, the second display state may be used to indicate a comment of the user on the target video. Not limited to that shown in FIG. 6G and FIG. 6H, the second display state may be alternatively another display state. This is not limited in this application.

Optionally, the rating control 311 may receive only a positive or negative comment, or may receive a comment in a form of a score or a rating (for example, "five stars"). An interaction manner related to the rating control 311 is not limited in this application.

It can be learned from FIG. 6G and FIG. 6H that after learning of the story line of the target video based on the video introduction information displayed in the floating window 301, if the user is interested in the target video, the user may tap the rating control 311 to comment on the target video. This greatly simplifies an entire user operation process of commenting, by the user, on the target video. User experience is better. It can be understood that in an existing video play application, the user can learn of the target video only after accessing the video details page 103 to watch the target video for a period of time or after opening a summary (tapping the button 203 ("Summary")), and then the user can determine how to comment on the target video. A user operation is quite complex and inefficient.

Not limited to the tap operation acting on the controls in FIG. 6A and FIG. 6B to FIG. 6G and FIG. 6H, the user operation acting on the play control 308 (or the share control 309, or the favorites control 310, or the rating control 311) may alternatively include a touch and hold operation, a double-tap operation, or the like. Not limited to a touch operation, the user operation acting on the play control 308 (or the share control 309, or the favorites control 310, or the rating control 311) may be alternatively a motion sensing operation on the control, without direct contact with the touchscreen. Further, the motion sensing operation may be captured by a motion sensor.

It can be understood that the floating window 301 includes the controls (the play control 308, the share control 309, the favorites control 310, and the rating control 311) in the interaction area 307 such that the user can quickly perform a subsequent operation related to the target video.

Not limited to those shown in FIG. 5, and FIG. 6A to FIG. 6H, the floating window 301 may further include another type of button used to provide another type of interaction function. This is not limited in this application.

To help the user quickly learn of story lines of a plurality of videos at a time, the floating window 301 provided in this application may be alternatively a three-dimensional floating window. The three-dimensional floating window includes a plurality of pages. The user may switch between the plurality of pages for display on the screen of a display of the terminal. One page is used to display video introduction information corresponding to one video. The user can continuously browse video introduction information respectively corresponding to a plurality of videos. Detailed descriptions are provided below with reference to accompanying drawings.

Figure 7A:
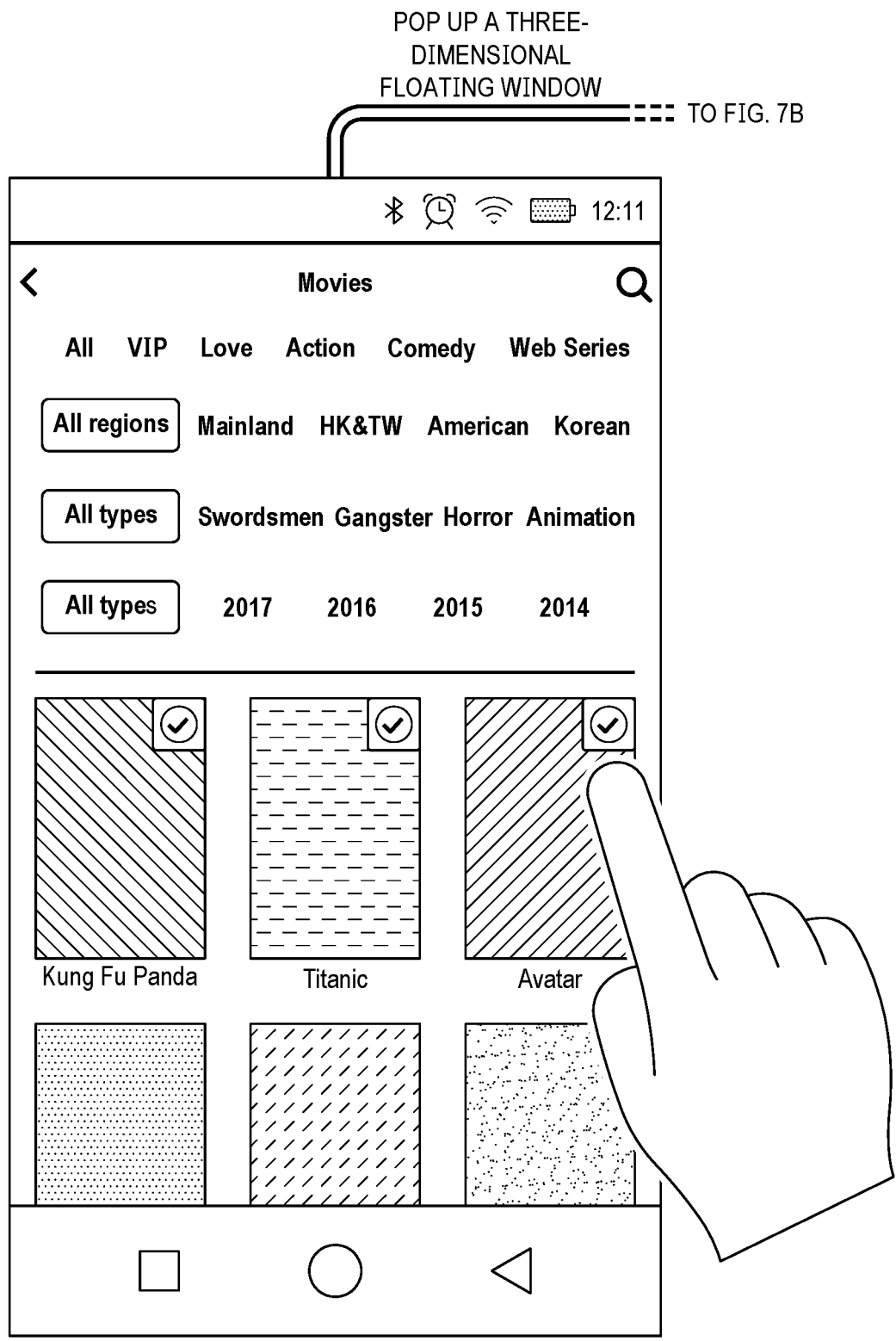
FIG. 7A is a schematic diagram of another human-computer interaction embodiment according to this application.
Figure 7B:
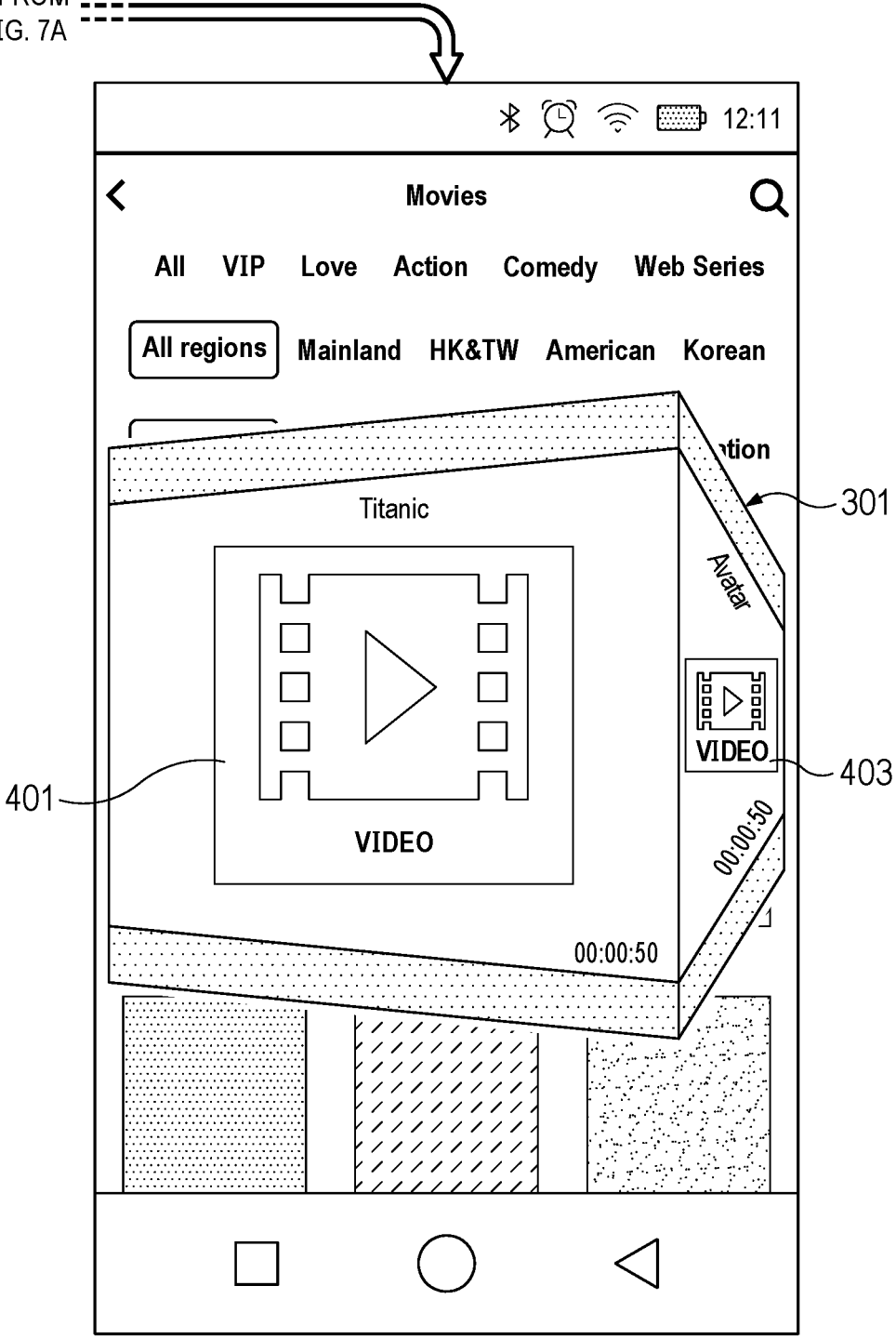
FIG. 7B is a schematic diagram of another human-computer interaction embodiment according to this application.

FIG. 7A and FIG. 7B show an example of a three-dimensional floating window 301 according to this application. In the example of FIG. 7A and FIG. 7B, target videos may be videos respectively represented by a plurality of posters selected by a user: a video "Kung Fu Panda", a video "Titanic", and a video "Avatar".

As shown in FIG. 7A and FIG. 7B, on a poster browsing page 101, when detecting a user operation for selecting the plurality of posters (a poster of the video "Kung Fu Panda", a poster of the video "Titanic", and a poster of the video "Avatar"), a system may display in a suspended manner (or pop up) the three-dimensional floating window 301 on the poster browsing page 101. The three-dimensional floating window 301 may include a plurality of pages. The plurality of pages may be used to respectively display video introduction information corresponding to the target videos (that is, the videos respectively represented by the plurality of posters continuously selected by the user).

In addition, the system may display at least one of the plurality of pages on a screen. A page that is in the at least one page and that is primarily displayed on the screen may be referred to as a current page of the three-dimensional floating window 301. Herein, "a page primarily displayed on the screen" is a page that is in the plurality of pages of the three-dimensional floating window 301 and that occupies a largest display area on the screen. Optionally, in addition to the current page, the system may further display a page after (or before) the current page, for example, a next (or previous) page, on the screen.

For example, as shown in FIG. 7A and FIG. 7B, the three-dimensional floating window 301 includes three pages: a page 401, a page 403, and a page 405. The page 401 is used to display video introduction information corresponding to the video "Titanic". The page 403 is used to display video introduction information corresponding to the video "Avatar". The page 405 is used to display video introduction information corresponding to the video "Kung Fu Panda". The system displays two of the three pages on the screen: the page 401 and the page 403. The page 401 is a current page of the three-dimensional floating window 301, the page 403 is a next page of the current page, and the next page is displayed on the right of the current page. This can not only help the user learn of the video introduction information that is corresponding to the video "Titanic" and that is displayed on the current page, but also prompt the user that the user can slide leftwards on the three-dimensional floating window 301 to browse the video introduction information that is corresponding to the video "Avatar" and that is displayed on the next page (that is, the page 403). User experience is better.

Figure 7C:
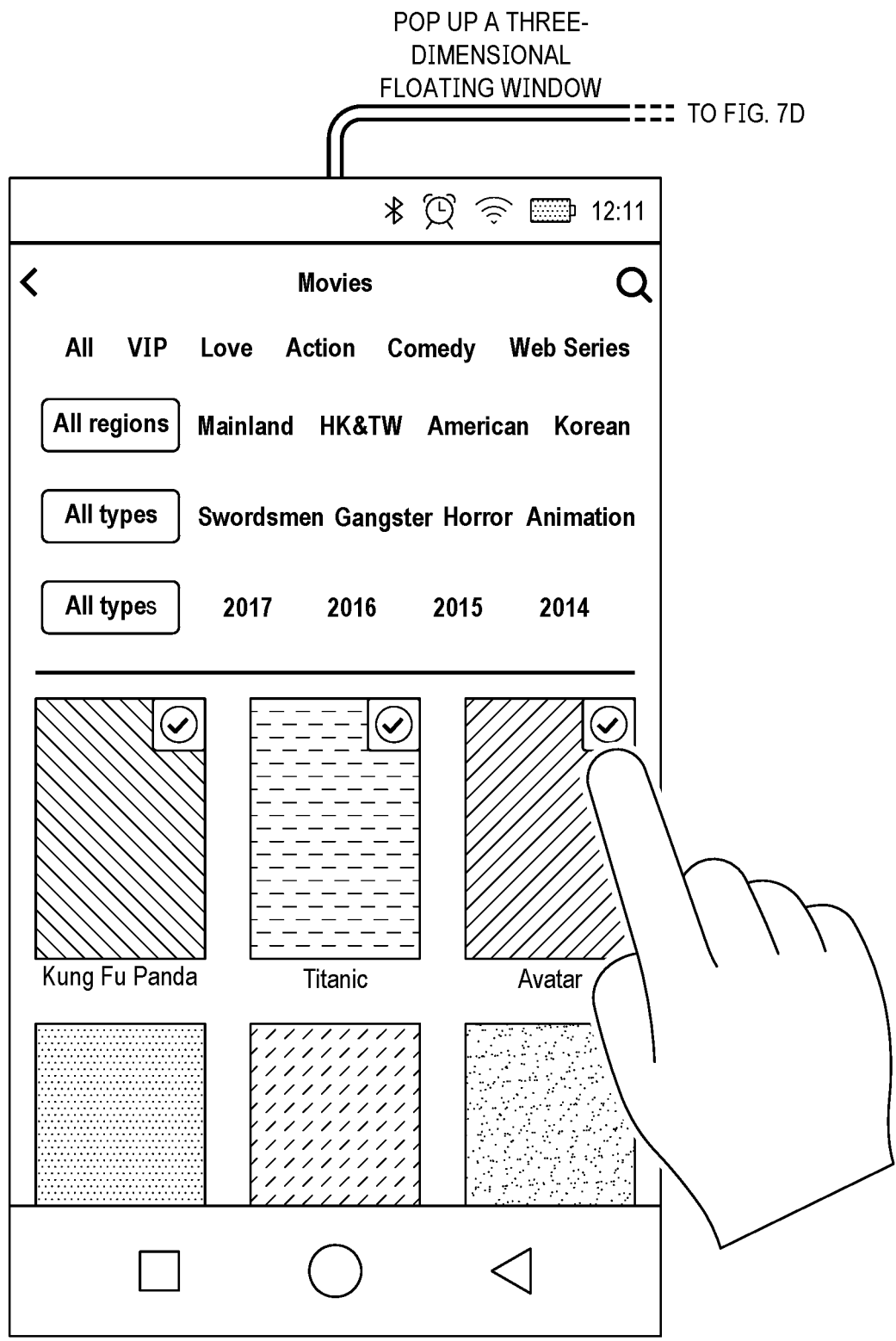
FIG. 7C is a schematic diagram of another human-computer interaction embodiment according to this application.
Figure 7D:
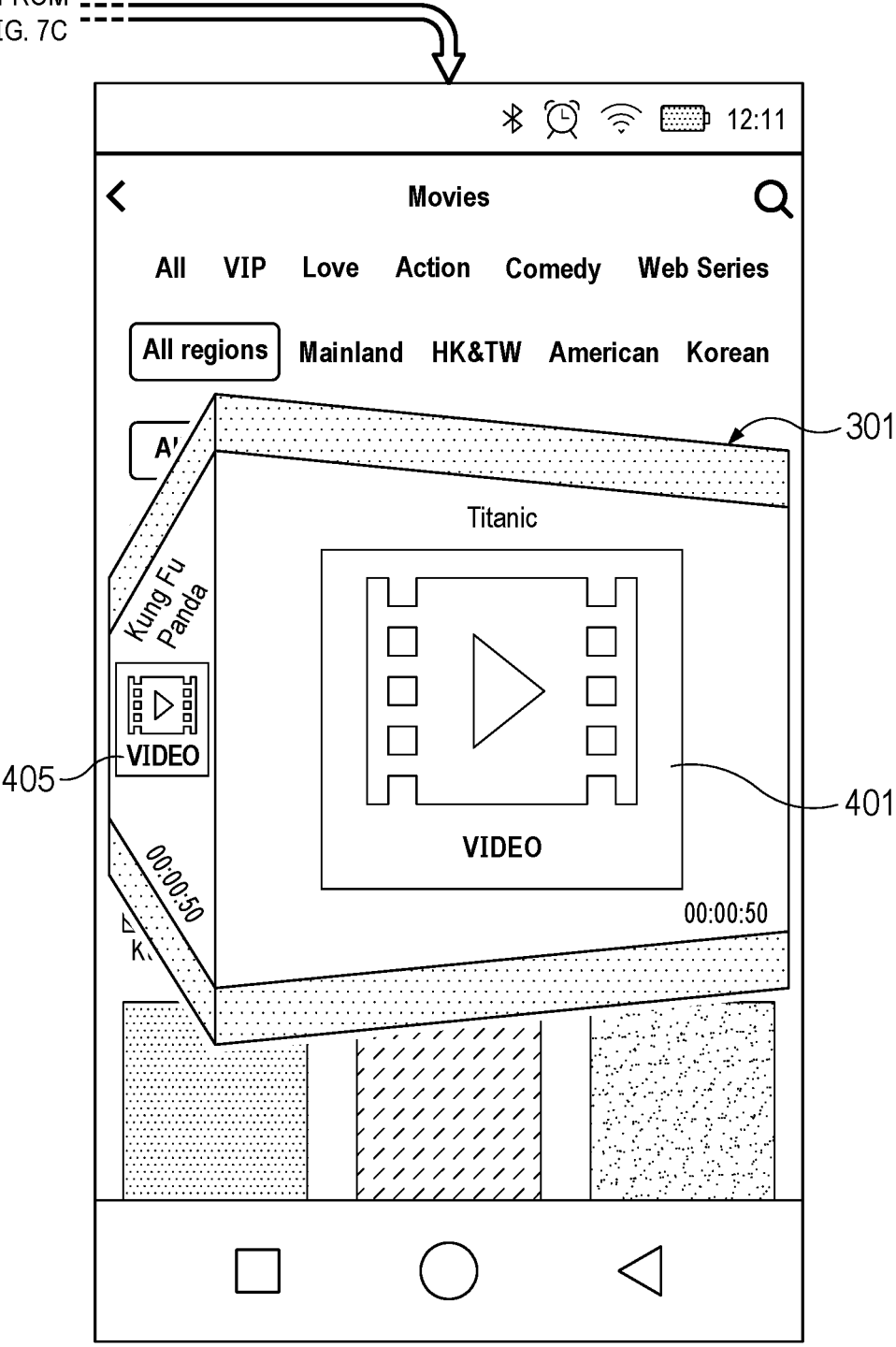
FIG. 7D is a schematic diagram of another human-computer interaction embodiment according to this application.

Not limited to that shown in FIG. 7A and FIG. 7B, the system may alternatively display a current page and a previous page of the three-dimensional floating window 301 on the screen. As shown in FIG. 7C and FIG. 7D, the page 401 is a current page of the three-dimensional floating window 301, the page 405 is a previous page of the current page, and the previous page is displayed on the left of the current page. In actual application, alternatively, a page displayed on the right of a current page may be referred to as a previous page, and a page displayed on the left of the current page may be referred to as a next page. This is not limited in this application.

Not limited to those shown in FIG. 7A to FIG. 7D, the system may alternatively display a current page, a next page, and a previous page of the three-dimensional floating window 301 on the screen. Not limited to those shown in FIG. 7A to FIG. 7D, the system may display only a part but not the whole of the next (or previous) page of the current page on the screen.

A page included in the three-dimensional floating window 301 shown in FIG. 7A to FIG. 7D is shown in FIG. 4B. To be specific, video introduction information displayed on the page includes only image information (for example, a short video). Not limited thereto, a page included in the three-dimensional floating window 301 may be alternatively shown in FIG. 4A. To be specific, video introduction information displayed on the page may alternatively include both image information and text information. A page included in the three-dimensional floating window 301 may be alternatively shown in FIG. 5. To be specific, the three-dimensional floating window 301 further includes an interaction area 307. A page included in the three-dimensional floating window 301 may be alternatively shown in FIG. 4C. To be specific, video introduction information displayed on the page may alternatively include only text information.

An arrangement form for displaying the plurality of pages included in the three-dimensional floating window 301 shown in FIG. 7A to FIG. 7D is as follows. The plurality of pages are respectively arranged on N sides of a prism. Not limited thereto, the plurality of pages included in the three-dimensional floating window 301 may be alternatively displayed in another arrangement form. For example, the plurality of pages included in the three-dimensional floating window 301 may be arranged on a circumference surface of a cylinder. For another example, the plurality of pages included in the three-dimensional floating window 301 may be displayed in an arrangement form of dominoes. The examples are merely some embodiments provided in this application, and constitute no limitation on the technical solutions of this application. In actual application, other different arrangement forms may be used.

The following describes a human-computer interaction process related to the three-dimensional floating window 301. The three-dimensional floating window 301 may further receive a page switching operation of the user. The operation may be used to switch a current page of the three-dimensional floating window 301. In this application, the page switching operation may be referred to as a second input.

FIG. 8A to FIG. 8D show an example of a page switching operation. The page switching operation may be used to switch a next page as a current page of the three-dimensional floating window 301.

It is assumed that before the page switching operation is received, a current page of the three-dimensional floating window 301 is the page 401, and a next page, that is, the page 403 of the current page is displayed on the right of the current page. In this case, the current page displays the video introduction information corresponding to "Titanic", and the next page of the current page displays the video introduction information corresponding to "Avatar".

Figure 8A:
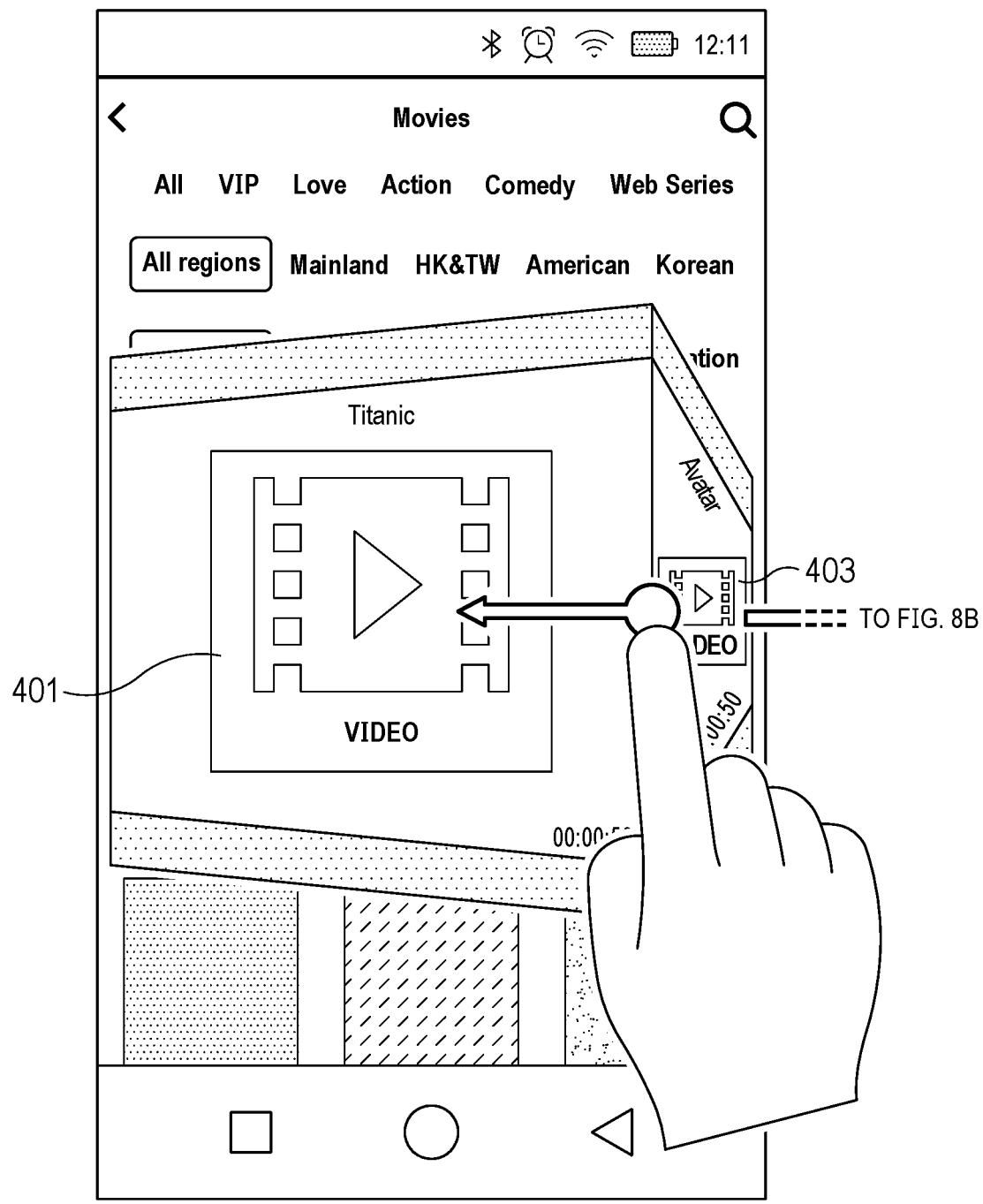
FIG. 8A is a schematic diagram of a human-computer interaction embodiment related to a three-dimensional floating window shown in FIG. 7A and FIG. 7B.
Figure 8B:
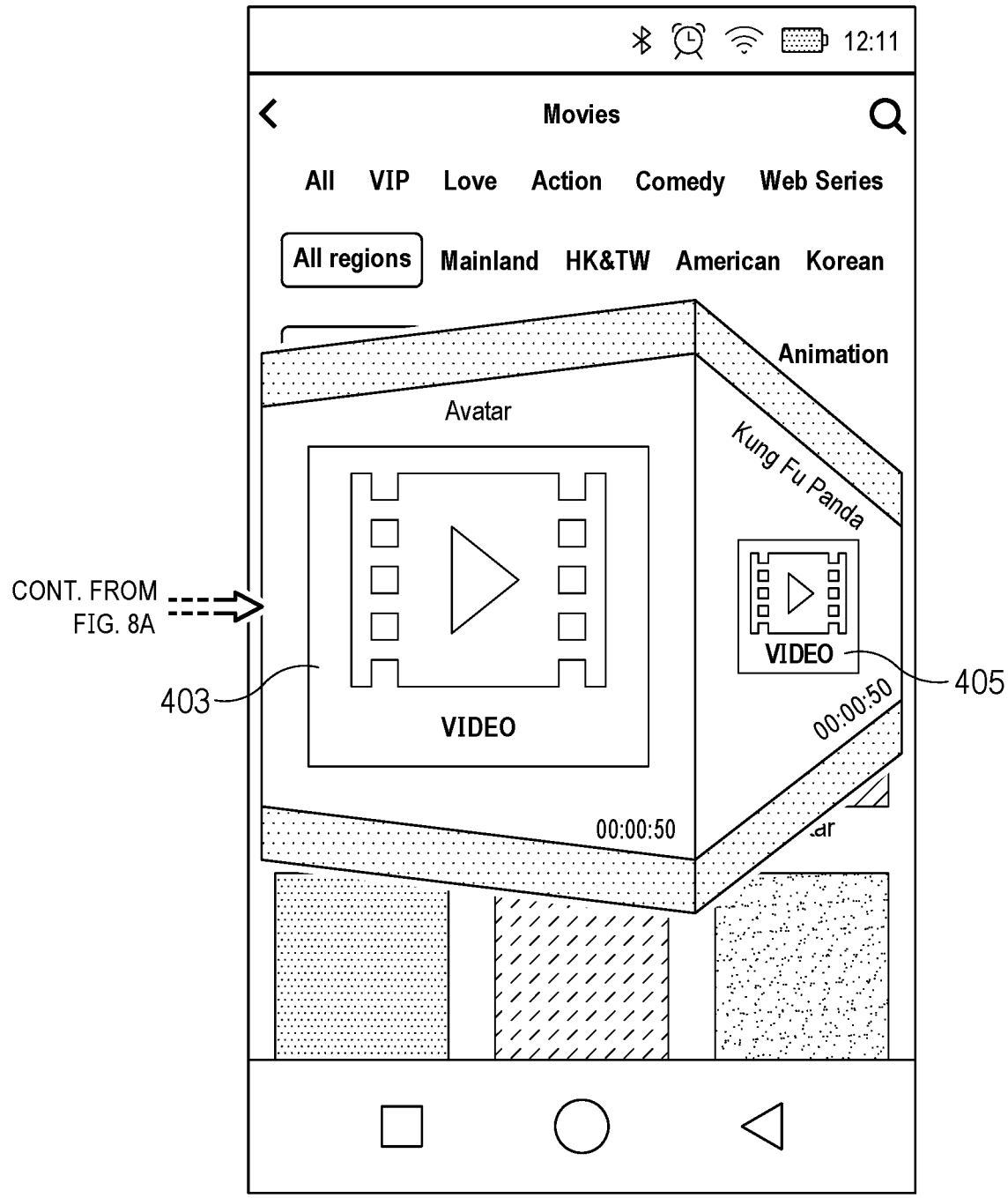
FIG. 8B is a schematic diagram of a human-computer interaction embodiment related to a three-dimensional floating window shown in FIG. 7A and FIG. 7B.

As shown in FIG. 8A and FIG. 8B, when detecting a left sliding operation acting on the three-dimensional floating window 301, the system may switch the page 403 as a current page of the three-dimensional floating window 301, and display, on the right of the current page, a next page, that is, the page 405 of the current page (that is, the page 403). In this case, the current page displays the video introduction information corresponding to "Avatar", and the next page of the current page displays the video introduction information corresponding to "Kung Fu Panda".

Figure 8C:
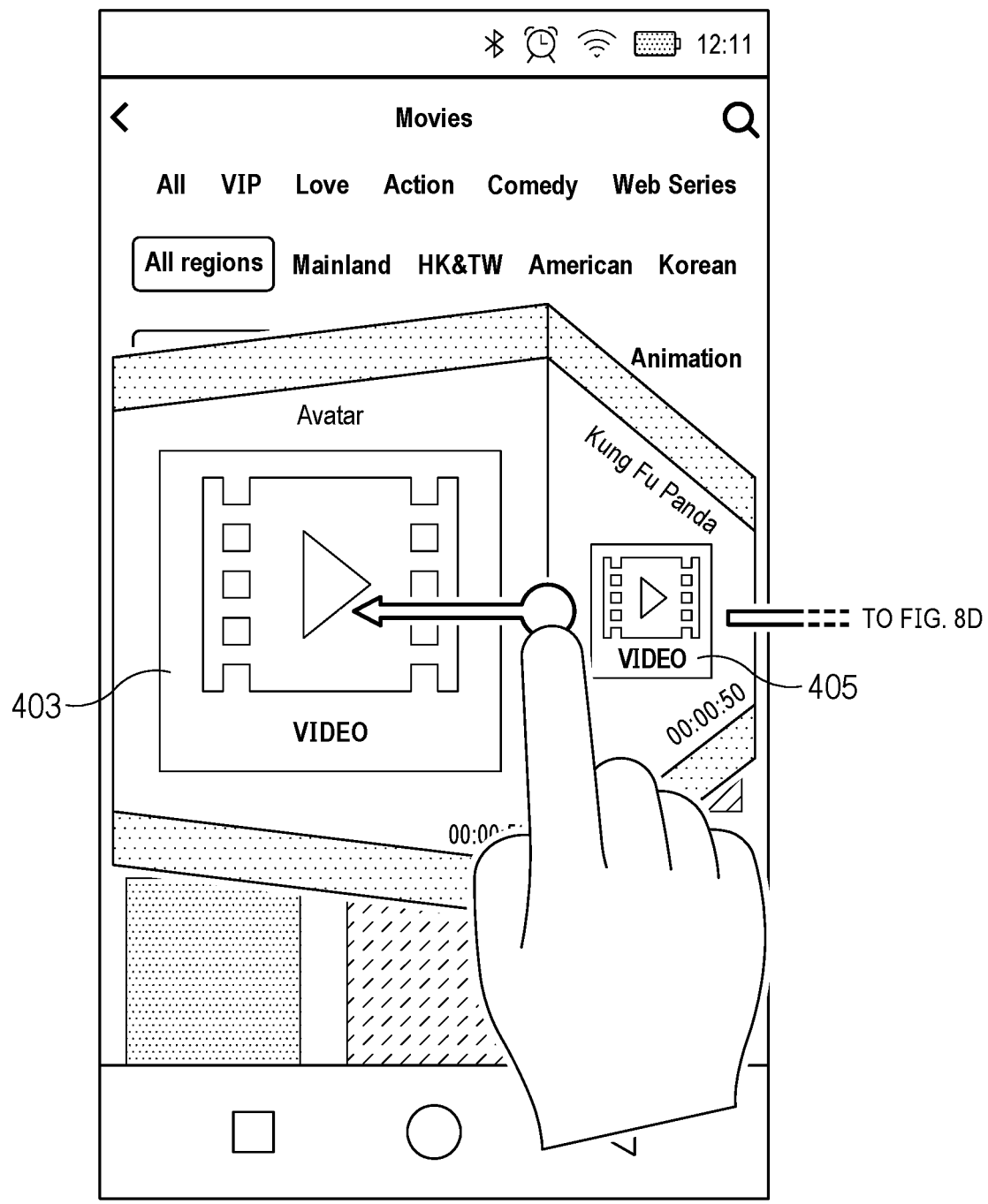
FIG. 8C is a schematic diagram of a human-computer interaction embodiment related to a three-dimensional floating window shown in FIG. 7A and FIG. 7B.
Figure 8D:
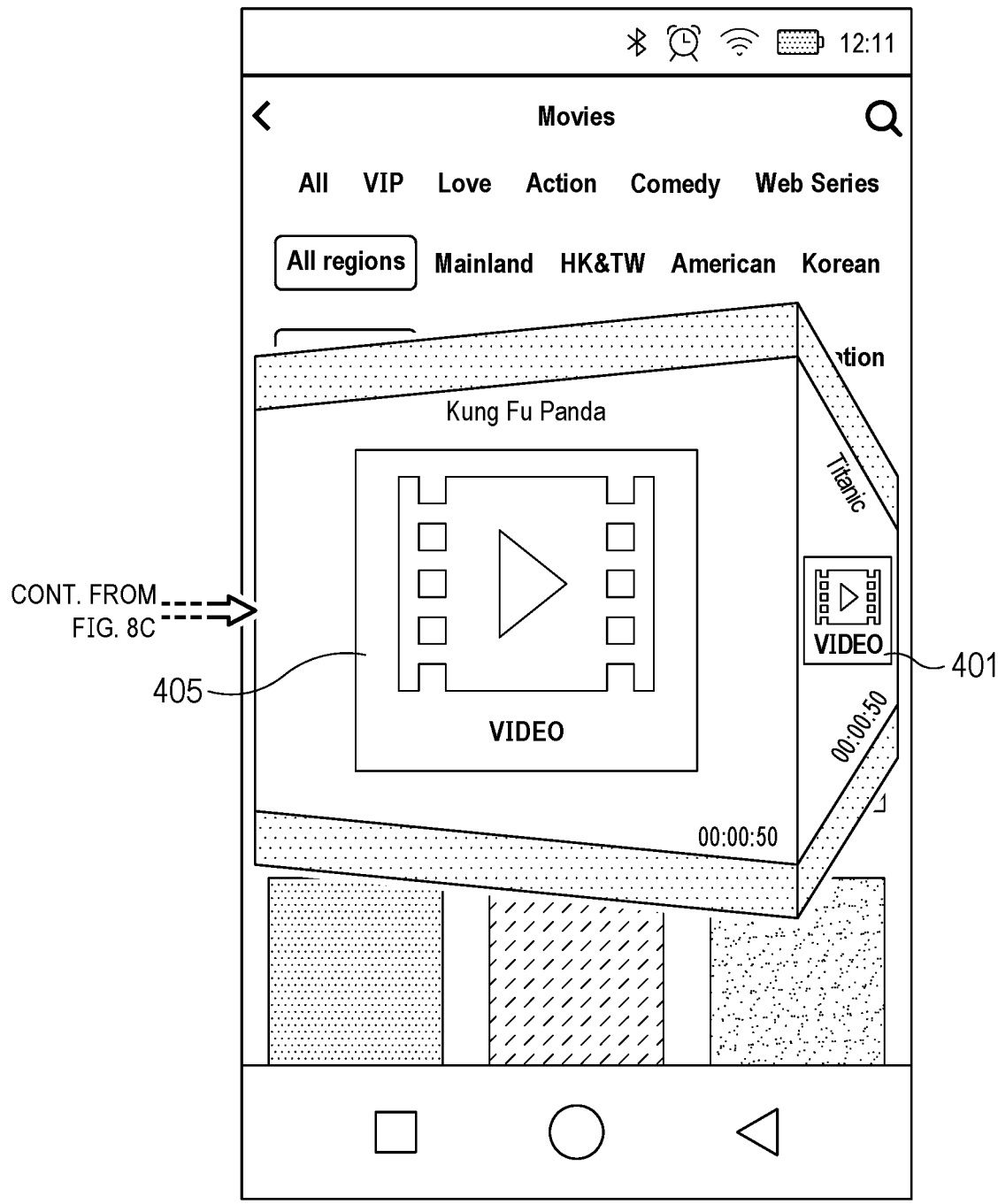
FIG. 8D is a schematic diagram of a human-computer interaction embodiment related to a three-dimensional floating window shown in FIG. 7A and FIG. 7B.
Figure 9A:
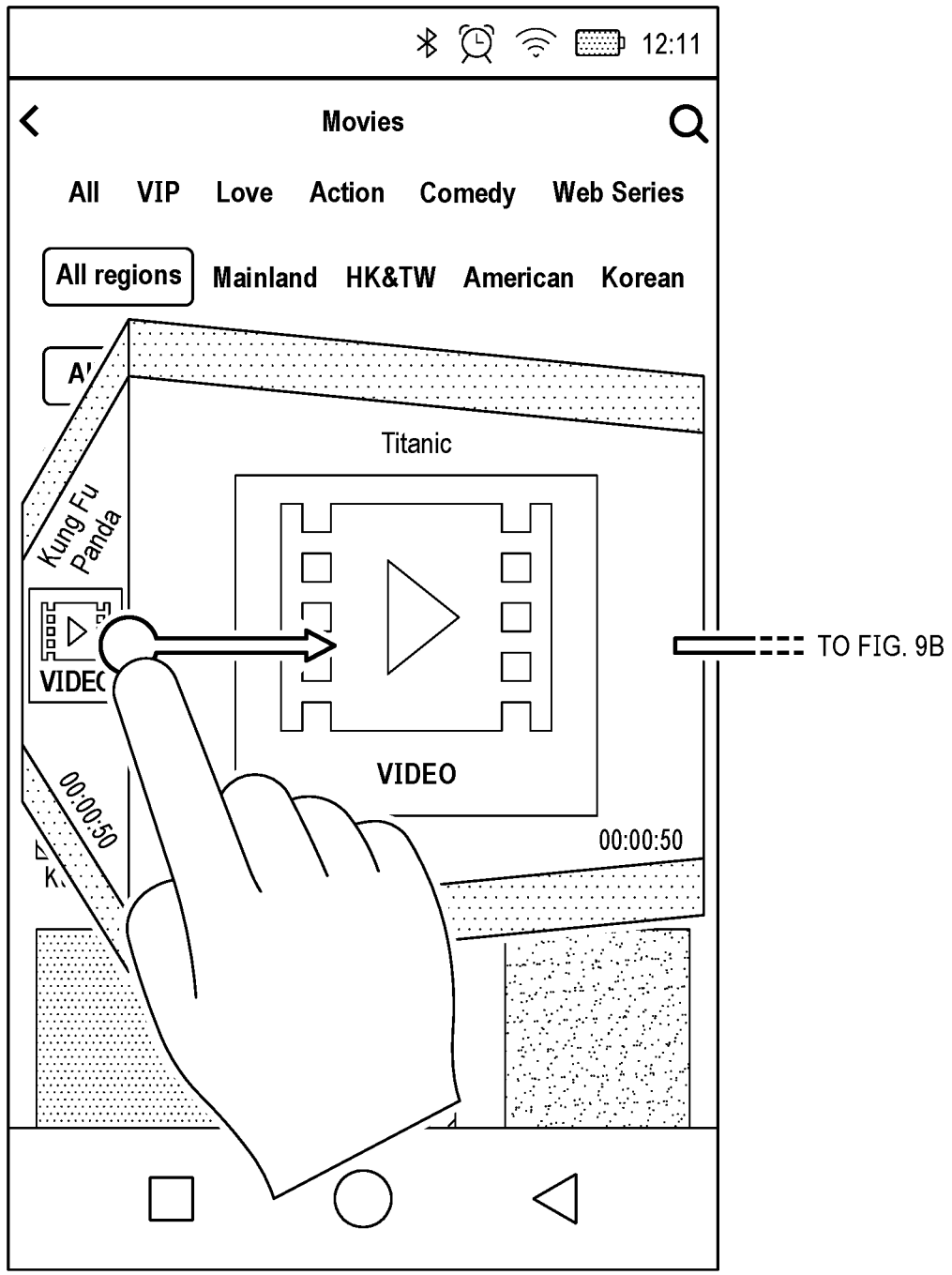
FIG. 9A is a schematic diagram of a human-computer interaction embodiment related to the three-dimensional floating window shown in FIG. 8A and FIG. 8B.
Figure 9B:
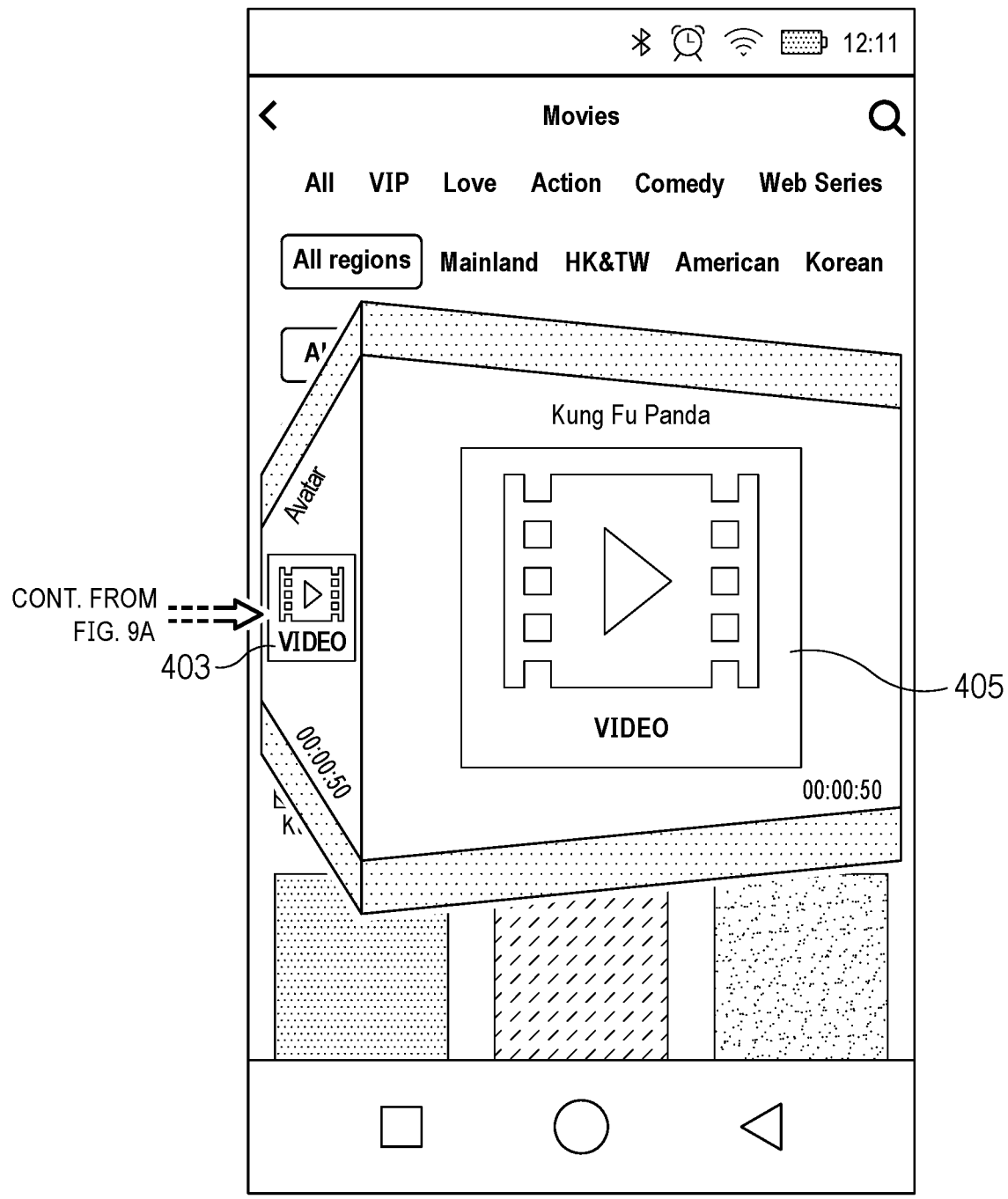
FIG. 9B is a schematic diagram of a human-computer interaction embodiment related to the three-dimensional floating window shown in FIG. 8A and FIG. 8B.
Figure 9C:
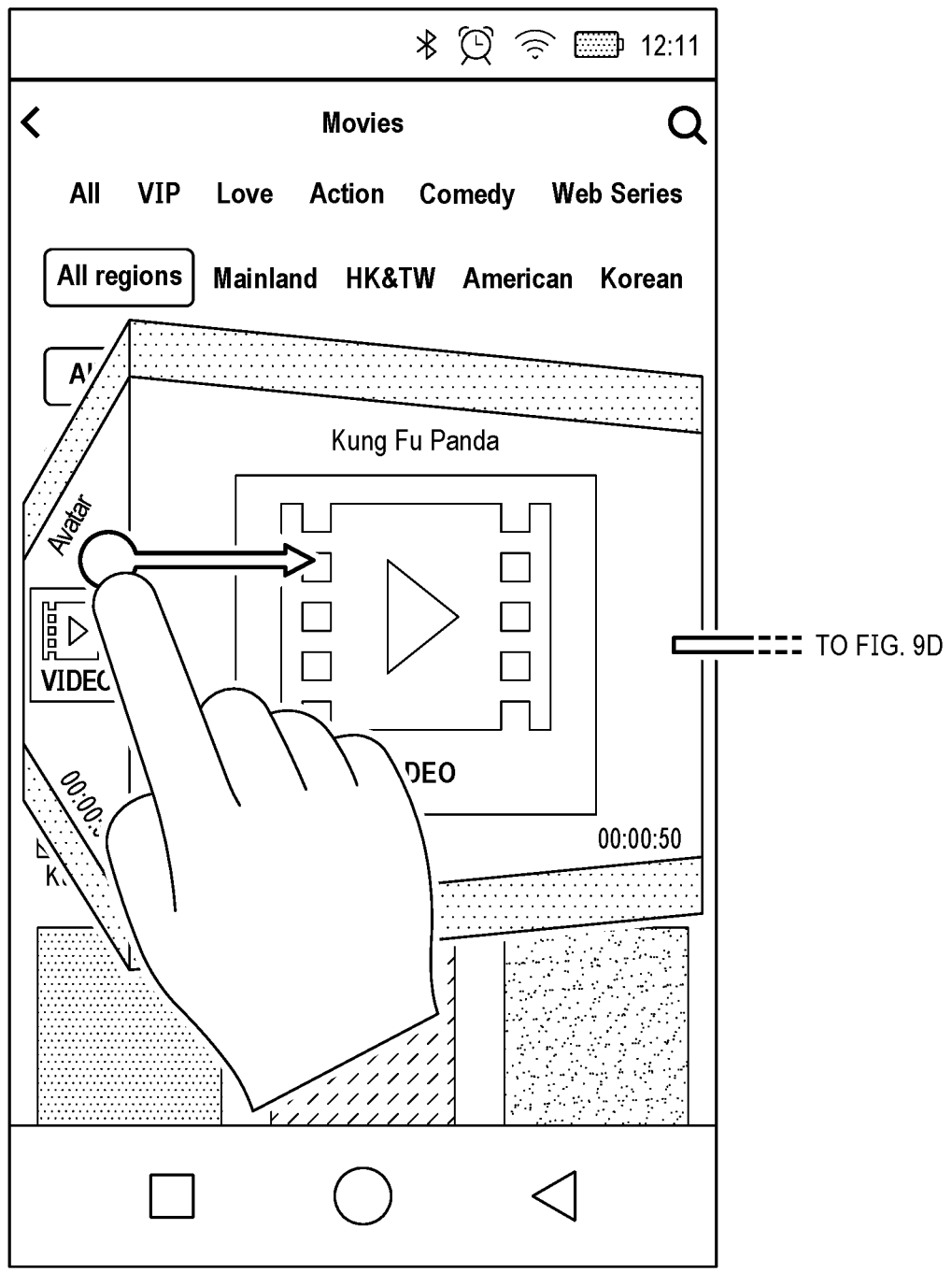
FIG. 9C is a schematic diagram of a human-computer interaction embodiment related to the three-dimensional floating window shown in FIG. 8A and FIG. 8B.
Figure 9D:
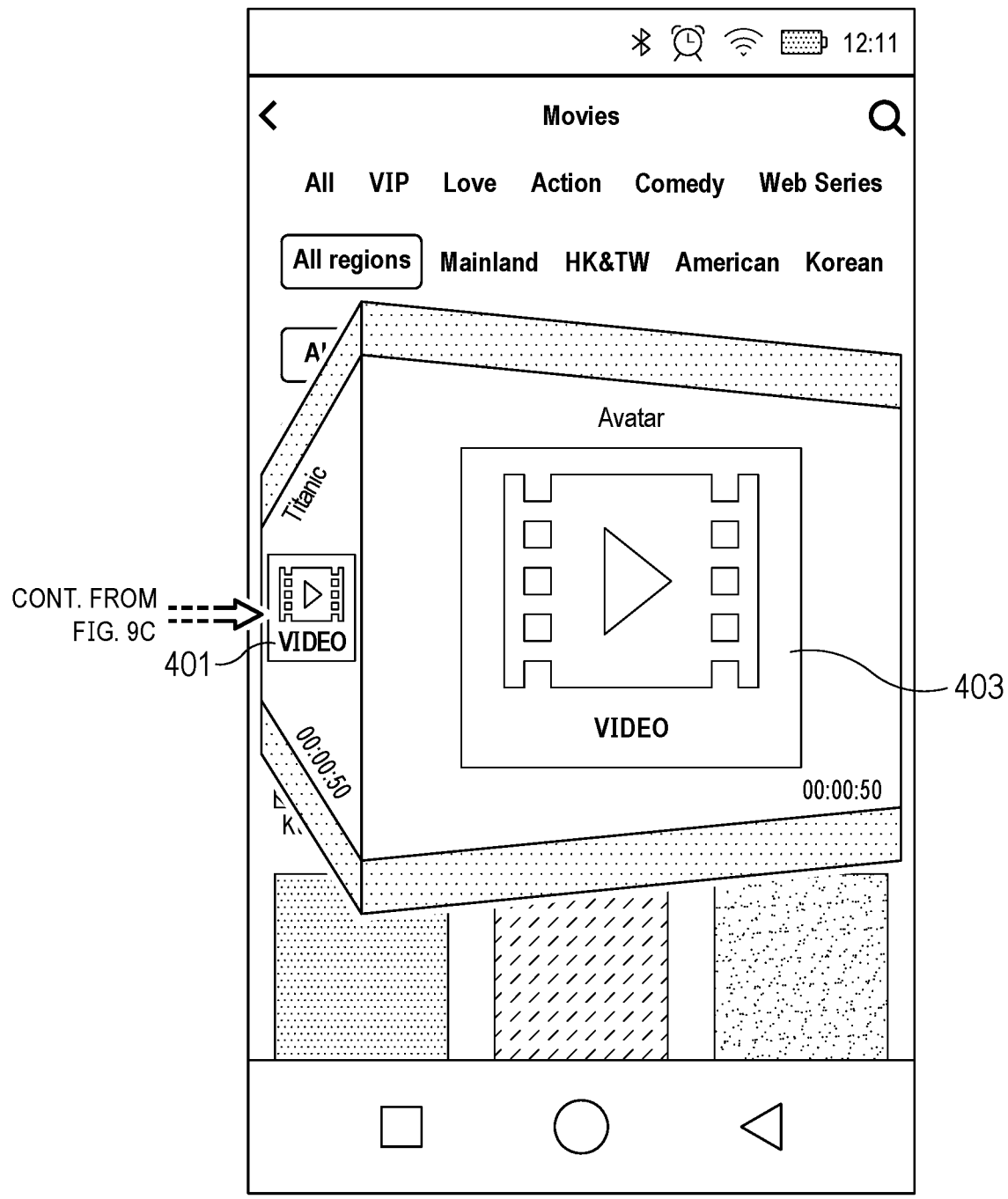
FIG. 9D is a schematic diagram of a human-computer interaction embodiment related to the three-dimensional floating window shown in FIG. 8A and FIG. 8B.

As shown in FIG. 8C and FIG. 8D, after the interaction process shown in FIG. 8A and FIG. 8B, when detecting a left sliding operation acting on the three-dimensional floating window 301 again, the system may switch the page 405 as a current page of the three-dimensional floating window 301, and display, on the right of the current page, a next page, that is, the page 401 of the current page (that is, the page 405). In this case, the current page displays the video introduction information corresponding to "Kung Fu Panda", and the next page of the current page displays the video introduction information corresponding to "Titanic".

It can be learned from the embodiments of FIG. 8A to FIG. 8D that the page switching operation may be a left sliding operation acting on the three-dimensional floating window 301. To be specific, the user may slide the three-dimensional floating window 301 left, to switch a next page as a current page of the three-dimensional floating window 301. In the embodiments of FIG. 8A to FIG. 8D, an interaction process of switching a current page of the three-dimensional floating window 301 by the user may be similar to an interaction process of rotating the three-dimensional floating window 301 leftwards by the user. This is quite interesting.

FIG. 9A to FIG. 9D show an example of another page switching operation. The page switching operation may be used to switch a previous page as a current page of the three-dimensional floating window 301.

As shown in FIG. 9A to FIG. 9D, the page switching operation may be a right sliding operation acting on the three-dimensional floating window 301. To be specific, the user may slide the three-dimensional floating window 301 right, to switch a previous page as a current page of the three-dimensional floating window 301. A specific interaction process is similar to that in FIG. 8A to FIG. 8D. Details are not described herein again. In the embodiments of FIG. 9A to FIG. 9D, an interaction process of switching a current page of the three-dimensional floating window 301 by the user may be similar to an interaction process of rotating the three-dimensional floating window 301 rightwards by the user. This is quite interesting.

Not limited to the sliding operation, the page switching operation acting on the three-dimensional floating window 301 may be alternatively a touch operation in another form, for example, a tap operation or a push operation that acts on a previous (or next) page.

Not limited to the touch operation, the page switching operation acting on the three-dimensional floating window 301 may be alternatively a motion sensing operation on the three-dimensional floating window 301, without direct contact with the screen. Further, the motion sensing operation (also referred to as a motion gesture) may be captured by a motion sensor (for example, a depth camera).

Further, to help the user quickly browse video introduction information respectively corresponding to a plurality of videos when the user holds the terminal with one hand, the page switching operation may be an operation of holding the terminal by the user to performing a specific movement, for example, an operation of rotating (or shaking, or swinging, or the like) the terminal. Further, the system may capture the page switching operation using a movement sensor. In this application, the specific movement may be referred to as a first movement.

Figure 10:
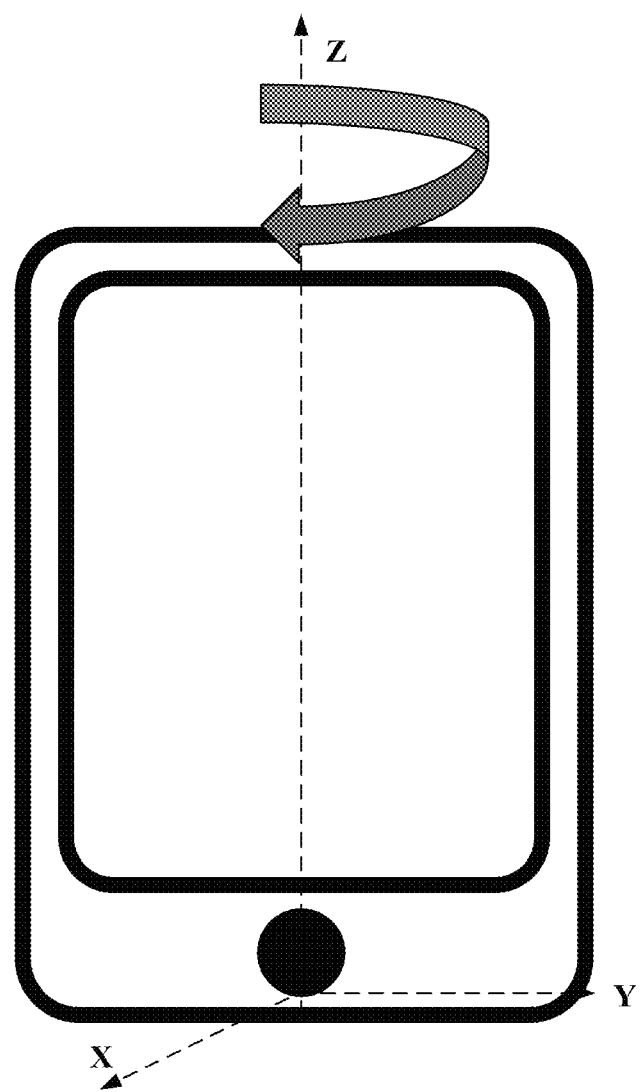
FIG. 10 is a schematic diagram of rotating a terminal according to an embodiment of this application.

FIG. 10 shows an example of a page switching operation. As shown in FIG. 10, the page switching operation may be an operation of holding the terminal by the user to rotating the terminal clockwise or counterclockwise along a Z-axis.

It is assumed that before the page switching operation is received, a current page of the three-dimensional floating window 301 is the page 401, and a next page, that is the page 403 of the current page is displayed on the right of the current page. In this case, the current page displays the video introduction information corresponding to "Titanic", and the next page of the current page displays the video introduction information corresponding to "Avatar".

Figure 11A:
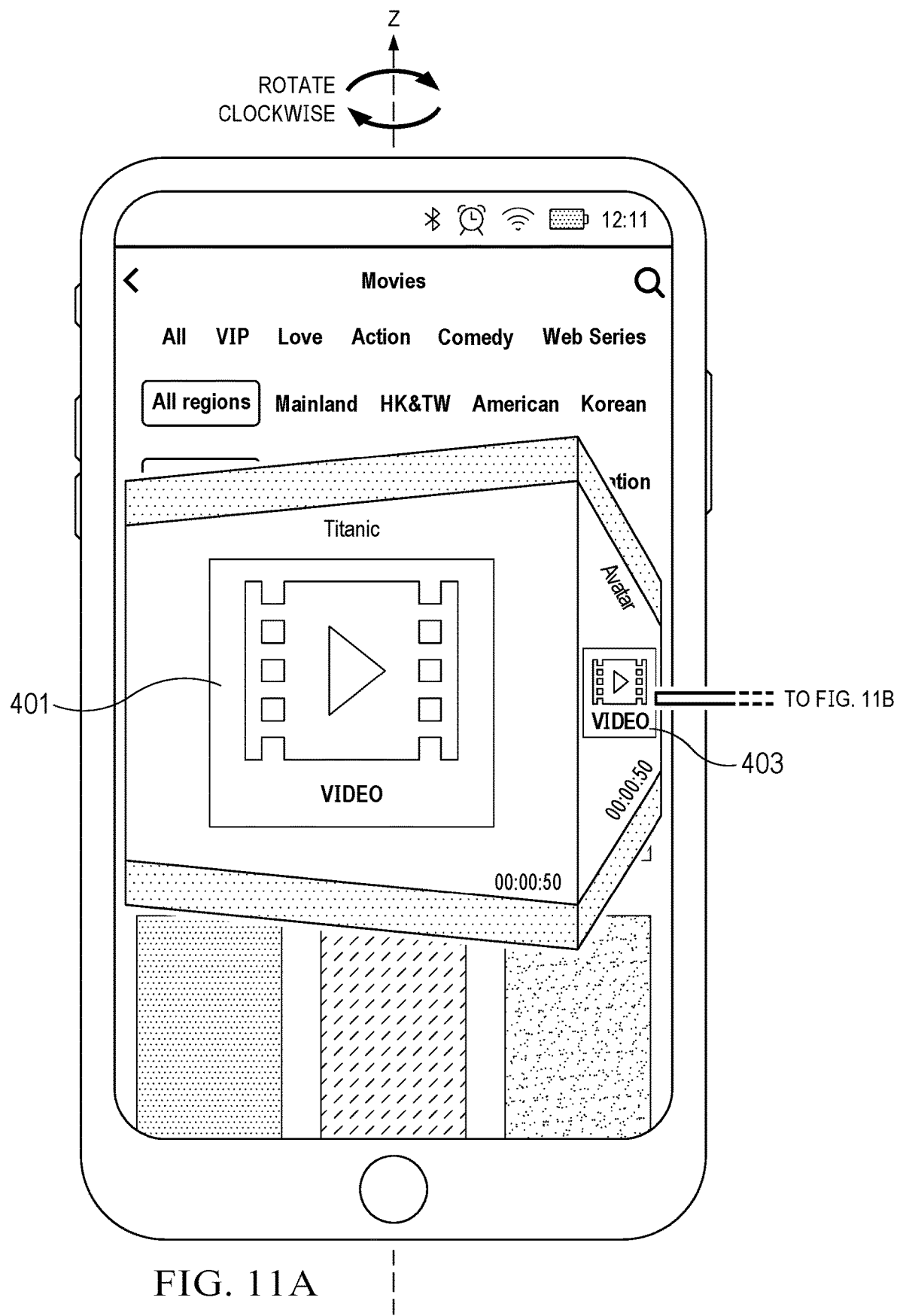
FIG. 11A is a schematic diagram of a two page switching operation according to an embodiment of this application.
Figure 11B:
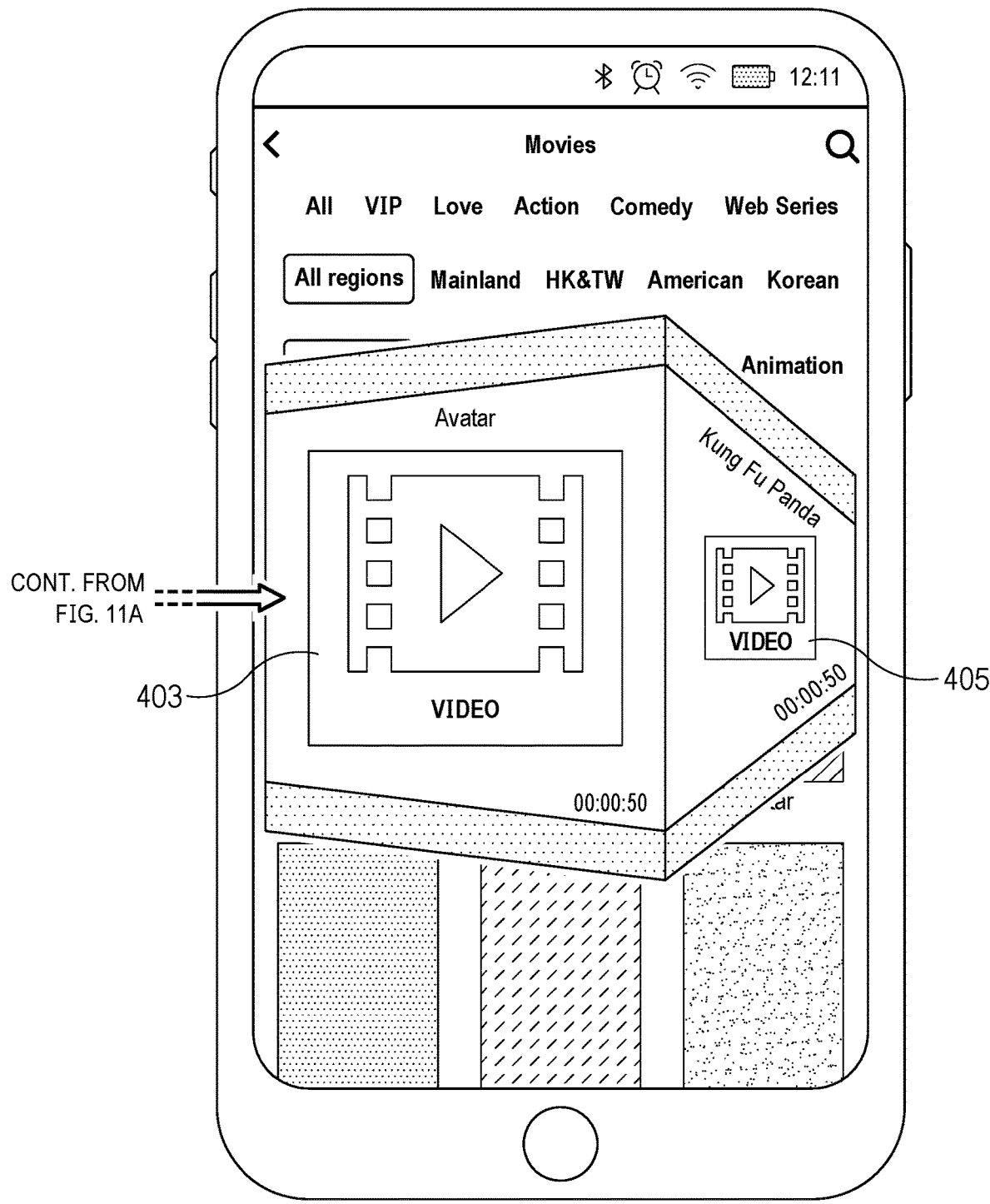
FIG. 11B is a schematic diagram of a two page switching operation according to an embodiment of this application.

As shown in FIG. 11A and FIG. 11B, when detecting that the user rotates the terminal clockwise along the Z-axis, the system may switch the page 403 as a current page of the three-dimensional floating window 301, and display, on the right of the current page, a next page, that is the page 405 of the current page (that is, the page 403). In this case, the current page displays the video introduction information corresponding to "Avatar", and the next page of the current page displays the video introduction information corresponding to "Kung Fu Panda".

Then the user may further continue rotating the terminal clockwise along the Z-axis. Correspondingly, when detecting that the user continues rotating the terminal clockwise along the Z-axis, the system may switch the page 405 as a current page of the three-dimensional floating window 301, and display, on the right of the current page, a next page, that is, the page 401 of the current page (that is, the page 405). In this case, the current page displays the video introduction information corresponding to "Kung Fu Panda", and the next page of the current page displays the video introduction information corresponding to "Titanic".

Further, it is assumed that before the page switching operation is received, a current page of the three-dimensional floating window 301 is the page 401, and a previous page, that is the page 405 of the current page is displayed on the left of the current page. In this case, the current page displays the video introduction information corresponding to "Titanic", and the previous page of the current page displays the video introduction information corresponding to "Kung Fu Panda".

Figure 11C:
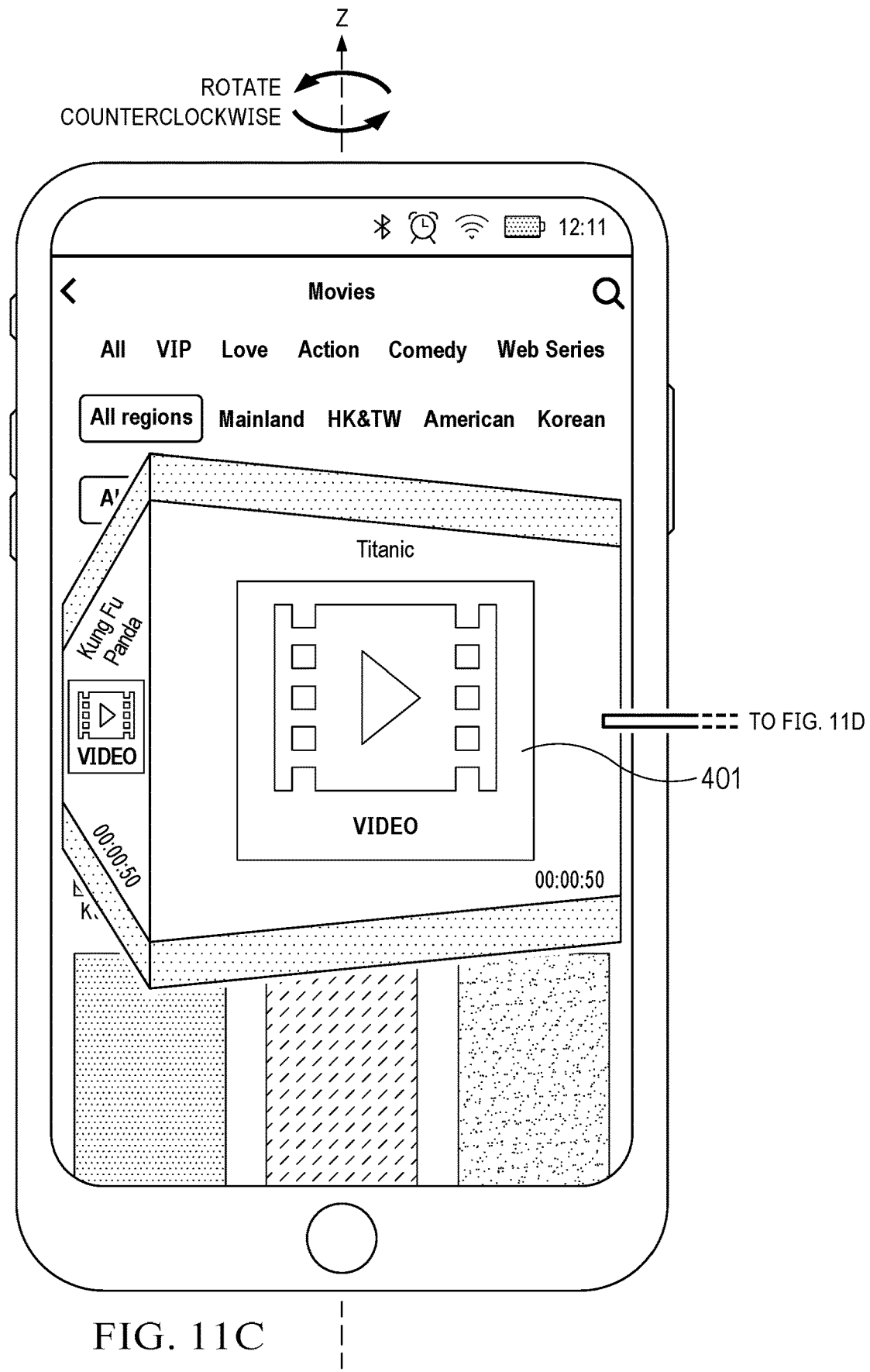
FIG. 11C is a schematic diagram of a two page switching operation according to an embodiment of this application.
Figure 11D:
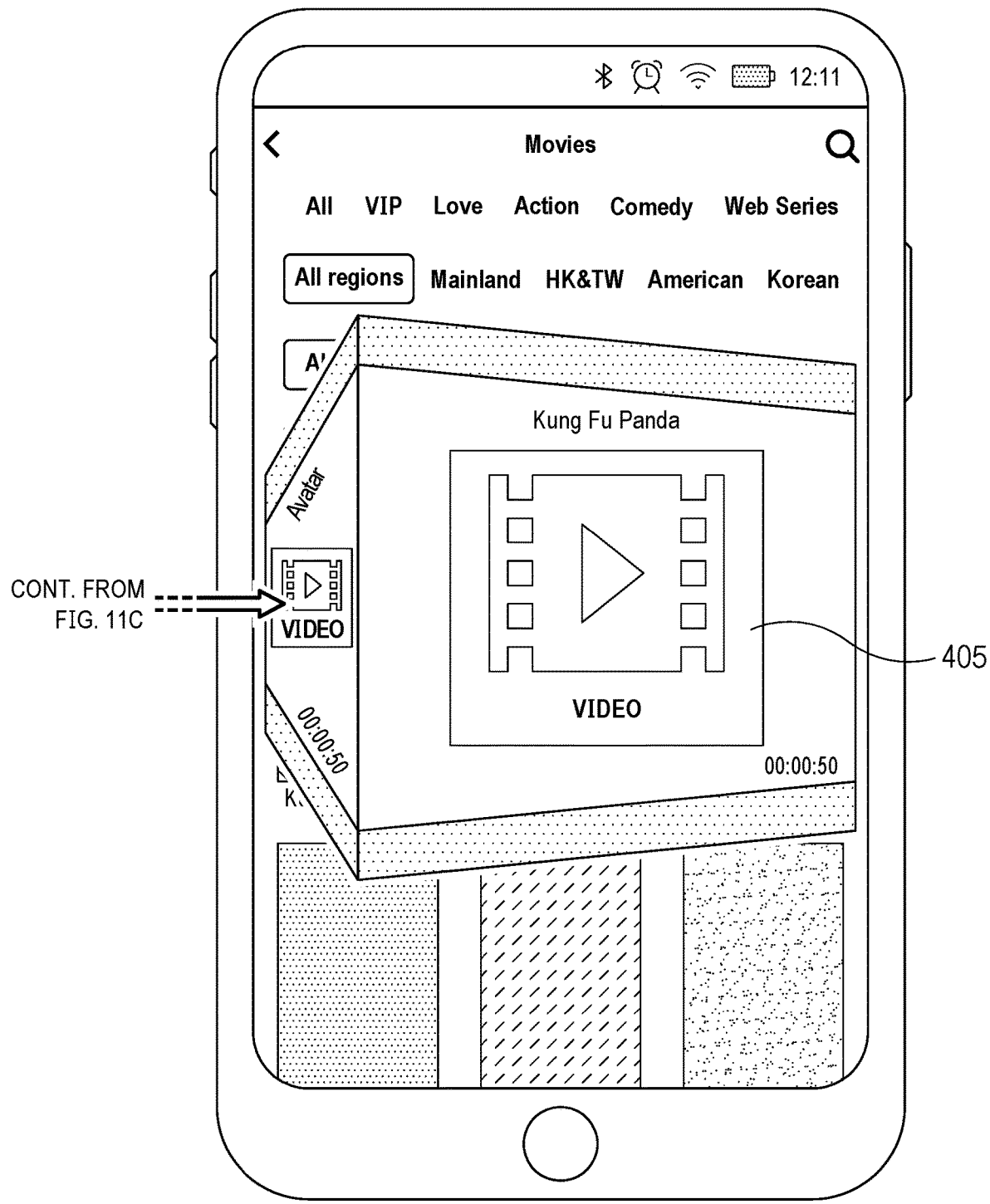
FIG. 11D is a schematic diagram of a two page switching operation according to an embodiment of this application.

As shown in FIG. 11C and FIG. 11D, when detecting that the user rotates the terminal counterclockwise along the Z-axis, the system may switch the page 405 as a current page of the three-dimensional floating window 301, and display, on the left of the current page, a next page, that is the page 403 of the current page (that is, the page 405). In this case, the current page displays the video introduction information corresponding to "Kung Fu Panda", and the next page of the current page displays the video introduction information corresponding to "Avatar".

Then the user may further continue rotating the terminal counterclockwise along the Z-axis. Correspondingly, when detecting that the user continues rotating the terminal counterclockwise along the Z-axis, the system may switch the page 403 as a current page of the three-dimensional floating window 301, and display, on the left of the current page, a previous page, that is the page 401 of the current page (that is, the page 403). In this case, the current page displays the video introduction information corresponding to "Avatar", and the previous page of the current page displays the video introduction information corresponding to "Titanic".

In the embodiments of FIG. 11A to FIG. 11D, an arrangement form for displaying the plurality of pages included in the three-dimensional floating window 301 is as follows. The plurality of pages are respectively arranged on N sides of a prism. In the embodiments of FIG. 11A to FIG. 11D, the Z-axis is an axis of the prism, and the first movement is rotating the terminal clockwise or counterclockwise along the axis of the prism. Not limited to the Z-axis, the axis of the prism may be alternatively an axis in another direction. For example, when the terminal is switched to a landscape display mode, the three-dimensional floating window 301 is rotated 90°, and the axis of the prism is a Y-axis in FIG. 10. The example is merely used to interpret this application, and constitutes no limitation on the technical solutions of this application. Not limited to rotating the terminal clockwise or counterclockwise along the axis of the prism, the first movement may be alternatively a movement in another form, for example, the user holds the terminal to shake or swing the terminal rightwards.

Not limited to those shown in FIG. 11A to FIG. 11D, the plurality of pages included in the three-dimensional floating window 301 may be alternatively displayed in another arrangement form.

For example, the plurality of pages included in the three-dimensional floating window 301 may be arranged on a circumference surface of a cylinder. In this case, the page switching operation shown in FIG. 11A to FIG. 11D may be alternatively used to switch a current page of a three-dimensional floating window in a cylindrical shape. The first movement is rotating the terminal clockwise or counterclockwise along an axis of the cylinder. Not limited thereto, the page switching operation may be alternatively a touch operation (for example, a touch operation of sliding leftwards or rightwards) acting on the three-dimensional floating window 301, or may be a motion sensing operation (for example, a motion sensing gesture of sliding leftwards or rightwards) acting on the three-dimensional floating window 301.

Figure 12:
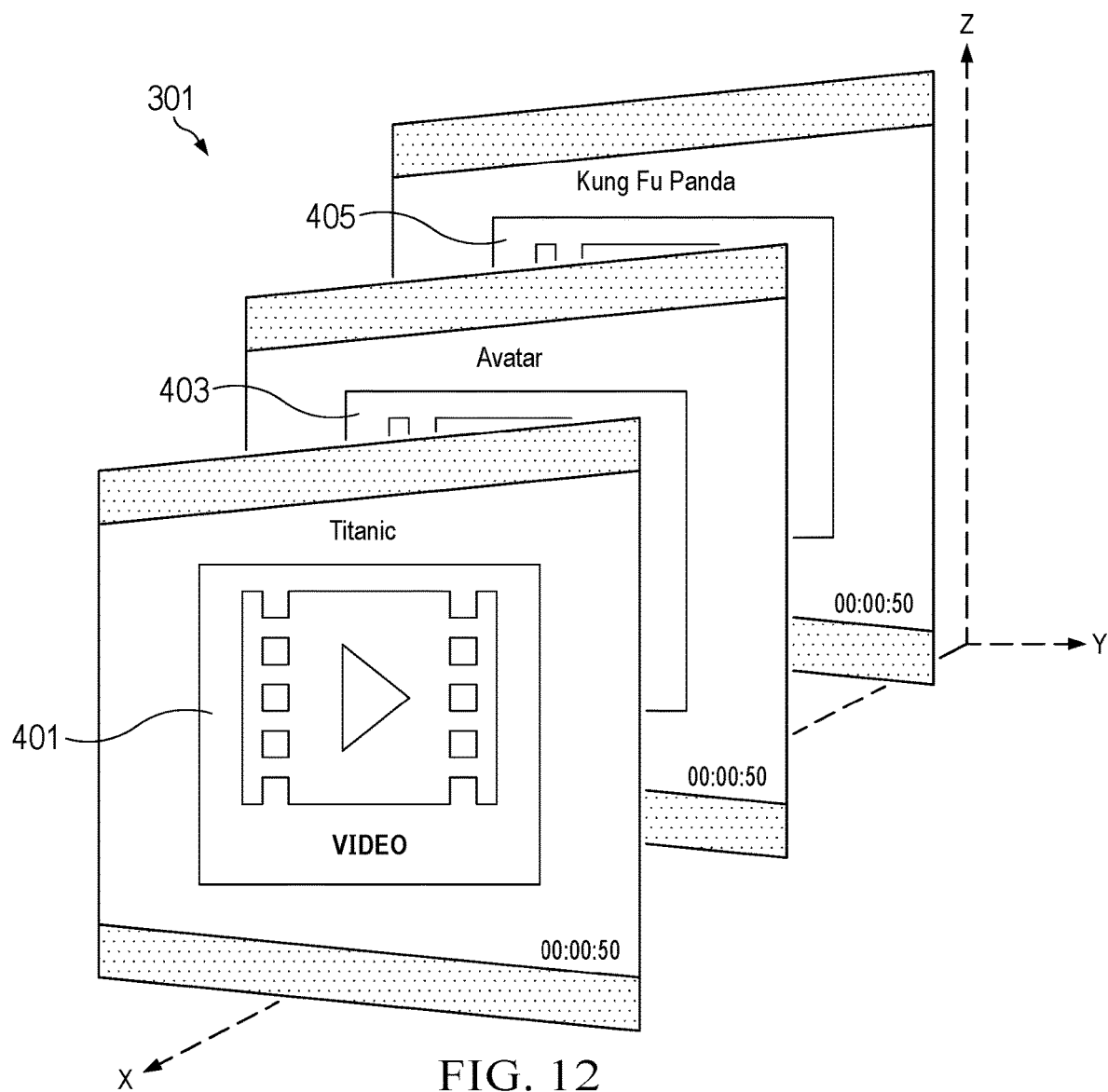
FIG. 12 is a schematic diagram of another three-dimensional floating window according to an embodiment of this application.
Figure 13:
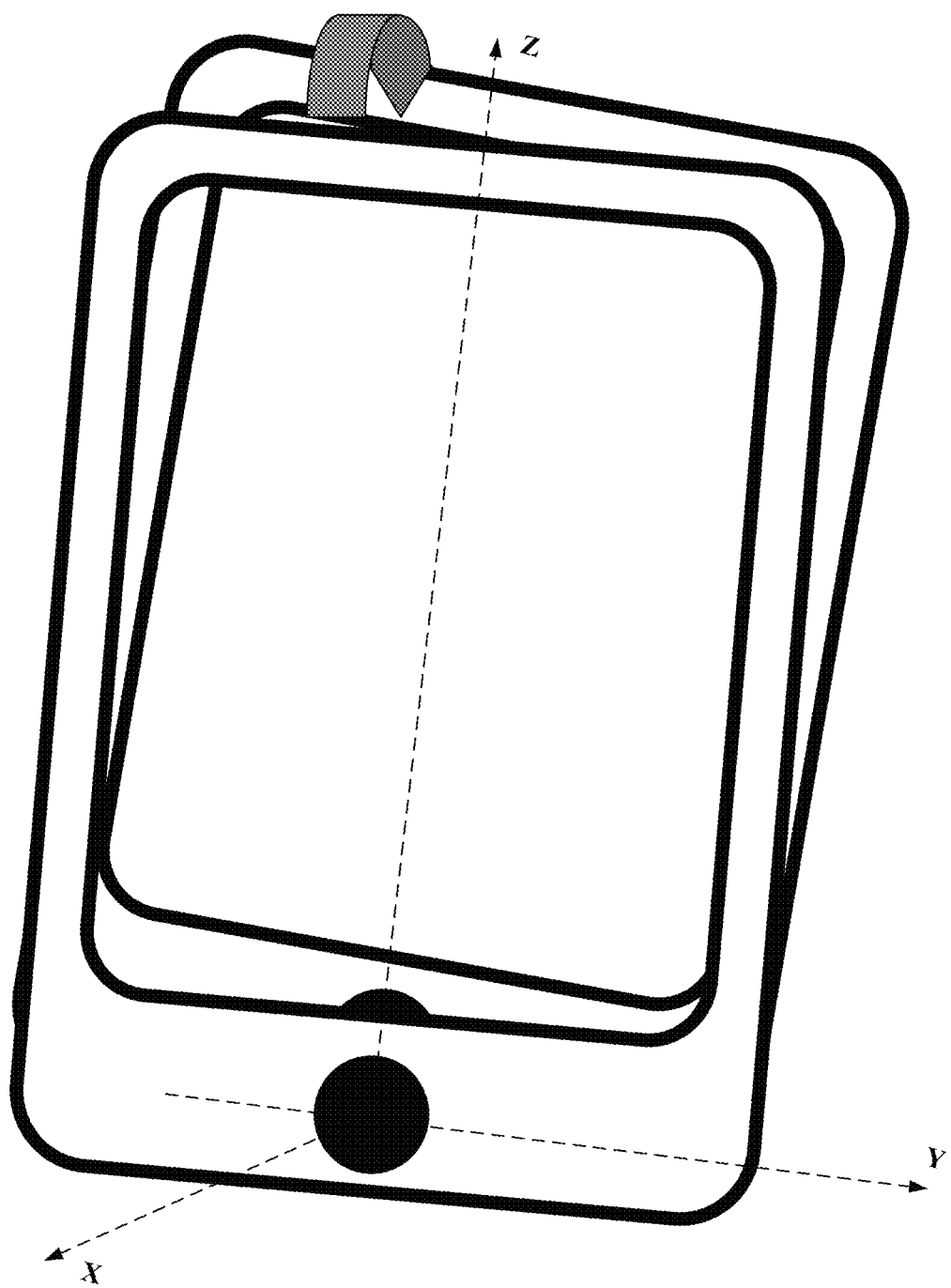
FIG. 13 is a schematic diagram of a page switching operation related to the three-dimensional floating window shown in FIG. 12.

For another example, the plurality of pages included in the three-dimensional floating window 301 may be displayed in an arrangement form of dominoes. In this case, the page switching operation may be an operation of tilting, by the user, the terminal in a direction in which the dominoes collapse in a chain. The first movement is tilting the terminal in the direction in which the dominoes collapse in a chain. As shown in FIG. 12, assuming that the plurality of pages of the three-dimensional floating window 301 are arranged along an X-axis, the direction in which the dominoes of the plurality of pages collapse in a chain is a direction in which the terminal is rotated along a Y-axis. A current page is a frontmost page (closest to the user) upright along a Z-axis: the page 401. In this case, as shown in FIG. 13, the user may tilt the terminal in the direction in which the terminal is rotated along the Y-axis (that is, the direction in which the dominoes of the plurality of pages collapse in a chain), to switch the three-dimensional floating window 301. Further, when detecting that the user tilts the terminal in the direction in which the terminal is rotated along the Y-axis, the system may switch a next page (that is, the page 403) as a current page, and may display the page 401 in a collapsed state. This can not only help the user operate the terminal with one hand to quickly browse video introduction information respectively corresponding to a plurality of videos, but also enhance entertainment in a user interaction process. User experience is better.

For the three-dimensional floating window 301 shown in FIG. 12, the page switching operation may be alternatively a touch operation (for example, a touch operation of sliding in the direction in which the dominoes collapse in a chain) acting on the three-dimensional floating window 301, or may be a motion sensing operation (for example, a motion sensing gesture of sliding in the direction in which the dominoes collapse in a chain) for the three-dimensional floating window 301.

The foregoing examples are merely some embodiments provided in this application. In actual application, different page switching operations may be alternatively designed for three-dimensional floating WINDOWS with different display effects. This is not limited in this application.

In specific implementation, the first movement may impose a requirement on a manner of holding the terminal by the user for a movement. For example, a speed and/or an amplitude for rotating the terminal clockwise or counterclockwise or tilting the terminal need/needs to meet a predefined condition (for example, a rotational speed is greater than a first threshold). This is not limited in this application.

Figure 14A:
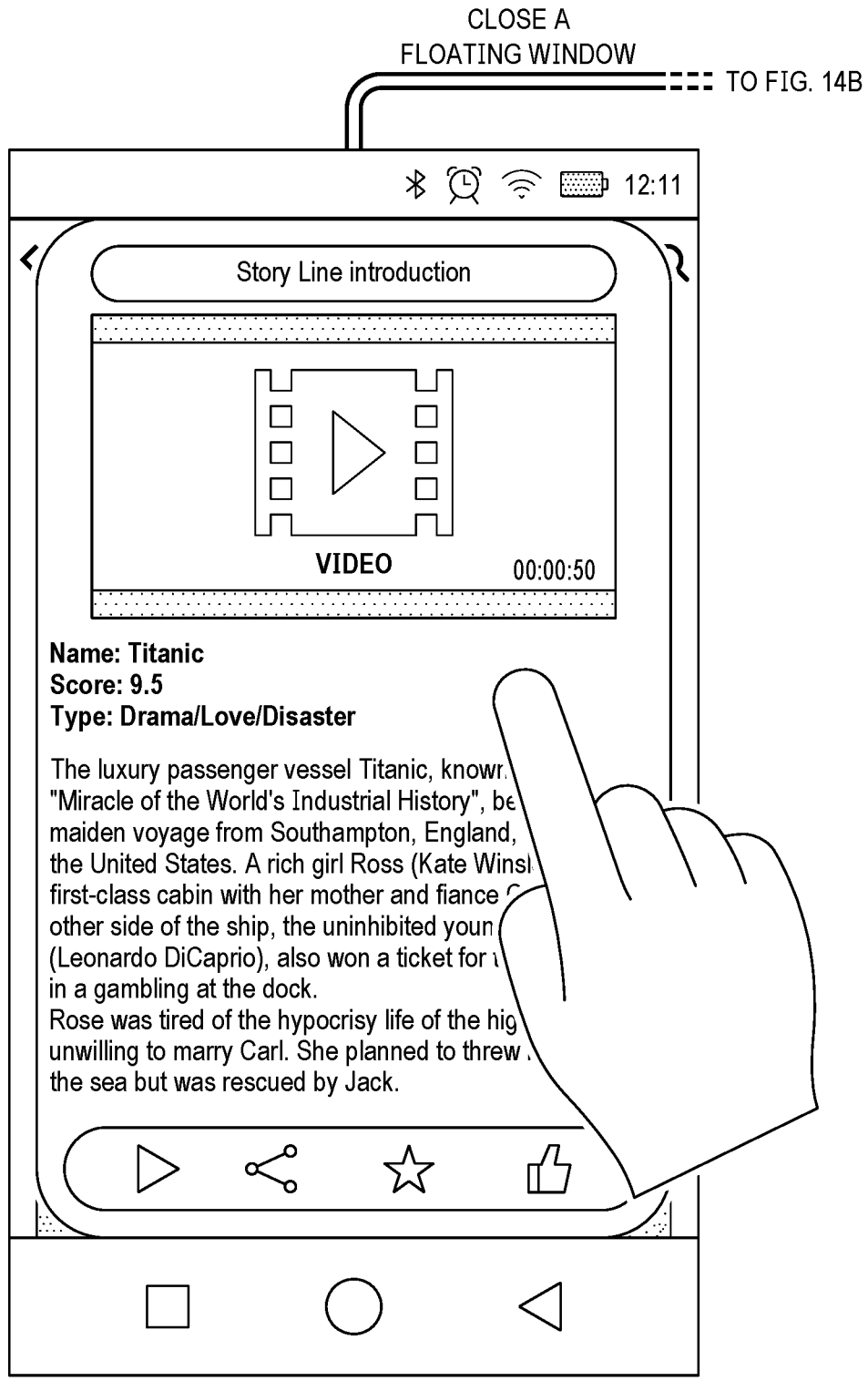
FIG. 14A is a schematic diagram of an interaction process of closing a floating window according to an embodiment of this application.
Figure 14B:
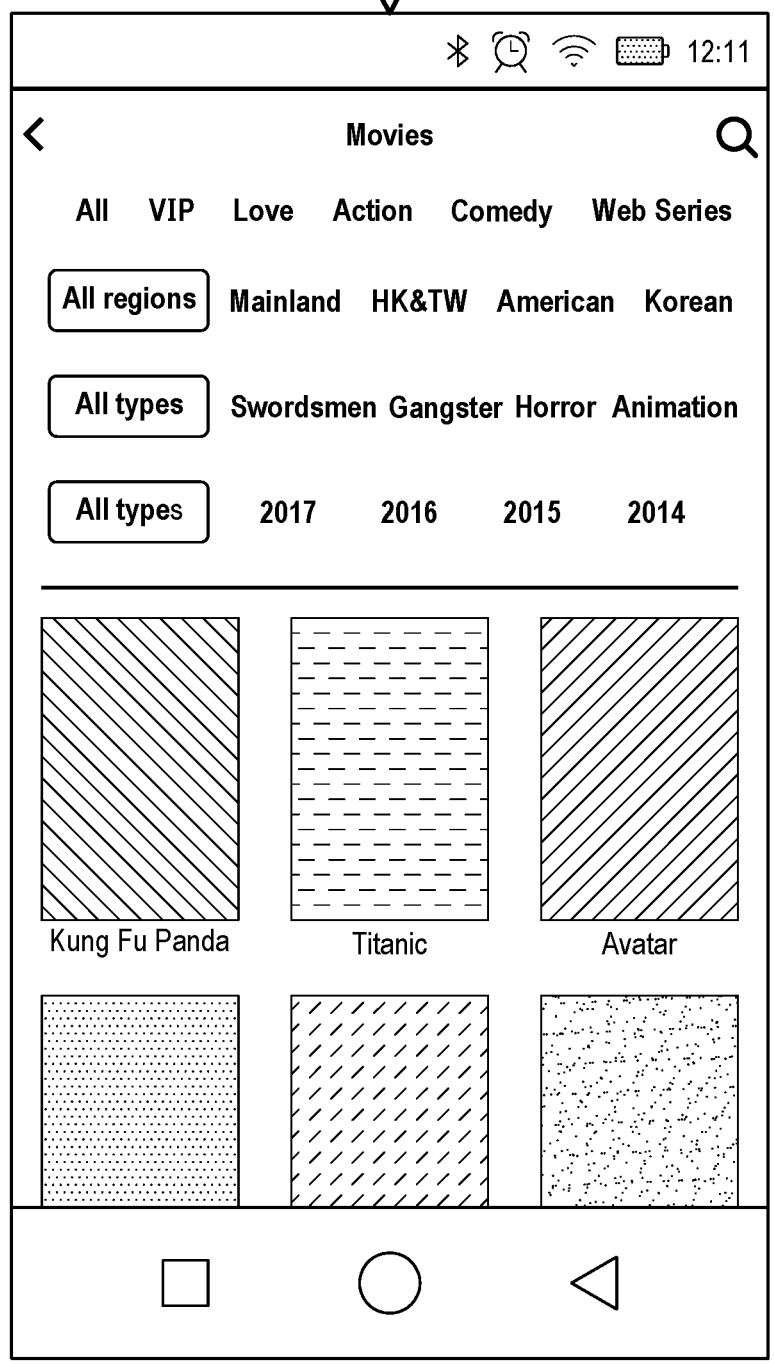
FIG. 14B is a schematic diagram of an interaction process of closing a floating window according to an embodiment of this application.

FIG. 14A and FIG. 14B shows an example of a user operation of exiting (or closing) the floating window 301. In this application, the user operation of exiting (or closing) the floating window 301 may be referred to as a third input. Not limited to that shown in FIG. 14A and FIG. 14B, the floating window 301 may be alternatively a three-dimensional floating window.

As shown in FIG. 14A and FIG. 14B, when detecting a tap operation acting on the floating window 301, the system may stop displaying the floating window 301. After the system stops displaying the floating window 301, the poster browsing page 101 is displayed. In this case, the user may reselect a poster to learn of a story line of another video.

Not limited to the tap operation acting on the floating window 301 in FIG. 14A and FIG. 14B, the third input may alternatively include a touch operation such as a touch and hold operation or a double-tap operation. Not limited thereto, an exit (or close) button may be further provided in the floating window 301, and the third input may be alternatively a user operation of tapping the button.

Not limited to the touch operation, the third input may be alternatively a motion sensing operation on the floating window 301, without direct contact with the touchscreen. Further, the motion sensing operation may be captured by a motion sensor.

The following describes an implementation of the terminal provided in this application. The terminal may be equipped with a touch apparatus (for example, a touch panel in a display) and/or a motion sensor and/or a movement sensor. These components may be referred to as user input apparatuses configured to detect (or receive) a user input. The touch apparatus can detect a touch operation (such as a tap operation, a touch and hold operation, or a sliding operation) of the user. The motion sensor can sense a user gesture (such as a sliding gesture or a selection gesture, requiring no direct touch with the touch panel of the terminal) in a sensing area of the motion sensor. The movement sensor can sense a user operation of holding the terminal by a user to perform a movement (for example, rotating, swinging, or tilting the terminal). In this application, the touch apparatus may be configured to detect a touch operation used to select a poster, a touch operation used for switching a current page of a three-dimensional floating window, and a touch operation used for exiting (or closing) a floating window in the foregoing human-computer interaction embodiments. The motion sensor may be configured to detect a user gesture used to select a poster, a user gesture used for switching a current page of a three-dimensional floating window, and a user gesture used for exiting (or closing) a floating window in the foregoing human-computer interaction embodiments. The motion sensor may be configured to detect a user operation of holding the terminal by the user to perform a first movement.

Figure 15:
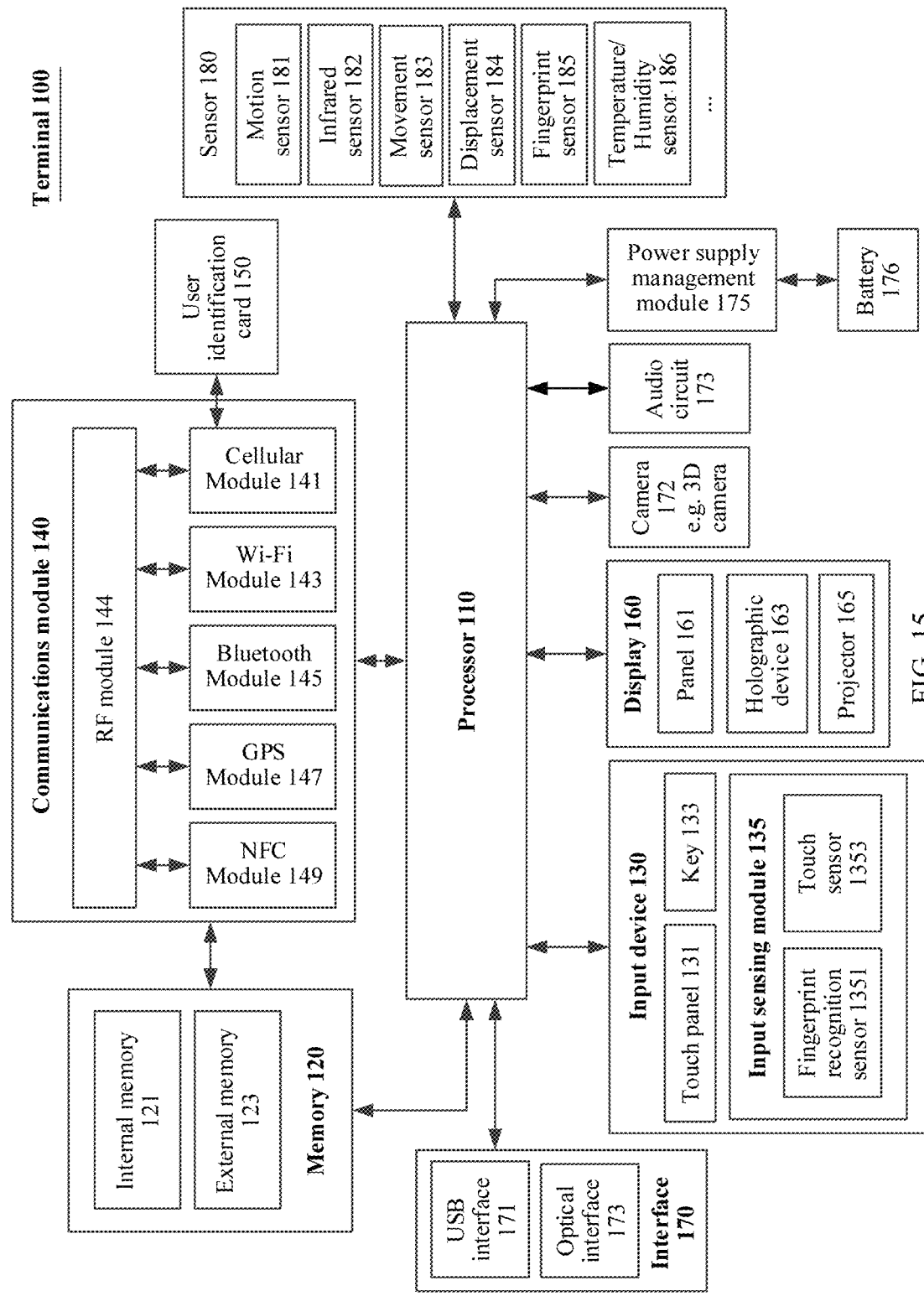
FIG. 15 is a schematic diagram of a hardware architecture of a terminal according to an embodiment of this application.

FIG. 15 is a structural block diagram of an implementation of a terminal 100. As shown in FIG. 15, the terminal 100 may include one or more processors 110, a user identity module (that is, subscriber identity module (SIM)) card 150, a communications module 140, a memory 120, a sensor 180, an input device 130, a display 160, an interface 170, an audio frequency circuit 173, a camera 172, a power management module 175, and a battery 176, and any other similar and/or suitable components.

The processor 110 may include one or more application processors (AP) or one or more communications processors, for example, a baseband processor (BP).

The processor 110 may run an operating system (OS) or an application program, to control a plurality of hardware or software elements connected to the processor 110 and perform processing or arithmetic operations on various data including multimedia data. The processor 110 may be implemented by a system on chip (SoC). Optionally, the processor 110 may further include a graphics processing unit (GPU) (not shown).

The SIM card 150 may be a card that implements a SIM. The SIM card 150 may include unique identification information (for example, an integrated circuit card identifier (ICCID)) or user information (for example, an international mobile subscriber identity (IMSI)).

The communications module 140 may include a radio frequency (RF) module 144. The communications module 140 may further include a cellular module 141, a WI-FI module 143, a BLUETOOTH module 145, a GPS module 147, and a near field communication (NFC) module 149. The communications module 140 may provide a wireless communication function using a radio frequency. Additionally or alternatively, the communication module 140 may include a network interface (for example, a local area network (LAN) card), a modulator/demodulator (modem) configured to connect the terminal 100 to a network (for example, the Internet, a LAN, a wide area network (WAN), a telecommunications network, a cellular network, a satellite network, and a plain old telephone service (POTS)), and the like.

The communications module 140 may be connected to the communications processor in the processor 110. The communications processor may control the communication module 140 to send and receive data. The communications processor may include a plurality of communications processors implementing different communications protocols. For example, the baseband processor is connected to the cellular module 141, and may be configured to control the cellular module 141 to receive and send data.

The RF module 144 may be configured to send and receive data. In specific implementation, the RF module 144 may include a transceiver, a power amplification module (PAM), a frequency filter, a low-noise amplifier (LNA), and the like. Optionally, the RF module 144 may further include a component configured to send and receive an electromagnetic wave in free space during wireless communication, for example, a conductor or a conducting wire.

The sensor 180 may include, for example, at least one of a motion sensor 181, an infrared sensor 182, a movement sensor 183, a displacement sensor 184, a fingerprint sensor 185, a temperature/humidity sensor 186, and the like. The sensor 180 may measure a physical quantity of the terminal 100 and/or may detect an operating status of the terminal 100, and may convert measured or detected information into an electrical signal. The sensor 180 may further include, for example, an E-nose sensor (not shown), an electromyogram (EMG) sensor (not shown), an electroencephalogram (EEG) sensor (not shown), an electrocardiogram (ECG) sensor (not shown), or a fingerprint sensor (not shown). The sensor 180 may further include a control circuit (not shown) configured to control one or more sensors included in the sensor 180.

The input device 130 may include a touch panel 131, a key 133, or an input sensing module 135.

The touch panel 131 may use at least one of a capacitive method, a resistive method, an infrared method, or an ultrasonic method. The touch panel 131 may further include a control circuit. In this application, the touch panel 131 may be a floating touch panel.

The input sensing module 135 may include at least one fingerprint recognition sensor 1351 and at least one touch sensor 1353. The input sensing module 135 may include a fingerprint recognition sensor 1351 and a touch sensor 1353 that detect input using a same sensing method. For example, both the fingerprint recognition sensor 1351 and the touch sensor 1353 in the input sensing module 135 can use a capacitive method to detect input. The input sensing module 135 may include an input processor. The input processor is electrically connected to the fingerprint recognition sensor 1351 and the touch sensor 1353, processes input received from the fingerprint recognition sensor 1351 or the touch sensor 1353, and transmits the processed input to the processor. The input sensing module 135 may include a flexible circuit board, and the touch sensor 1353, the fingerprint recognition sensor 1351, and the input processor in the input sensing module 135 may be electrically connected to the flexible circuit board. The input sensing module 135 may be arranged at a position corresponding to a lower end key (such as a home key or a soft key) on the front face of the electronic device. For example, the input sensing module 135 may detect, using the touch sensor 1353 or the fingerprint recognition sensor 1351, user fingerprint input or touch input received from the home key or the soft key. The input sensing module 135 may detect, using the touch sensor 1353, touch input received using a touch input area formed on a side part of the electronic device, and may detect, using the fingerprint recognition sensor 1351, fingerprint input received using the home key. The input sensing module 135 may process received input, and transmit the processed input to the processor. The input processor and the fingerprint recognition sensor 1351 may be formed in a form of a chip.

The display 160 may include a panel 161, a holographic device 163, a projector 165, and the like. The panel 161 may be a liquid-crystal display (LCD), an active-matrix organic light-emitting diode (AM-OLED) display, or the like. The panel 161 may be implemented in a flexible, transparent, or wearable form. The panel 161 may be formed by a single module with a touch panel 131. The holographic device 163 may display a three-dimensional image in the air through interference of light. In this application, the display 160 may further include a control circuit used for the control panel 161 and/or the holographic device 163. In this application, the display 160 and the touch panel 131 may be integrated and implemented as a touchscreen of the terminal 100.

The interface 170 may include a Universal Serial Bus (USB) interface 171, an optical interface 173, and the like. Optionally, the interface 170 may further include one or more interfaces used for a Secure Digital (SD)/MultiMedia-Card (MMC) (not shown) or the Infrared Data Association (IrDA) (not shown). The interface 170 or any sub-interface thereof may be configured to interact with another electronic device (for example, an external electronic device), an input device, an external storage device, or the like.

The audio circuit 173 may be configured to encode/decode a voice into an electrical signal, and may be configured to convert an electrical signal into a voice. In specific implementation, the audio circuit 173 may be connected to at least one of a speaker (not shown), a receiver (not shown), a headset (not shown), or a microphone (not shown), and may be configured to decode/encode a signal that is input/output by the at least one of the foregoing.

The camera 172 may capture a still image or video. In specific implementation, the camera 172 may include one or more image sensors (for example, a front or rear sensor module, not shown), an image signal processor (ISP) (not shown), or a flash LED (not shown). In this application, the camera 172 may be a three-dimensional (3D) camera.

The power management module 175 may manage a power supply of the terminal 100.

In specific implementation, the power management module 175 may include a power management IC (PMIC), a charger IC, a battery fuel meter, and the like. The battery 176 may supply power to, for example, the terminal 100. The battery 176 may be a rechargeable battery.

The memory 120 may include an internal memory 121 and an external memory 123.

In specific implementation, the internal memory 121 may include at least one of a volatile memory (for example, a dynamic random-access memory (RAM) (DRAM), a static RAM (SRAM), or a synchronous DRAM (SDRAM)) and a nonvolatile memory (for example, a one-time programmable read-only memory (ROM) (OTPROM), a programmable ROM (PROM), an erasable PROM (EPROM), an electrically EPROM (EEPROM), a masked ROM, a flash ROM, a NAND flash memory, or a NOR flash memory). The internal memory 121 may be in a form of a solid-state drive (SSD). The external memory 123 may include a flash drive, for example, a high-density flash memory (CompactFlash (CF)), an SD card, a micro SD card, a mini SD card, an eXtreme Digital (xD) card, or a memory stick.

The internal memory 120 is coupled to the processor 110, and is configured to store various software programs and/or a plurality of sets of instructions. In specific implementation, the internal memory 120 may include a high-speed RAM, or may include a non-volatile memory, for example, one or more magnetic storage devices, a flash memory device, or another non-volatile solid state storage device. The internal memory 120 may store an operating system (or system in the following description), for example, ANDROID, IOS, WINDOWS, LINUX, or another embedded operating system. The internal memory 120 may further store a network communication program. The network communication program may be configured to communicate with one or more additional devices, one or more terminals, and one or more network devices. The internal memory 120 may further store a user interface program. The user interface program may vividly display content of an application program using a graphical operation interface, and receive, using an input control such as an application icon, a menu, a dialog box, and a key, a control operation performed by a user on the application program.

The internal memory 120 may further store one or more application programs, for example, a video play application program (for example, YOUKU), an image management application program (for example, a gallery), or another application program.

According to the embodiments disclosed in this application, the terminal 100 is merely an example provided in this embodiment of the present disclosure. In addition, the terminal 100 may include more or fewer components than shown components, or may combine two or more components, or may have different component configurations.

Figure 16A:
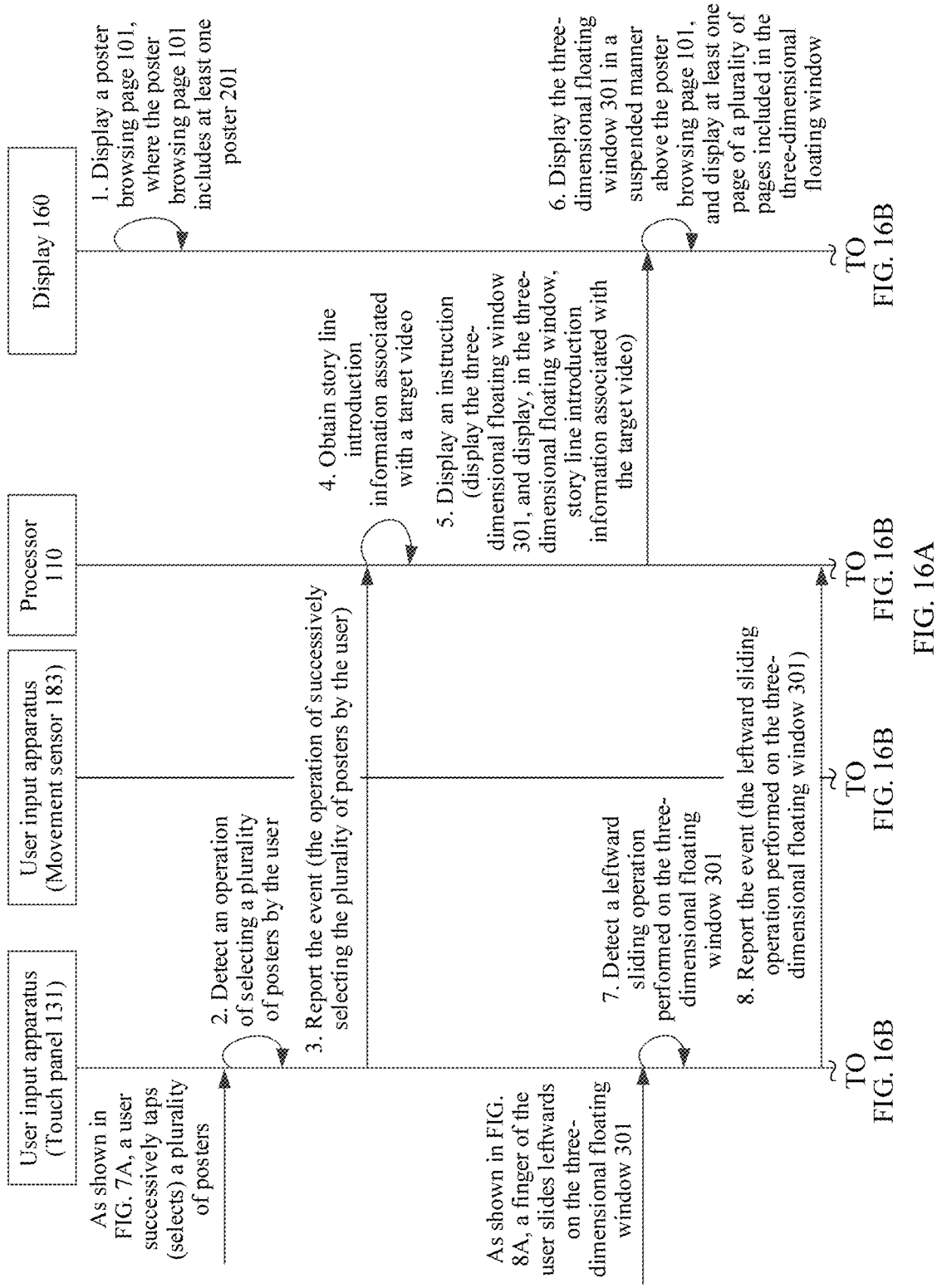
FIG. 16A is a schematic flowchart of hardware drive interaction inside the terminal shown in FIG. 15.
Figure 16B:
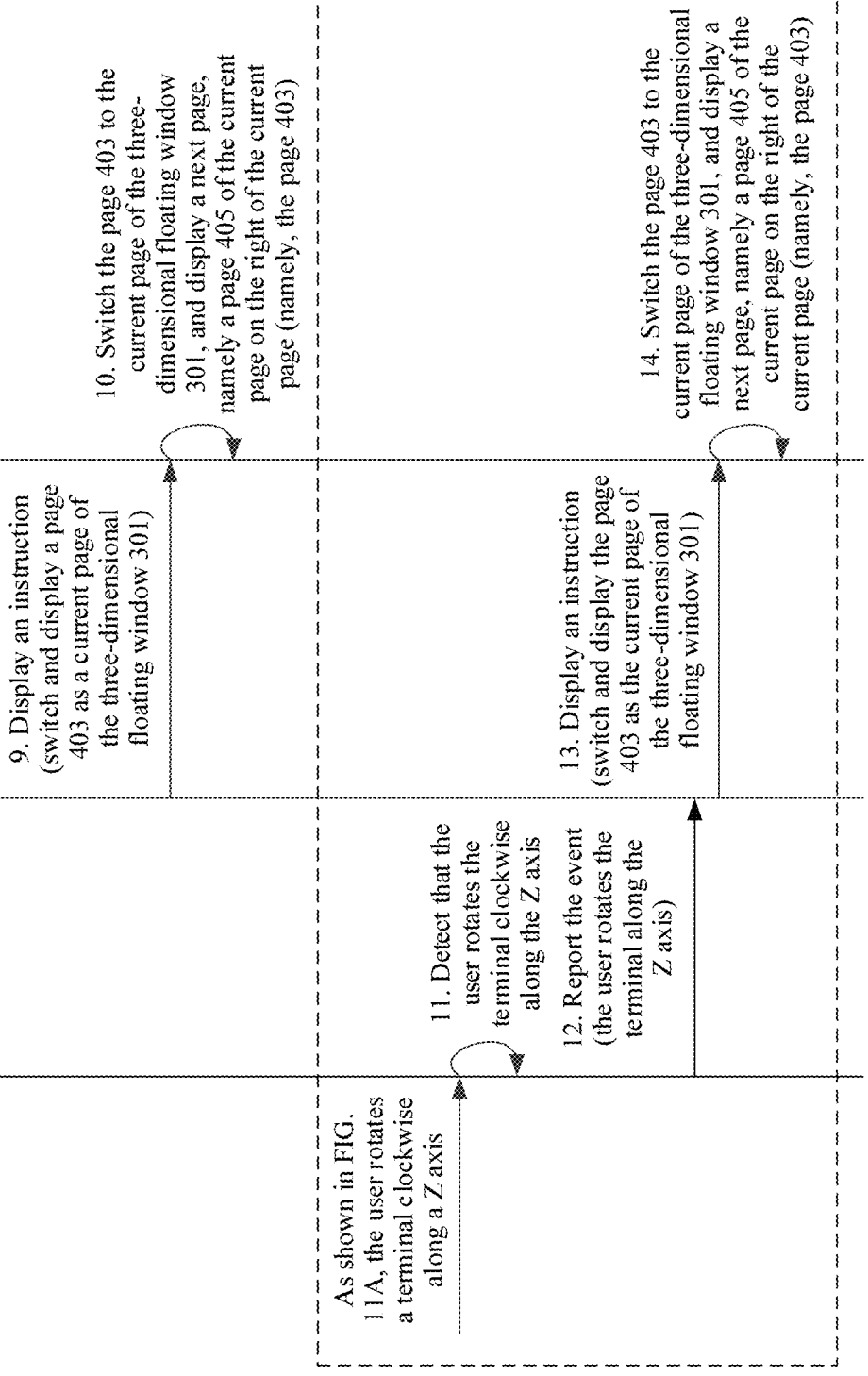
FIG. 16B is a schematic flowchart of hardware drive interaction inside the terminal shown in FIG. 15.

Using the embodiments of FIG. 7A to FIG. 8B, and FIG. 11A and FIG. 11B as examples, the following describes in detail a cooperative relationship between the components of the terminal 100 in this application. Refer to FIG. 16A and FIG. 16B.

1. The display 160 displays a poster browsing page 101. The poster browsing page 101 includes at least one poster 201.

2. The touch panel 131 detects an operation of selecting a plurality of posters by a user. For example, as shown in FIG. 7A and FIG. 7B, the plurality of posters selected by the user include: a poster of a video "Titanic", a poster of a video "Kung Fu Panda", and a poster of a video "Avatar". A plurality of videos represented by the plurality of posters are target videos mentioned in this application.

3. The touch panel 131 may report an event of selecting the plurality of posters by the user to the processor 110. In specific implementation, event report information may include indication information of the plurality of posters selected by the user, for example, poster names or poster IDs.

4. The processor 110 may respond to the event reported by the touch panel 131 and obtain video introduction information corresponding to the target videos. Further, the processor may obtain, from a service management and control platform through the communications module 140, text information used to introduce a story line, and may further obtain, from a streaming server through the communications module 140, a short video used to introduce the story line. Optionally, the processor may further obtain, from the service management and control platform through the communications module 140, voice information used to introduce the story line.

5. The processor 110 may send a display instruction to the display 160, to instruct the display 160 to display a three-dimensional floating window and display, in the three-dimensional floating window, the video introduction information corresponding to the target videos.

6. In response to the display instruction sent by the processor 110, the display 160 displays a three-dimensional floating window 301 in a suspended manner on the poster browsing page 101, and displays at least one of a plurality of pages included in the three-dimensional floating window 301. The plurality of pages included in the three-dimensional floating window 301 are used to respectively display the video introduction information respectively corresponding to the plurality of videos selected by the user (that is, the target videos).

Further, as shown in FIG. 7A and FIG. 7B, the three-dimensional floating window includes three pages a page 401, a page 403, and a page 405. The three pages are used to respectively display the video introduction information respectively corresponding to the three videos selected by the user (the video "Titanic", the video "Kung Fu Panda", and the video "Avatar"). The display 160 may display the page 401 and the page 403 of the three pages. The page 401 is a current page of the three-dimensional floating window 301, and is a page that is in the three pages and that occupies a largest display area on the screen of the display 160.

Optionally, as shown in FIG. 7A and FIG. 7B, to further enhance an indicative effect, the display 160 may further display the page 403 on the right of the page 401. This can prompt the user to slide the three-dimensional floating window 301 left, to switch the page 403 as a new current page of the three-dimensional floating window 301.

7. The touch panel 131 detects a left sliding operation acting on the three-dimensional floating window 301. For the left sliding operation, refer to that shown in FIG. 8A and FIG. 8B. Details are not described herein again.

8. The touch panel 131 may report an event of the detected left sliding operation acting on the three-dimensional floating window 301 to the processor 110.

9. The processor 110 may respond to the event reported by the touch panel 131 and send a display instruction to the display 160, to instruct the display 160 to switch a next page as a new current page of the three-dimensional floating window.

10. In response to the display instruction sent by the processor 110, the display 160 switches and displays a next page (that is, the page 403) as a new current page of the three-dimensional floating window 301, and displays the page 405 on the right of the new current page. For details, refer to FIG. 8A and FIG. 8B.

Steps 7 to 10 describe an implementation process of switching, by the user, a current page of the three-dimensional floating window using a touch operation (for example, the left sliding operation acting on the three-dimensional floating window 301).

Optionally, not limited to steps 7 to 10, the user may alternatively switch a current page of the three-dimensional floating window by rotating (or swinging, or tilting, or the like) the terminal. For a specific implementation process, refer to the following steps 11 to 14.

11. The movement sensor 183 detects a user operation of rotating the terminal by the user along a Z-axis. For the user operation, refer to that shown in FIG. 11A and FIG. 11B. Details are not described herein again.

12. The movement sensor 183 may report, to the processor 110, a detected event of rotating the terminal by the user along the Z-axis.

13. The processor 110 may respond to the event reported by the movement sensor 183 and send a display instruction to the display 160, to instruct the display 160 to switch a next page as a new current page of the three-dimensional floating window.

14. In response to the display instruction sent by the processor 110, the display 160 switches and displays a next page (that is, the page 403) as a new current page of the three-dimensional floating window 301, and displays the page 405 on the right of the new current page. For details, refer to FIG. 11A and FIG. 11B.

It can be understood that in steps 11 to 14, the user can switch a current page of the three-dimensional floating window by rotating (or swinging, or tilting, or the like) the terminal. A user operation is quite simple. This is especially applicable to a scenario in which the user operates the terminal with one hand.

FIG. 16A and FIG. 16B merely show an interaction process of the components inside the terminal for implementing an embodiment of this application. For another embodiment provided in this application, interaction and cooperation between the components inside in the terminal may be performed similarly. Details are not described herein again.

Based on some embodiments shown in FIG. 3A and FIG. 3B to FIG. 14A and FIG. 14B and the terminal 100 described in the embodiment of FIG. 15, the following describes an information display method provided in an embodiment of the present disclosure.

Figure 17:
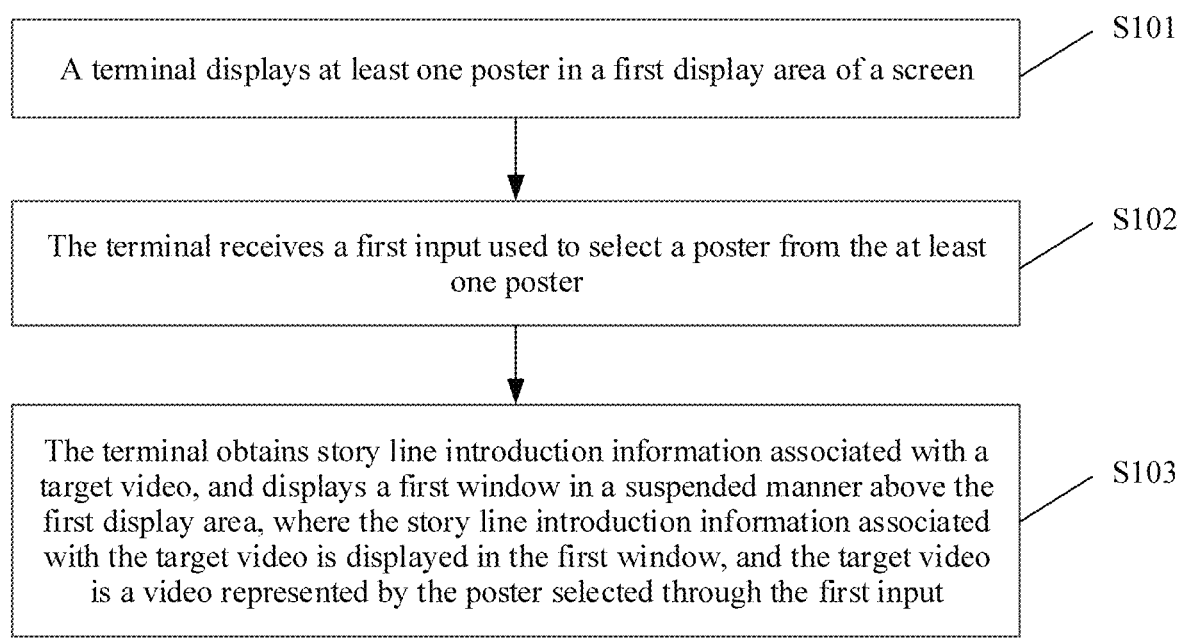
FIG. 17 is a schematic flowchart of an information display method according to an embodiment of this application.

FIG. 17 is a schematic flowchart of an information display method according to this application. The following provides description using a terminal as an execution body.

S101. A terminal displays at least one poster in a first display area of a screen.

Further, the first display area may occupy a part of or the whole of the screen of a display of the terminal. Referring to the foregoing human-computer interaction embodiments, the first display area may display a poster browsing page 101. The poster browsing page 101 may display a poster of at least one video. A user may view video introduction information corresponding to any video. A poster of a video is visual information used for displaying or promoting the video. The poster of the video may be a static poster, or may be a dynamic poster, or may be a combination of a static poster and a dynamic poster.

S102. The terminal receives a first input used to select a poster from the at least one poster.

In this application, a user operation that is used for viewing video introduction information and that acts on a poster may be referred to as a first input. Not limited to a tap operation acting on the poster in FIG. 3A and FIG. 3B, the first input may alternatively include a touch and hold operation or a double-tap operation that acts on the poster. Not limited thereto, the poster may further display a button used for viewing a story line, and the first input may be alternatively a tap operation acting on the button.

Not limited to a touch operation, the first input may be alternatively a motion sensing operation on the poster, without direct contact with the touchscreen. Further, the motion sensing operation may be captured by a motion sensor.

S103. In response to the first input, the terminal displays a first window in a suspended manner in the first display area. The first window displays video introduction information corresponding to a target video. The target video is a video represented by the poster selected through the first input. Herein, the first window is the floating window mentioned in the foregoing human-computer interaction embodiments.

Referring to FIG. 4A to FIG. 4C, the video introduction information corresponding to the target video may include at least one of text information used to introduce the target video and image information used to introduce the target video. The image information may include but is not limited to at least one of a short video and a static/dynamic poster. Herein, play duration of the short video is less than a first threshold, for example, 60 seconds. In specific implementation, the short video may source from a video "Titanic" (some frames extracted from the video "Titanic"), or may be a separately produced introduction video (for example, an introduction short film of an animation type), or the like. In specific implementation, a system may automatically play the short video after opening the floating window, or may play the short video after the user taps a play button on the short video. This is not limited in this application. Optionally, the system may cyclically play the short video in an image area 303.

Not limited to those shown in FIG. 4A to FIG. 4C, the first window may further include an audio play area, for example, a voice bar. Voice information used to introduce the target video is played in the audio play area. That is, the video introduction information corresponding to the target video may further include the voice information used to introduce the target video. For example, the voice information may be a pre-recorded speech for introducing a story line. The example is merely an embodiment provided in this application, and should not constitute a limitation on the solutions of this application. In actual application, there may be alternatively a different case.

In this application, the terminal device may obtain, from a server (including but not limited to a service management and control platform and a streaming server) of a video provider, the video introduction information corresponding to the target video. Further, the terminal may obtain, from the service management and control platform, text information used to introduce the story line of the target video, for example, a video summary. Further, the terminal may obtain, from the streaming server, image information, voice information, and the like that are used to introduce the story line of the target video. Interaction between the terminal and the server of the video provider is subsequently described with reference to FIG. 18A and FIG. 18B. Details are not described herein.

Further, as shown in FIG. 5, the first window may further include at least one of a play control 308, a share control 309, a favorites control 310, and a rating control 311. The play control 308 is used to receive a user operation that is input by the user for playing the target video. The share control 309 is used to receive a user operation that is input by the user for sharing the target video. The favorites control 310 is used to receive a user operation that is input by the user for adding the target video to favorites. The rating control 311 is used to receive a user operation that is input by the user for commenting on the target video.

As shown in FIG. 5, the controls (the play control 308, the share control 309, the favorites control 310, and the rating control 311) may be centrally displayed in an interaction area 307 of the first window. Optionally, not limited to that shown in FIG. 5, the controls may be alternatively displayed in another page layout pattern. This is not limited in this application.

Further, for a human-computer interaction process related to the controls, refer to the embodiments of FIG. 6A and FIG. 6B to FIG. 6G and FIG. 6H. Details are not described herein again.

It can be understood that the first window includes the controls (the play control 308, the share control 309, the favorites control 310, and the rating control 311) in the interaction area 307 such that the user can quickly perform a subsequent operation related to the target video. Not limited to those shown in FIG. 5, and FIG. 6A to FIG. 6H, the first window may further include another type of button used to provide another type of interaction function. This is not limited in this application.

Figure 18A:
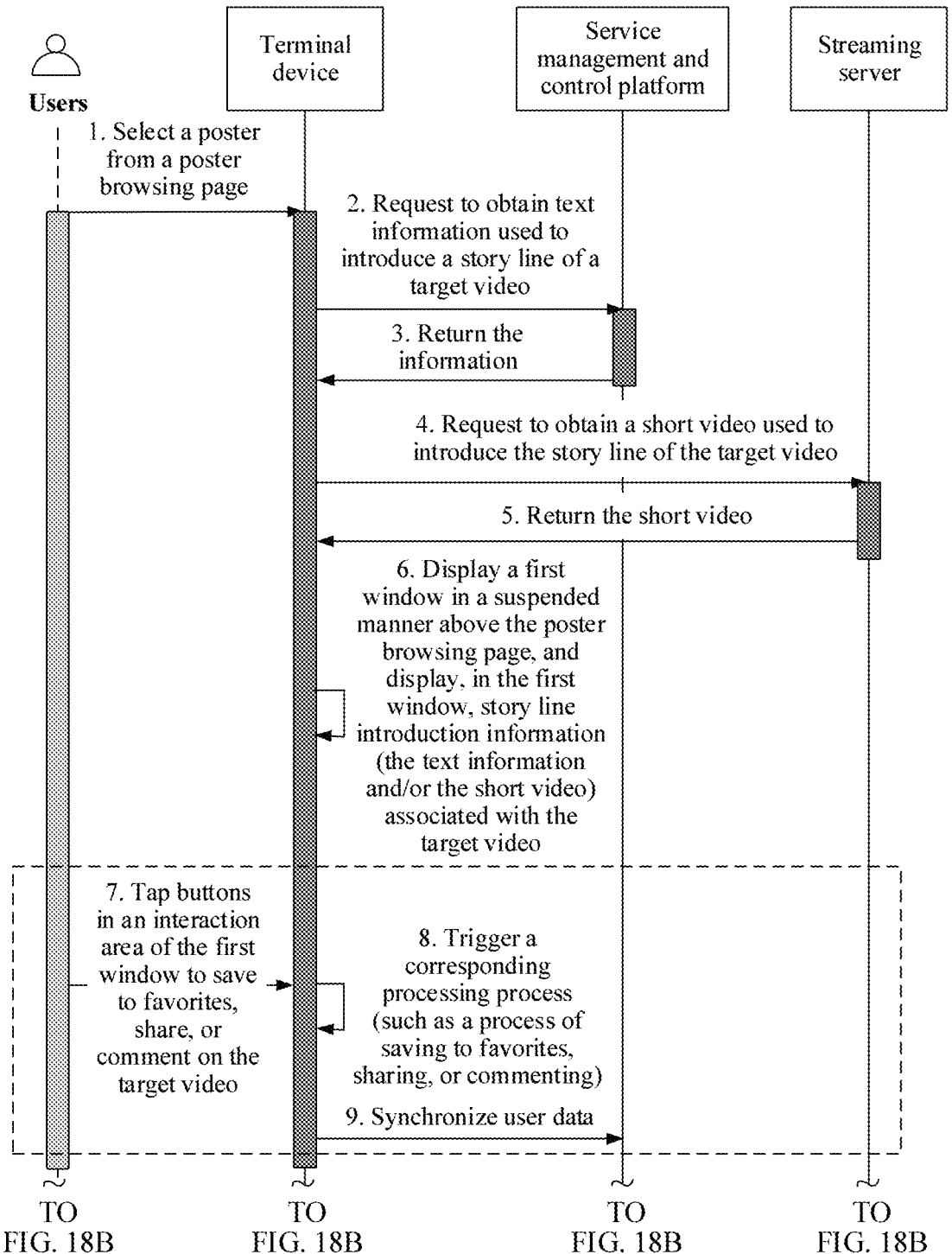
FIG. 18A is a schematic flowchart of interaction between a terminal and a server of a video provider in the information display method shown in FIG. 17.
Figure 18B:
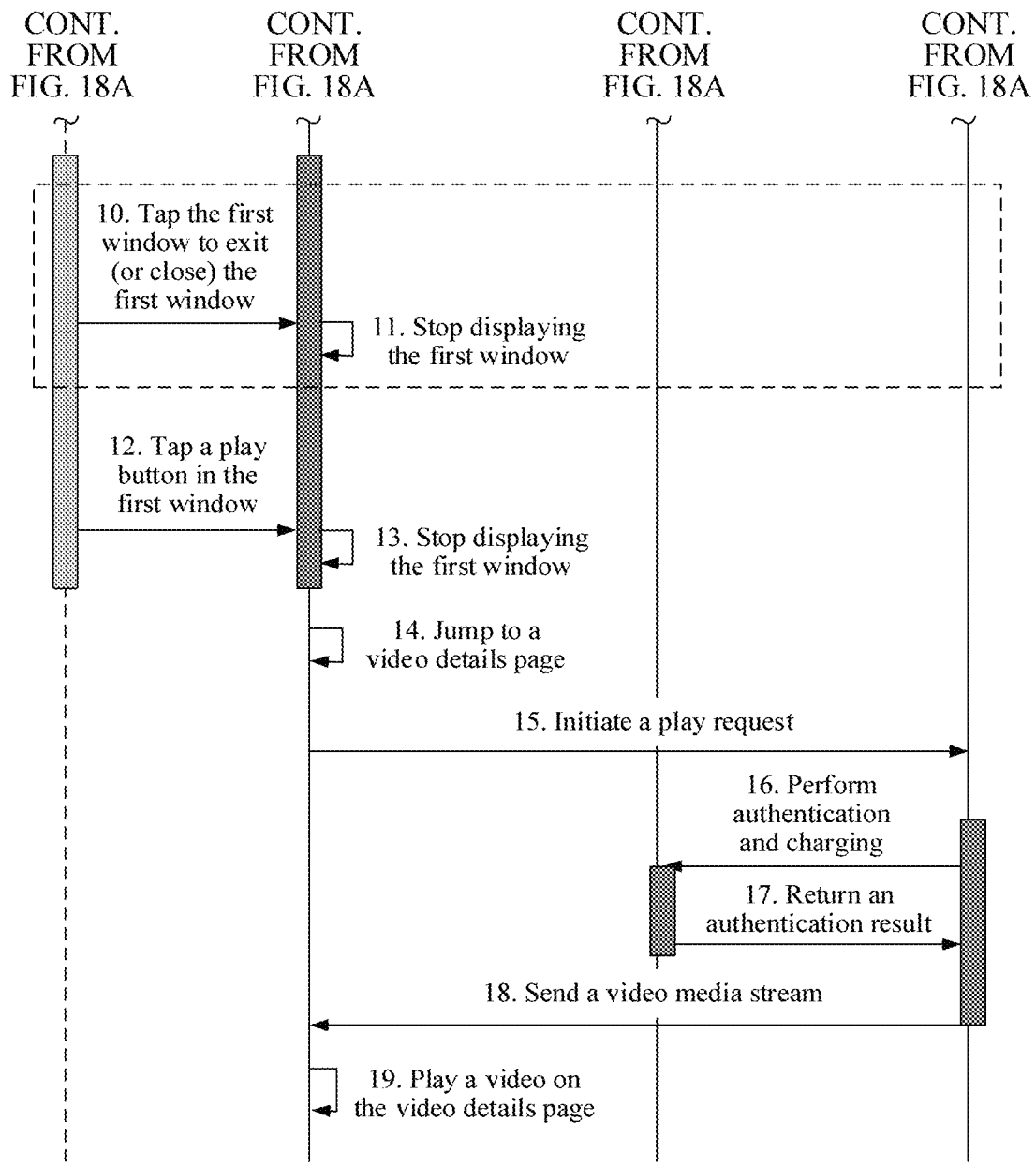
FIG. 18B is a schematic flowchart of interaction between a terminal and a server of a video provider in the information display method shown in FIG. 17.

The following describes in detail a process of interaction between a terminal and a server of a video provider with reference to FIG. 18A and FIG. 18B. The process may further include the following steps.

1. The terminal detects that a user selects a poster on a poster browsing page. Herein, the user operation of selecting the poster may be referred to as a first input. For detailed descriptions of the first input, refer to the foregoing content. Details are not described herein again.

2. In response to the detected user operation (that is, the first input) used to select the poster, the terminal may send a first request to a service management and control platform, to request to obtain text information (for example, a video summary) used to introduce a story line of a target video.

3. After receiving the first request sent by the terminal, the service management and control platform may return the text information to the terminal.

4. In response to the detected user operation (that is, the first input) used to select the poster, the terminal may further send a second request to a streaming server, to request to obtain a short video (or a dynamic poster, or the like) used to introduce the story line of the target video.

5. After receiving the second request sent by the terminal, the streaming server may return the short video to the terminal.

6. The terminal may display a first window in a suspended manner on the poster browsing page, and display, in the first window, video introduction information corresponding to the target video. Herein, the video introduction information corresponding to the target video may include but is not limited to the text information obtained in step 3 and the short video obtained in step 4. For details, refer to the foregoing content. Details are not described herein again.

7. The terminal detects an operation of tapping a favorites (or share or comment) button by the user in an interaction area. For detailed descriptions of the favorites (or share or comment) button, refer to the foregoing content. Details are not described herein again.

8. In response to the detected operation of tapping the favorites (or share or comment) button by the user in the interaction area, the terminal may trigger a corresponding processing process, for example, setting a display state of the favorites control in the first window to a first display state, displaying a video share window in a suspended manner in the first window, or setting a display state of the rating control in the first window to a second display state.

9. In response to the detected operation of tapping the favorites (or share or comment) button by the user in the interaction area, the terminal may further synchronize user data to the service management and control platform. For detailed descriptions of the user data, refer to the foregoing content. Details are not described herein again.

10. The terminal detects an operation of tapping the first window by the user to exit (or close) the first window. Herein, the operation of exiting (or closing) the first window may be referred to as a third input. For detailed descriptions of the third input, refer to the foregoing content. Details are not described herein again.

11. In response to the detected operation of exiting (or closing) the first window (that is, the third input), the terminal may stop displaying the first window.

12. The terminal detects an operation of tapping a play control in the first window by the user.

13-15. In response to the detected operation of tapping the play control in the first window, the terminal may stop displaying the first window and jump to (display) a video details page. Then the terminal may initiate a video play request to the streaming server.

16-18. After receiving the play request sent by the terminal, the streaming server performs operations such as authentication and charging, and then sends a video media stream to the terminal device. Further, as shown in steps 16 and 17, the streaming server may perform the operations such as authentication and charging through the service management and control platform.

19. After receiving the media stream, the terminal plays the video on the video details page.

It can be learned from the interaction process shown in FIG. 18A and FIG. 18B that the user can directly learn of the target video in detail after selecting the poster and opening the floating window, and viewing the video introduction information by the user in the floating window does not trigger play of the target video, that is, does not trigger the streaming server to initiate a process such as authentication and charging. This helps the user directly and quickly learn of the target video, without loading the target video excessively early, or causing network stalling, excessively high load of the terminal device, or the like, or consuming excessive user traffic.

Not limited to that shown in FIG. 18A and FIG. 18B, the service management and control platform and the streaming server may be integrated in one device. The server of the video provider may further include another device. This is not limited in this application.

To help the user quickly learn of a plurality of videos at a time, the first window provided in this application may be alternatively a three-dimensional floating window. The three-dimensional floating window includes N pages. The user may switch between the N pages for display on the screen of the display of the terminal. One page is used to display video introduction information corresponding to one video. The user can continuously browse video introduction information respectively corresponding to N videos. N is a positive integer greater than 1.

Further, the target video selected through the first input may be a plurality of videos, that is, videos respectively represented by N posters selected by the user. When detecting a user operation for selecting target videos (that is, the first input), the terminal may display in a suspended manner (or pop up) a three-dimensional floating window in the first display area (that is, the poster browsing page 101). The three-dimensional floating window may include a plurality of pages. The plurality of pages may be used to respectively display video introduction information corresponding to the target videos (that is, videos respectively represented by a plurality of posters continuously selected by the user).

In addition, the terminal may display at least one of the plurality of pages on the screen. A page that is in the at least one page and that is primarily displayed on the screen may be referred to as a current page of the three-dimensional floating window. Herein, "a page primarily displayed on the screen" is a page that is in the plurality of pages of the three-dimensional floating window and that occupies a largest display area on the screen.

Optionally, in addition to the current page, the terminal may further display a page after (or before) the current page, for example, a next (or previous) page, on the screen. For example, as shown in FIG. 7A and FIG. 7B, the terminal may display the next page on the right of the current page. This can not only help the user learn of video introduction information that is corresponding to a video and that is displayed on the current page, but also prompt the user that the user can slide leftwards on the three-dimensional floating window to browse video introduction information that is corresponding to a video and that is displayed on the next page. User experience is better. The example is merely an embodiment provided in this application, and constitutes no limitation on the technical solutions of this application. In actual application, there may be alternatively a different case.

Optionally, an arrangement form for displaying the plurality of pages included in the first window is as follows. The pages are respectively arranged on N sides of a prism. Not limited thereto, the plurality of pages included in the first window may be alternatively displayed in another arrangement form. For example, the plurality of pages included in the first window may be arranged on a circumference surface of a cylinder. For another example, the plurality of pages included in the first window may be displayed in an arrangement form of dominoes. The examples are merely some embodiments provided in this application, and constitute no limitation on the technical solutions of this application. In actual application, other different arrangement forms may be used.

In this application, the first window may further receive a page switching operation of the user. The operation may be used to switch the current page of the three-dimensional floating window. Herein, the page switching operation may be referred to as a second input. For the second input, refer to the embodiments of FIG. 8A to FIG. 9D. Details are not described herein again.

Not limited to a sliding operation, the second input may be a touch operation in another form, for example, a tap operation or a push operation that acts on the previous (or next) page. This is not limited herein.

Not limited to a touch operation, the second input may be alternatively a motion sensing operation on the three-dimensional floating window 301, without direct contact with the screen. Further, the motion sensing operation (also referred to as a motion gesture) may be captured by a motion sensor (for example, a depth camera).

Further, to help the user quickly browse video introduction information respectively corresponding to a plurality of videos when the user holds the terminal with one hand, the second input may be alternatively an operation of holding the terminal by the user to perform a specific movement, for example, an operation of rotating (or shaking, or swinging, or the like) the terminal. Further, the terminal may capture the second input using a movement sensor. In this application, the specific movement may be referred to as a first movement.

In this application, the first movement may include at least one of the following:

(1) When the N pages included in the first window are respectively arranged on the N sides of the prism, the terminal is rotated along an axis of the prism.

(2) When the N pages included in the first window are arranged on the circumference surface of the cylinder, the terminal is rotated along an axis of the cylinder.

(3) When the N pages included in the first window are arranged in the form of dominoes, the terminal is tilted in a direction in which the dominoes collapse in a chain.

For the first movement in (1), refer to the embodiments of FIG. 10, and FIG. 11A to FIG. 11D. Details are not described herein again.

Not limited to those shown in FIG. 11A to FIG. 11D, the plurality of pages included in the first window may be alternatively displayed in another arrangement form, for example, the arrangement form described in (2) or (3). For the first movement and the second input (that is, the page switching operation) corresponding to the arrangement form described in (2), refer to the embodiment of FIG. 11A to FIG. 11D. Details are not described herein again. For the first movement and the second input (that is, the page switching operation) corresponding to the arrangement form described in (3), refer to the embodiments of FIG. 12 and FIG. 13. Details are not described herein again.

In specific implementation, the first movement may impose a requirement on a manner of holding the terminal by the user for a movement. For example, a speed and/or an amplitude for rotating the terminal clockwise or counterclockwise or tilting the terminal need/needs to meet a predefined condition (for example, a rotational speed is greater than a first threshold). This is not limited in this application.

In this application, the first window may alternatively receive a user operation of exiting (or closing) the floating window 301. Herein, the user operation may be referred to as third input. For the third input and a processing process of responding to the third input by the terminal, refer to the embodiment of FIG. 14A and FIG. 14B. Details are not described herein again.

Not limited to a tap operation shown in FIG. 14A and FIG. 14B, the third input may alternatively include a touch operation such as a touch and hold operation or a double-tap operation. Not limited thereto, an exit (or close) button may be further provided in the first window, and the third input may be alternatively a user operation of tapping the button.

Not limited to the touch operation, the third input may be alternatively a motion sensing operation on the first window, without direct contact with the screen. Further, the motion sensing operation (also referred to as a motion gesture) may be captured by a motion sensor (for example, a depth camera).

It may be understood that, for content or descriptions not mentioned in this embodiment, reference may be made to a related part in the foregoing human-computer interaction embodiment, and details are not described herein again.

Figure 19:
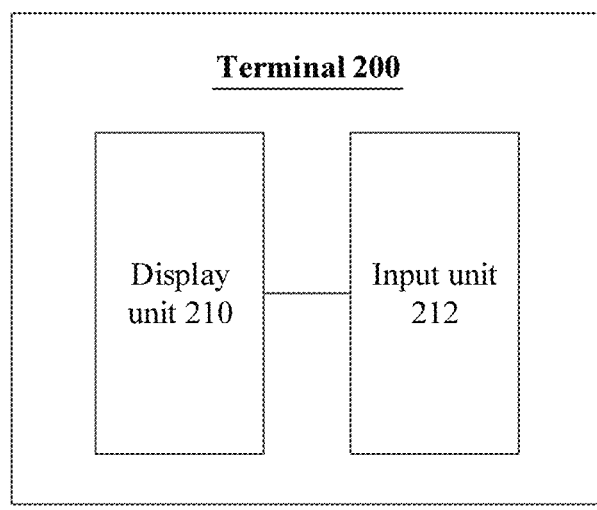
FIG. 19 is a functional block diagram of a terminal according to an embodiment of this application.

FIG. 19 is a functional block diagram of a terminal according to this application. Function blocks of the terminal may be implemented in hardware, software, or a combination of the software and the hardware to implement the solutions of this application. A person skilled in the art should understand that the function blocks described in FIG. 19 may be combined or separated into some sub-blocks to implement the solutions of this application. Therefore, the content described above in this application may support any possible combination or separation or further definition of the following function blocks. As shown in FIG. 19, the terminal 200 may include a display unit 210 and an input unit 212.

The display unit 210 may be configured to display at least one poster in a first display area of a screen. Further, the first display area may occupy a part of or the whole of the screen of a display of the terminal.

The input unit 212 may be configured to receive a first input used to select a poster from the at least one poster.

The display unit 210 may be further configured to display a first window in a suspended manner in the first display area. The first window displays video introduction information corresponding to a target video. Herein, the target video is a video represented by the poster selected through the first input.

In this application, a user operation that is used for viewing video introduction information and that acts on a poster may be referred to as a first input. Not limited to a tap operation acting on the poster in FIG. 3A and FIG. 3B, the first input may alternatively include a touch and hold operation or a double-tap operation that acts on the poster. Not limited thereto, the poster may further display a button used for viewing a story line, and the first input may be alternatively a tap operation acting on the button. Not limited to a touch operation, the first input may be alternatively a motion sensing operation on the poster, without direct contact with the touchscreen. Further, the motion sensing operation may be captured by a motion sensor.

In this application, the video introduction information corresponding to the target video may include but is not limited to at least one of text information used to introduce the target video, image information used to introduce the target video, and voice information used to introduce the target video. For details about descriptions of the video introduction information, refer to the foregoing embodiments. Details are not described herein again.

Further, the first window may further include but is not limited to at least one of a play control, a share control, a favorites control, and a rating control. The play control is used to receive a user operation that is input by a user for playing the target video. The share control is used to receive a user operation that is input by the user for sharing the target video. The favorites control is used to receive a user operation that is input by the user for adding the target video to favorites. The rating control is used to receive a user operation that is input by the user for commenting on the target video. For the controls and a human-computer interaction process related to the controls, refer to the embodiments of FIG. 5, and FIG. 6A to FIG. 6H. Details are not described herein again.

To help the user quickly learn of a plurality of videos at a time, the first window provided in this application may be alternatively a three-dimensional floating window. The three-dimensional floating window includes N pages. The user may switch between the N pages for display on the screen of the display of the terminal. One page is used to display video introduction information corresponding to one video. The user can continuously browse video introduction information respectively corresponding to N videos. N is a positive integer greater than 1.

Further, the target video selected through the first input may be a plurality of videos, that is, videos respectively represented by N posters selected by the user. The display unit 210 may be further configured to when the input unit 212 detects the user operation of selecting the target video (that is, the first input), display in a suspended manner (or pop up) at least one of the N pages in the first display area. The at least one page includes a current page of the three-dimensional floating window. The current page is a page that is in the N pages and that occupies a largest display area on the screen.

Optionally, in addition to the current page, the display unit 210 may be further configured to display a page after (or before) the current page on the screen. For details about a manner of displaying the page after (or before) the current page, refer to the foregoing embodiments. Details are not described herein again.

Optionally, an arrangement form for displaying the N pages included in the first window may include but is not limited to at least one of the following arrangement forms. The N pages are respectively arranged on N sides of a prism, or the N pages are arranged on a circumference surface of a cylinder, or the N pages are arranged in a form of dominoes. For the arrangement form for displaying the N pages, refer to the foregoing embodiments. Details are not described herein again.

Further, the input unit 212 may be further configured to receive a second input acting on the three-dimensional floating window (that is, the first window). The second input is a page switching operation, and may be used to switch a current page of the three-dimensional floating window. The display unit 210 may be further configured to in response to the second input detected by the input unit 212, switch and display a page before or after the current page as a new current page of the three-dimensional floating window.

Further, the second input may include at least one of a touch operation acting on the three-dimensional floating window, a motion sensing operation on the three-dimensional floating window, and an operation of holding the terminal to perform a first movement. For details about implementations of the second input, refer to the foregoing embodiments. Details are not described herein again.

In this application, the first movement may include but is not limited to at least one of the following:

(1) When the N pages included in the first window are respectively arranged on the N sides of the prism, the terminal is rotated along an axis of the prism.

(2) When the N pages included in the first window are arranged on the circumference surface of the cylinder, the terminal is rotated along an axis of the cylinder.

(3) When the N pages included in the first window are arranged in the form of dominoes, the terminal is tilted in a direction in which the dominoes collapse in a chain.

For implementations of the foregoing several first movements, refer to the foregoing embodiments. Details are not described herein again.

Further, the input unit 212 may be further configured to receive a user operation of exiting (or closing) the floating window 301. Herein, the user operation may be referred to as third input. The display unit 210 may be further configured to, in response to a third input detected by the input unit 212, stop displaying the three-dimensional floating window. For details about an implementation of the third input and a processing process related to the third input, refer to the foregoing embodiments. Details are not described herein again.

It may be understood that, for content or descriptions not mentioned in this embodiment, reference may be made to a related part in the foregoing embodiment, and details are not described herein again.

It may be understood that, for a specific implementation of the function blocks included in the terminal 200 in FIG. 19, refer to the foregoing method embodiments. Details are not further described herein.

To sum up, according to the technical solutions provided in the embodiments of this application, the floating window displayed in a suspended manner on the poster browsing page 101 (refer to FIG. 1A) is used to display video introduction information of a video. By simply selecting a poster 201 of a video of a user's interest on the poster browsing page 101, the user can quickly learn of the video in the floating window. This is quite convenient and efficient.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a ROM, RAM, a magnetic disk, or an optical disc.

What is claimed is:

1. An information display method implemented by a terminal, wherein the information display method comprises:

displaying a plurality of posters in a first display area of a screen of the terminal;

receiving a first user input that selects a poster from the plurality of posters, wherein the first user input includes a touch and hold operation;

displaying, in response to the first user input, a first window as a pop up on a portion of the plurality of posters in the first display area, wherein the first window comprises an image area and an audio play area;

displaying, in the first window, displays video introduction information corresponding to a target video represented by the poster, wherein the video introduction information includes image information introducing the target video in the image area and voice information introducing the target video in the audio play area, wherein the image information includes a short video and a static poster, wherein play duration of the short video is less than a first threshold, and wherein the first threshold comprises sixty seconds; and automatically playing the short video in the first window after the first window is displayed.

2. The information display method of claim 1, wherein the video introduction information further comprises text information describing the target video.

3. The information display method of claim 1, wherein the target video comprises N videos represented by N posters selected through the first user input, wherein the first window is a floating window comprising N pages, wherein the N pages separately display video introduction information corresponding to the N videos, wherein N is a positive integer greater than 1, wherein the information display method further comprises displaying a page of the N pages in the pop up in the first display area, wherein the page comprises a current page of the floating window, and wherein the current page is in the N pages and occupies a largest display area on the screen.

4. The information display method of claim 3, wherein the page of the N pages further comprises a page before or after the current page.

5. The information display method of claim 3, wherein the N pages are arranged in at least one of the following arrangement forms:
   on N side faces of a prism;
   on a circumference surface of a cylinder; or
   in a form of dominoes.

6. The information display method of claim 3, further comprising:
   receiving a second input acting on the floating window; and
   switching and displaying, in response to the second input, the page of the N pages before or after the current page as a new current page of the floating window.

7. The information display method of claim 6, wherein the second input comprises at least one of a touch operation acting on the floating window, a motion sensing operation on the floating window, or an operation of holding the terminal to perform a first movement.

8. The information display method of claim 7, wherein the first movement comprises at least one of the following:
   rotating the terminal along an axis of a prism when the N pages are arranged on the N sides of the prism;
   rotating the terminal along an axis of a cylinder when the N pages are arranged on the circumference surface of the cylinder; or
   tilting the terminal in a direction in which dominos collapse in a chain when the N pages are arranged in the form of dominoes.

9. A graphical user interface comprising instructions on a terminal device comprising a display, a processor, and a user input apparatus, wherein the graphical user interface that when executed by the processor causes the graphical user interface to be displayed on a first display area of the display, and wherein the processor causes the terminal device to be configured to:

display a plurality of posters in the first display area;

display, in response to a first user input that selects a poster from the plurality of posters and that is detected by the user input apparatus, a first window as a pop up on a portion of the plurality of posters in the first display area, wherein the first user input includes a touch and hold operation, and wherein the first window comprises an image area and an audio play area;

display, in the first window video introduction information corresponding to a target video represented by the poster, wherein the video introduction information includes image information introducing the target video in the image area and voice information introducing the target video in the audio play area, wherein the image information includes a short video and a static poster, wherein play duration of the short video is less than a first threshold, and wherein the first threshold comprises sixty seconds; and automatically play the short video in the first window after the first window is displayed.

10. The graphical user interface of claim 9, wherein the target video comprises N videos represented by N posters selected through the first user input, wherein the first window is a floating window comprising N pages, wherein the N pages separately display video introduction information corresponding to the N videos, wherein N is a positive integer greater than 1, wherein the graphical user interface is further configured to display a page of the N pages in the pop up in the first display area, wherein the page comprises a current page of the floating window, and wherein the current page is in the N pages and occupies a largest display area on the display.

11. The graphical user interface of claim 10, wherein the page of the N pages further comprises a page before or after the current page.

12. The graphical user interface of claim 10, wherein the N pages are arranged in at least one of the following arrangement forms:
   on N side faces of a prism;
   on a circumference surface of a cylinder; or
   in a form of dominoes.

13. The graphical user interface of claim 11, wherein the processor further causes the terminal device to be configured to switch and display, in response to a second input that is detected by the user input apparatus and that acts on the floating window, the page of the N pages before or after the current page as a new current page of the floating window.

14. The graphical user interface of claim 13, wherein the user input apparatus comprises at least one of a touch apparatus, a motion sensor, or a movement sensor, and wherein the second input comprises a touch operation acting on the floating window, a motion sensing operation on the floating window, or performing an operation of holding the terminal to perform a first movement.

15. The graphical user interface of claim 14, wherein the first movement comprises at least one of the following:
   rotating the terminal along an axis of a prism when the N pages are arranged on the N sides of the prism;
   rotating the terminal along an axis of a cylinder when the N pages are arranged on the circumference surface of the cylinder; or
   tilting the terminal in a direction in which dominos collapse in a chain when the N pages are arranged in the form of the dominoes.

16. A terminal comprising:
   a display comprising a screen and configured to display a plurality of posters in a first display area of the screen;

a user input apparatus coupled to the display and configured to receive a first user input that selects a poster from the plurality of posters, wherein the first user input includes a touch and hold operation;

a processor coupled to the display and the user input apparatus and configured to obtain, in response to the first user input, video introduction information corresponding to a target video represented by the poster, wherein the display is further configured to:
  display a first window as a pop up on a portion of the plurality of posters in the first display area, wherein the first window comprises an image area and an audio play area; and
  display, in the first window, displays the video introduction information, wherein the video introduction information includes image information introducing the target video in the image area and voice information introducing the target video in the audio play area, wherein the image information includes a short video and a static poster, wherein play duration of the short video is less than a first threshold, wherein the first threshold comprises sixty seconds, and wherein the processor is further configured to:
  automatically play the short video in the first window after the first window is displayed.

17. The terminal of claim 16, wherein the target video comprises N videos represented by N posters selected through the first user input, wherein the first window is a floating window comprising N pages, wherein the N pages separately display video introduction information corresponding to the N videos, wherein N is a positive integer greater than 1, wherein the display is further configured to display a page of the N pages in the suspended manner in the first display area, wherein the page comprises a current page of the floating window, and wherein the current page is in the N pages and occupies a largest display area on the screen.

18. The terminal of claim 17, wherein the user input apparatus is further configured to detect a second input acting on the floating window, and wherein the display is further configured to switch and display, in response to the second input, the page of the N pages before or after the current page as a new current page of the floating window.

19. The terminal of claim 18, wherein the user input apparatus comprises at least of one of a touch apparatus, a motion sensor, or a movement sensor, and wherein the second input comprises:
  a touch operation acting on the floating window;
  a motion sensing operation on the floating window; or
  performing an operation of holding the terminal to perform a first movement.

20. The terminal of claim 19, wherein the first movement comprises at least one of the following:
  rotating the terminal along an axis of a prism when the N pages are arranged on N sides of the prism;
  rotating the terminal along an axis of a cylinder when the N pages are arranged on a circumference surface of the cylinder; or
  tilting the terminal in a direction in which dominos collapse in a chain when the N pages are arranged in a form of the dominos.

* * * * *

UNITED STATES PATENT AND TRADEMARK OFFICE
CERTIFICATE OF CORRECTION

| | | |
|---|---|---|
| PATENT NO. | : 11,635,873 B2 | |
| APPLICATION NO. | : 17/007020 | |
| DATED | : April 25, 2023 | |
| INVENTOR(S) | : Shu | |

It is certified that error appears in the above-identified patent and that said Letters Patent is hereby corrected as shown below:

In the Claims

Claim 16, Column 35, Line 14: "window, displays the video" should read "window, the video"

Signed and Sealed this
Twenty-third Day of May, 2023

*Katherine Kelly Vidal*

Katherine Kelly Vidal
*Director of the United States Patent and Trademark Office*